United States Patent
Marsden et al.

(10) Patent No.: US 11,829,853 B2
(45) Date of Patent: *Nov. 28, 2023

(54) SYSTEMS AND METHODS FOR TRACKING AND REPRESENTING DATA SCIENCE MODEL RUNS

(71) Applicant: Subtree Inc., Chatsworth, CA (US)

(72) Inventors: Luke Marsden, Bristol (GB); Alaric Blagrave Snell-Pym, Gloucester (GB); Karolis Rusenas, London (GB); Charlotte Rachael Godley, St Albans (GB)

(73) Assignee: Subtree Inc., Chatsworth, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/368,485

(22) Filed: Jul. 6, 2021

(65) Prior Publication Data
US 2021/0342725 A1 Nov. 4, 2021

Related U.S. Application Data

(63) Continuation-in-part of application No. 16/737,525, filed on Jan. 8, 2020, now Pat. No. 11,086,891.

(51) Int. Cl.
*G06N 20/00* (2019.01)
*G06F 16/908* (2019.01)
(Continued)

(52) U.S. Cl.
CPC .......... *G06N 20/00* (2019.01); *G06F 16/908* (2019.01); *G06F 18/214* (2023.01); *G06F 18/217* (2023.01); *G06N 7/01* (2023.01)

(58) Field of Classification Search
CPC ........ G06N 20/00; G06N 7/01; G06F 16/908; G06F 18/217; G06F 18/214; G06F 16/2465
(Continued)

(56) References Cited

U.S. PATENT DOCUMENTS 9,996,804 B2 6/2018 Bowers
10,713,594 B2 7/2020 Szeto
(Continued)

OTHER PUBLICATIONS dotscience.com online disclosures, available online at least as early as Aug. 26, 2018, available online at https://web.archive.org/web/20180826101150/https:/dotscience.com/, https://web.archive.org/web/20180826094934/https://dotscience.com/optimize/, https://web.archive.org/web/20180826100843/https://dotscience.com/version-control/, and https://web.archive.org/web/20180826112811/https://dotscience.com/kubernetes/, last visited Oct. 4, 2019.
(Continued)

*Primary Examiner* — Manglesh M Patel
(74) *Attorney, Agent, or Firm* — David R. Stevens; Stevens Law Group

(57) ABSTRACT

A system for tracking and representing data science model runs includes a hub including a first computing device communicatively coupled with a data store. A runner including a second computing device having a cache is communicatively coupled with the hub through a telecommunications network. An end user computing device includes a display and is communicatively coupled with the runner and the hub. User interfaces displayed on the display include: a unique identifier identifying a data science model run performed by the runner; a list of input files used by the runner to perform the run; a list of output files output by the runner as a result of the run; and a diagram diagramming a process flow including a visual representation of the input files, a visual representation of the run, and a visual representation of the output files.

20 Claims, 40 Drawing Sheets

(51) Int. Cl.
*G06F 18/214* (2023.01)
*G06F 18/21* (2023.01)
*G06N 7/01* (2023.01)

(58) Field of Classification Search
USPC ........................................................ 715/200
See application file for complete search history.

(56) References Cited

U.S. PATENT DOCUMENTS

2016/0132787 A1 5/2016 Drevo
2018/0293517 A1 10/2018 Browne

OTHER PUBLICATIONS dotmesh.com online disclosures, available online at least as early as Jan. 26, 2018, available online at https://dotmesh.com/, https://docs.dotmesh.com/concepts/, https://docs.dotmesh.com/concepts/what-is-a-datadot/, and https://docs.dotmesh.com/concepts/architecture/, last visited Oct. 4, 2019.

Excerpt from Wikipedia "ZFS" entry, available online at least as early as Oct. 4, 2019, available online at https://en.wikipedia.org/wiki/ZFS, last visited Oct. 4, 2019.

Excerpt from Wikipedia "Kubernetes" entry, available online at least as early as Oct. 4, 2019, available online at https://en.wikipedia.org/wiki/Kubernetes, last visited Oct. 4, 2019.

Excerpt from Wikipedia "Project Jupyter" entry, available online at least as early as Oct. 4, 2019, available online at https://en.wikipedia.org/wiki/Project_Jupyter, last visited Oct. 4, 2019.

Excerpt from Wikipedia "Docker (software)" entry, available online at least as early as Oct. 4, 2019, available online at https://en.wikipedia.org/wiki/Docker_(software), last visited Oct. 4, 2019.

Excerpt from Wikipedia "PostgreSQL" entry, available online at least as early as Oct. 4, 2019, available online at https://en.wikipedia.org/wiki/PostgreSQL, last visited Oct. 4, 2019.

Excerpt from Wikipedia "Container Linux" entry discussing ETCD daemon, available online at least as early as Oct. 4, 2019, available online at https://en.wikipedia.org/wiki/Container_Linux#ETCD, last visited Oct. 4, 2019.

Excerpt from Wikipedia "NATS Messaging" entry, available online at least as early as Oct. 4, 2019, available online at https://en.wikipedia.org/wiki/NATS_Messaging, last visited Oct. 4, 2019.

Excerpt from Wikipedia "gRPC" entry, available online at least as early as Oct. 4, 2019, available online at https://en.wikipedia.org/wiki/GRPC, last visited Oct. 4, 2019.

Excerpt from Wikipedia "NODE. JS" entry, available online at least as early as Oct. 4, 2019, available online at https://en.wikipedia.org/wiki/Node.js, last visited Oct. 4, 2019.

Excerpt from Wikipedia "JSON-RPC" entry, available online at least as early as Oct. 4, 2019, available online at https://en.wikipedia.org/wiki/JSON-RPC, last visited Oct. 4, 2019.

Grafana product description, available online at least as early as Oct. 31, 2019, available online at https://grafana.com/grafana/, last visited Oct. 31, 2019.

Hafidz Zulkifli, Tracking ML Experiments using ML flow, Published Jul. 13, 2019, towardsdatascience.com, pp. 1-25(pdf).

Visio, Automatically create process diagrams in Visio from Excel data, published by Microsoft with wayback date of Sep. 4, 2018, pp. 1-3(pdf).

DOTSCIENCE ◆ PROJECTS ⋯ DATASETS 📖 DOCS

◆ PROJECTS

YOUR PROJECTS

[ADD NEW +]

◆ YOU CURRENTLY HAVE NO PROJECTS.
WHY NOT FORK A PUBLIC PROJECT TO LEARN ABOUT DOTSCIENCE?

SHARED WITH ME

👥 NO PROJECTS ARE SHARED WITH YOU

PUBLIC PROJECTS

👥 HELLO, DOTSCIENCE! [READ ONLY] OWNED BY ADMIN

```
1   # Data engineering in Dotscience
2   # ========================
3   #
4   # In this script, we take a raw dataset from S3, and split it into two modelling sets:
5   # a small and large, each containing training, test and validation sets.
6   #
7   # Plan for splitting data
8   # _____
9   #
10  # 51,839 samples, let's construct two datasets for training models...
11  #
12  # * small
13  #    * 10k train
14  #    * 1k test
15  #    * 500 validate
16  # * large
17  #    * 50k train
18  #    * 1k test
19  #    * 839 validate
20
21  import dotscience as ds
22  import numpy as np
23  import pickle
24  import os
25  from shutil import copyfile
26
27  ds.start()
28
29  roadsigns = pickle.load(open(ds.input("s3/roadsigns.p"),"rb"))
30
31  if not os.path.exists("data"):
32  |    os.mkdir("data")
33
34  # Sample ranges of the data
35
36  samples = [{"small-train": 10000, "small-test": 1000, "small-validate": 500},
37  |    |    |    {"large-train": 50000, "large-test": 1000, "large-validate": 839}]
38
39  for sampleset in samples:
40  |    i = 0
41  |    for k in sorted(sampleset.keys()):
42  |    |    count = sampleset[k]
```

FIG. 15 1500

```
43 |  |    range_start = i
44 |  |    range_end = i+count
45 |  |    i += count
46 |  |    print ("smaple", k, "start", range_start, "end", range_end)
47 |  |    result = {x: roadsigns[x][range_start:range_end] for x in roadsigns.keys()}
48 |  |    pickle.dump(result, open(ds.output("data/%s.p" % (k,)), "wb"))
49
50  ds.publish("created small and large sample sets from raw data in S3")
51
52  # just make a copy of the labels so we keep them together with the data
53  ds.start()
54  copyfile(ds.input("s3/signnames.csv"), ds.output("data/signnames.csv"))
55  ds.publish("copied signnames.csv from S3")
```

PROBLEMS  OUTPUT  DEBUG CONSOLE  TERMINAL 

user1@dot:~/ps/roadsigns-e2e$ ds run -I $IMAGE -p roadsigns --ref master --repo $REPO python roadsigns-e2e/data-engineering.py user1@dot:~/Projects/subtree/roadsigns-e2e$ cat .env
REPO+git@github.com:dotmesh-io/roadsigns-e2d
IMAGE=quay.io/dotmesh/jupyterlab-tensorflow.0.2.11 user1@dot:~/Projects/Subtree/roadsigns-e2e$

Executing run ID 0ba9ae5d-84f2-4df0-828b-e8ca0dc96d48...

"workload-file": "roadsigns-e2e/data-engineering.py"
}[[/DOTSCIENCE-RUN:d6cc5a5c-d2e4-4667-a0c2-d7a067cf1757]]
[[DOTSCIENCE-RUN:6f1ec6f1-bb29-41bc-a02a-83b8630a9121]]{
  "description:: "copied signnames.csv from S3",
  "end": "20190728T163836.232653",
  "input": [
    "s3/signnames.csv"
  ],
  "labels": {},
  "output": [
    "data/signnames.csv"
  ],
  "parameters": {},
  "start": "20190728T163836.232431",
  "summary": {},
  "version": "1",
  "workload-file": "roadsigns-e2e/data-engineering.py"
}[[/DOTSCIENCE-RUN:6f1ec6f1-bb29-41bc-a02a-83b8630a9121]]

```
34  if not os.path.exists("data"):
35  |    os.mkdir("data")
36
37  # Shuffle the data otherwise the small training set is
38  # almost all one type of roadsign and gets bad accuracy
39
40  SEED = 42
41
42  for k in roadsigns.keys():
43  |    # Very important that we set the seed every time
44  |    np.random.seed(SEED)
45  |    np.random.shuffle(roadsigns[k])
47
48  # Sample ranges of the data
```

PROBLEMS  OUTPUT  DEBUG CONSOLE  TERMINAL 
  0ba9ae5d-84f2-4df0-828b-e8ca0dc96d48/committer-stderr.log
user1@dot:~/ps/roadsigns-e2e$ git branch
* master
  shuffle-data
user1@dot:~/ps/roadsigns-e2e$ git checkout shuffle-data
Switched to branch 'shuffle-data'
Your branch is up to date with 'origin/shuffle-data'.
user1@dot:~/ps/roadsigns-e2e$ #ds run -I $IMAGE -p roadsigns --ref shuffle-data --repo #REPO python roadsigns-e2e/data-engineering.py
user1@dot:~/ps/roadsigns-e2e$ ds run -I $IMAGE -p roadsigns --ref shuffle-data --repo #REPO python roadsigns-e2e/data-engineering.py
Executing run ID dabf311b-8e1e-48e7-8732-020004d5f122...

"labels": {},
  "output": [
    "data/signnames.csv"
  ],
  "parameters": {},
  "start": "20190728T165011.595087",
  "summary": {},
  "version": "1"
  "workload-file": "roadsigns-e2e/data-engineering.py"
}[[/DOTSCIENCE-RUN:db6d933a-2a82-4e76-8f52-e360438af455]]

| PROJECT | DATE/TIME | PARAMETERS | SUMMARY | FRAMEWORK | MODEL | DEPLOY |
|---|---|---|---|---|---|---|
| demo-prep | 27 July 2019 @ 11:58:11 | epochs=3; optimizer=adam | accuracy= 0.9280285 | tensorflow | ./model | Deploy ↑ |
| demo-prep | 27 July 2019 @ 12:02:52 | epochs | | | ./model | Deploy ↑ |
| demo-prep | 27 July 2019 @ 12:02:52 | epoch | | | ./model | Deploy ↑ |
| demo-prep | 28 July 2019 @ 11:11:30 | epoch | | | ./model | Deploy ↑ |
| demo-prep | 28 July 2019 @ 11:17:56 | epoch | | | ./model | Deploy ↑ |
| demo-prep | 28 July 2019 @ 11:19:32 | epoch | | | ./model | Deploy ↑ |
| roadsigns-old | 28 July 2019 @ 12:35:32 | epochs=3; optimizer=adam | 0.95 | tensorflow | ./model | Deploy ↑ |
| roadsigns | 28 July 2019 @ 16:47:21 | epochs=3; optimizer=adam | accuracy= 0.097 | tensorflow | ./model | Deploy ↑ |
| roadsigns | 28 July 2019 @ 16:54:51 | epochs=3; optimizer=adam | accuracy= 0.955 | tensorflow | ./model | Deploy ↑ |

DEPLOYMENT
Your model has been sent to your CI system. Click the button below to see the pipeline:

View Pipeline    Cancel

FIG. 26

DOTSCIENCE LAB

TRACKED 1 MONTH AGO - DOTSCIENCE RUNS

→ RUNS    ROADSIGNS

FILE  EDIT  VIEW  RUN  KERNEL  TABS  SETTINGS  HELP

LAUNCHER ✕ | MODEL-TRAINING.IPYNB ✕

🖫 + ✕ ⬜ ▶ ■ C    CODE ▼   PYTHON 3 ○

CONVOLUTIONAL NEURAL NET

```python
[66]: num_classes=43
      conv = tf.keras.models.Sequential()
      conv.add(tf.keras.layers.Conv2D(32, kernel_size=(5,5), strides(1,1)
      conv.add(tf.keras.layers.MaxPooling2D(pool_size=(2,2), strides=(2,
      conv.add(tf.keras.layers.Conv2D(32,(5,5), activation='relu')
      conv.add(tf.keras.layers.MaxPooling2D(pool_size=(2,2)))
      conv.add(tf.keras.layers.Flatten()
      conv.add(tf.keras.layers.Dense(1000, activation='relu'))
      conv.add(tf.keras.layers.Dense(units = num_classes, activation='soft conv.compile(optimizer=ds.parameter("optimizer", 'sgd'),
             loss='sparse_categorical_crossentropy',
             metrics=['accuracy'])

es = tf.keras.callbacks.EarlyStopping(monitor='acc')

conv.fit(X_train_preprocessed, y_train,
```

STATUS

STATUS: PUSHING TO HUB (13.03%)

RUNS 2019-07-28 17:05:42

MESSAGE: TRAINED TENSORFLOW MODEL

FILE: ROADSIGNS-E2E/MODEL-TRAINING.IPYNB

PARAM: DATASET=LARGE

PARAM: EPOCHS=3

PARAM: OPTIMIZER=SGD

SUMMARY: ACCURACY=0.927

INPUT: DATA/LARGE-TEST.P@2A7CF5BC-5D35-4667-A7AA-3EB87D154868

INPUT: DATA/SIGNNAMES.CSV @2A7CF5BC-5D35-4667-A7AA-3EB87D154868

0 [S] 1 | ⚙ | PYTHON 3 | IDLE MODE: EDIT LN 1, COL 1 MODEL-TRAINING.IPYNB

SYSTEMS AND METHODS FOR TRACKING AND REPRESENTING DATA SCIENCE MODEL RUNS

CROSS REFERENCE TO RELATED APPLICATIONS

This document is a continuation in part application of U.S. patent application Ser. No. 16/737,525 titled "Systems and Methods for Tracking and Representing Data Science Data Runs," naming as first inventor Luke Marsden, filed Jan. 8, 2020, the disclosure of which is hereby incorporated entirely herein by reference.

BACKGROUND

1. Technical Field

Aspects of this document relate generally to data science. Specific aspects relate to data used to train machine learning (ML) models, modification of ML models, deployment of ML models, and statistical monitoring of ML models.

2. Background Art

Data science is a multi-disciplinary field using various methods such as data analysis, statistics, and machine learning (ML) to extract insights from data. Machine learning (ML) uses computer-implemented algorithms and statistical models to perform tasks using patterns and inferences instead of explicit instructions. ML models are trained on sample data to make predictions/decisions without being explicitly programmed on how to make the predictions/decisions.

SUMMARY

Systems and methods disclosed herein are useful for managing computerized data processing workloads, such as for use by data scientists. Data scientists use computers to perform work, typically on large chunks of data such as financial transaction records, medical records, communications records, or scientific data obtained from various sources, processed in various ways, and summarized to produce somewhat smaller outputs, such as: (1) human-readable summary reports (e.g., totals or average amounts of some activity for each month covered by the input data); (2) conclusions about patterns in the data (e.g., "the risk of dying from lung cancer before age 85 is 22.1% for a male smoker and 11.9% for a female current smoker, in the absence of competing causes of death"); (3) a machine learning (ML) or artificial intelligence (AI) model that has been "trained" on the input data, and is now capable of making predictions based on similar data in future (e.g., given data about the historical outcome of loans made to people along with financial information about them, a model might be trained to, given financial information about a prospective borrower, predict the likelihood of eventual non-payment); etc.

When data scientists work to produce such outputs, the work may include multiple stages. Data processing steps (data runs) take an input dataset and produce an output dataset which may not be directly useful, but with subsequent steps can be further processed to produce something useful. Data processing steps may include: (1) filtering input data to remove probably erroneous data; (2) transforming data into the correct form for a subsequent step; (3) imputation; (4) featurization; etc.

Data scientists may deal with multiple versions of input/output data and software they write to process data. For example: (1) they may develop an approach using smaller datasets (cheaper and faster to work with) before using a resulting system on the entire dataset to draw final conclusions; (2) they may receive updated versions of input data as more data becomes available and re-analyze with the extended data; (3) ongoing work on the processes may produce new versions of them, which may or may not turn out to produce better results—but this can only be found out by testing them and then measuring the quality of the outputs; etc.

Accordingly, a data science team may have multiple versions of just about everything they store on the computer(s). These may fall into multiple categories, such as: (1) input data obtained from some external source; (2) software that applies some process to data; (3) output data; (4) intermediate data, generated by some process in order to be consumed by another process; and (5) analysis.

Systems disclosed herein include environments (software platforms and hardware) to manage the above items in a shared library, keeping track of different versions of each. When the user wishes to run one of the processes, the system provides the appropriate versions of all inputs to that process and captures the outputs into the library. It also records that the run happened, along with its details. This enables users to trace the provenance (chronology of ownership and location) of any resource in the system, tracing back through the series of processes and intermediate data that produced it until the specific versions of the input datasets are identified.

The systems and methods enable users to: (1) quickly find the correct versions of inputs from the shared library, confident that there is not a better version they are unaware of (e.g., because it is on another user's computer); (2) easily share resources with other team members—by using the shared library, they never need to "send" results to others; (3) quickly find the most recent outputs, or the outputs produced by the best versions of the process, so they can offer the best results of the work to stakeholders; (4) make fair comparisons between different versions of a process, by verifying that the outputs they are comparing were produced from the same input data; collaborate, by taking copies of a process and working on the copy, updating a copy with changes others have made to the original or "master" copy, and when confident that the variation is an improvement, submitting the changes back to be incorporated into the master; (5) save storage space/costs, by not having multiple copies of large data files lying around the system—the system keeps track of where copies are, and makes copies only when necessary; (6) ensure the best versions are all within a single coherent dataflow that actually took place, etc.

General details of the above-described implementations, and other implementations, are given below in the DESCRIPTION, the DRAWINGS, and the CLAIMS.

BRIEF DESCRIPTION OF THE DRAWINGS

Implementations will be discussed hereafter using reference to the included drawings, briefly described below, wherein like designations refer to like elements:

FIG. 5 is an implementation of a user interface (UI) of the system of FIG. 1;

FIG. 9 is an implementation of another UI of the system of FIG. 1;

FIG. 10 is an implementation of another UI of the system of FIG. 1;

FIG. 15 is an implementation of another UI of the system of FIG. 1;

FIG. 16 is an implementation of another UI of the system of FIG. 1;

FIG. 18 is an implementation of another UI of the system of FIG. 1;

FIG. 19 is an implementation of another UI of the system of FIG. 1;

FIG. 20 is an implementation of another UI of the system of FIG. 1;

FIG. 22 is an implementation of another UI of the system of FIG. 1;

FIG. 26 is an implementation of another UI of the system of FIG. 1;

FIG. 30 is an implementation of another UI of the system of FIG. 1;

FIG. 33 is an implementation of another UI of the system of FIG. 1;

DESCRIPTION

Implementations disclosed herein are not limited to the particular components or procedures described herein. Additional or alternative components, assembly procedures, and/or methods of use consistent with the intended systems and methods may be utilized, including any materials, components, sub-components, methods, sub-methods, steps, etc.

Example System Hardware/Architecture

Figure 1:
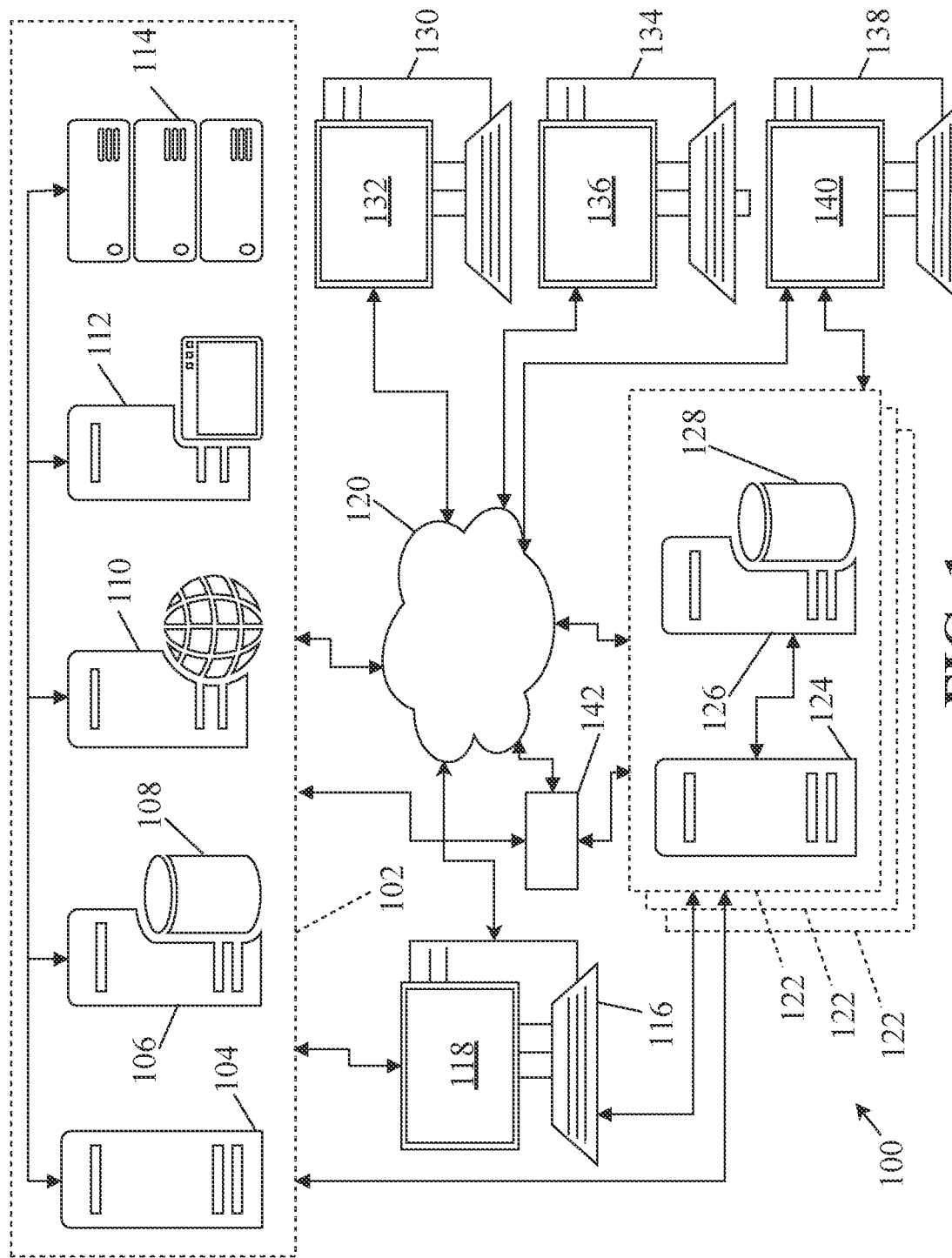
FIG. 1 is a diagram of an implementation of a system for tracking and representing data science model runs.

Referring to FIG. 1, an example of a system 100 for tracking and representing data science model runs is shown. System 100 includes a hub 102 which may include, by non-limiting examples, one or more servers 104, one or more data stores (such as database servers 106 communicatively coupled with one or more databases 108), one or more web servers 110, one or more application servers 112 and/or one or more server racks 114. In a simplified version of system 100 the server racks could be omitted and the remaining elements could be implemented on a single device such as through the use of virtualization and/or containers. In a complex version the hub could include multiple servers, data stores, database servers, databases, web servers, application servers, etc., which may be in a single location or located remote from one another and communicatively coupled such as through a telecommunications network (network) 120, and local or remote server racks 114 may be used to implement hub functions. The hub may include additional components not shown, or may exclude shown components, so that FIG. 1 is only one example among many of some of the components that may be included in the system.

System 100 may have more than one hub though only one is shown in FIG. 1. Some elements (such as network 120) are shown coupled with the hub, this may be a direct coupling to sub-components of the hub. For example each server, DB server, web server, app server, and server rack of the hub may be directly coupled with the network 120, and in this way network 120 is coupled with the hub. In other implementations network 120 may be directly coupled with a first subset of hub components and only indirectly coupled with other hub components through the first subset. The same holds for other elements of system 100 shown coupled with the hub.

One or more administrator computing devices (computers) (devices) 116 is illustrated as communicatively coupled with the hub directly and/or through network 120. This is illustrated as a desktop computer but, as with any other computer in the drawings, could be a laptop, tablet, smart phone, etc. Device 116 has a display 118 whereon user interfaces (UIs) may allow the administrator to interact with the system, such as modifying system settings, installing and editing software on hub components, interacting with the DBs, etc. In implementations system 100 may include more than one device 116 but, for ease of illustration, only one is shown.

One or more runners 122 included in system 100 are communicatively coupled with the hub directly and/or through network 120. The runner may be coupled with the administrator device 116 directly and/or through network 120, and this may allow an administrator to configure aspects of the runner. Each runner may include one or more servers 124, one or more data stores (such as database servers 126 communicatively coupled with databases 128), etc. System 100 may include multiple runners but, for ease of illustration, only one is shown in FIG. 1. In some implementations the runner could be implemented on a single computing device, with or without the use of virtualization and/or containers, while in implementations the runner may include multiple computing devices coupled together locally and/or coupled together through network 120. The runner could exclude a dedicated DB server but include one or more DBs or data stores and one or more processors to process data science runs. Multiple runners 122 are displayed in FIG. 1 to indicate that they may be scaled as needed. The end user or administrator provides the hub with runner details so the system can track and version ML models.

A plurality of end user computing devices (computers) 130, 134, 138 are shown communicatively coupled with the hub and runner through network 120. Devices 130 and 134 are shown coupled with the runner via network 120, while device 138 is shown directly coupled with the runner (i.e., a runner local to device 138). End user devices 130, 134 and 138 include displays 132, 136 and 140 on which one or more UIs may be displayed for the user to utilize the functions of system 100. System 100 could include only a single end user device in a simplified implementation, and in other implementations could include hundreds or more end user devices and runners, so that the illustration of three end user devices is only one example among many. In some implementations the runner could be implemented using an end user device itself.

In implementations each user or team of users may have a dedicated runner to isolate the data of users. The number of runners may be scaled with the number of user/teams. If DOCKER is used for containerization on runners there may not be an existing method to have multiple end users using the same runner (with different containers) and still isolate the data of each. One or more runners may be shared, however, by a team for whom data isolation is not needed.

The hub and/or runner may be communicatively coupled with one or more external resources 142 directly and/or through network 120. This may include existing DBs, files, data lakes, etc. of the end user which may be remote from the end user device. In implementations the end user may have such items stored in remote servers. The hub and runner are illustrated communicatively coupled with the external resources to indicate that the end user may allow them to access these items to perform the data science runs. In implementations the system may be configured to allow some end users, but not all end users, of a team to access the external resources. This may be done when the data is limited to only certain organization employees/contractors by company policy or government regulation, such as for highly sensitive personal information, health information, etc. In some implementations the external resources could be coupled with only one of the runner or hub directly through the telecommunications network and may be accessible to the other thereby (the hub via the runner or vice versa).

Figure 2:
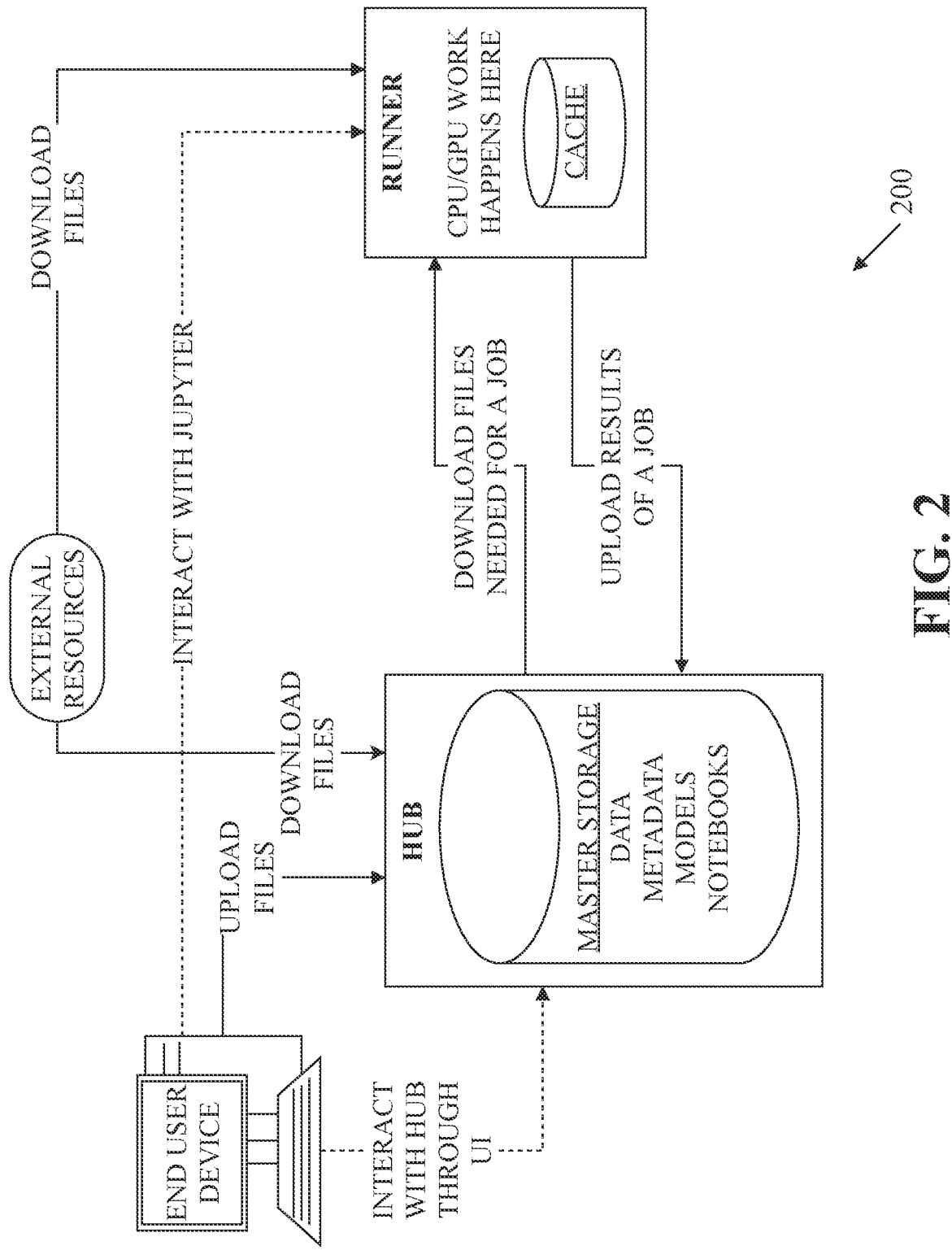
FIG. 2 is a diagram representatively illustrating elements of the system of FIG. 1 and methods implemented using the system of FIG. 1.

Diagram 200 of FIG. 2 illustrates data science methods implemented using system 100. An end user may interact with the hub through the telecommunications network using UIs implemented through the hub (such as through web servers) and displayed on the end user device. These interactions may be low bandwidth but latency-sensitive interactions (indicated, as with other low bandwidth latency-sensitive interactions, using a dashed line). The end user may upload one or more files, including one or more bulk file transfers (indicated, as with other bulk file transfers, using a solid line), to the hub, to be stored in databases or data store(s) of the hub. These files may be uploaded from the end user device or from a remote device, such as remote storage communicatively coupled with the hub through the telecommunications network.

The end user may use the end user device to interact with software on the runner to perform data science runs. The runner may include JUPYTERLAB (hereinafter "JUPYTER" or "JUPYTERLAB") and the user may interact with JUPYTER on the runner through one or more UIs displayed on the end user device using software installed on the runner. Through JUPYTER, the user may initiate data science runs. The runner may download files from the hub, including bulk file transfers, needed for the job and may download one or more files from external resources to complete the run. In some implementations the external resources may have previously been downloaded to the hub and the runner may fetch these resources from the hub to perform the run. The runner may store these in a cache and the CPU/GPU of the runner may be used to process the run, the results also being stored in the cache. Results of the job/run may be uploaded to the hub, including one or more bulk file transfers. In this way, the hub may store ML models, data used to train the ML models, metadata related to the models and data science jobs/runs, JUPYTERLAB notebooks, etc., while the runner is used to process the jobs/runs. Results of jobs/runs may be displayed through UIs on the end user device.

JUPYTERLAB is an example application that might be run on a runner to perform model runs, but other applications might be used to provide similar or other functionality, e.g., NODERED, and the user may run any application that will run in a DOCKER container in batch mode (not interacting with the end user device during execution), for example the "ds run CLI tasks" and "command runs" that are further described in later sections herein.

Access from the end user device to JUPYTER (or other workload) on the runner may in implementations be routed through the hub because the runner may have limited access to the network in a way that makes it difficult for the end user device to talk directly to the runner (e.g., a pool of runners is behind a NAT router or other firewall device that disallows incoming connections). This may be implemented as a tunnel, described further below. In other implementations the end user device may directly access the runner, not only via the hub.

Example System Software, Tools and Protocols

While other software, tools and protocols may be used, in some implementations the system 100 builds heavily on ZFS, a combined file system and logical volume manager designed by SUN MICROSYSTEMS. ZFS provides reliable storage with snapshots and clones on a single computer. The system manages ZFS instances on each computer and provides an overarching management layer to keep track of what copies of data are in the care of ZFS on each computer.

The system may include server-side software written in GOOGLE's GO language (GOLANG) and use GOOGLE's open source Remote Procedure Call (GRPC), Representational State Transfer (REST), NATS (an open source messaging system), and JSON-RPC to communicate between system components. The UIs may be written in JAVASCRIPT using the REACT library, including some server-side components using NODE.JS. The distributed key/value store ETCD and POSTGRESQL (hereinafter also "POSTGRES") may store and share metadata between system components. DOTMESH storage management software may be used to manage ZFS—the runners using a DOTMESH protocol to transfer bulk data to and from the hub.

The system may make heavy use of DOCKER, with software elements residing in DOCKER containers on the hub and runners for internal compartmentalization and to isolate the data science process workloads or projects from each other. A customized version of the data science tool JUPYTERLAB may be shipped to the runners, the customizations providing improved integration with the system. When JUPYTERLAB is started a tunnel is used to allow the user to access the JUPYTERLAB web interface running on the runner in their browser.

Figure 3:
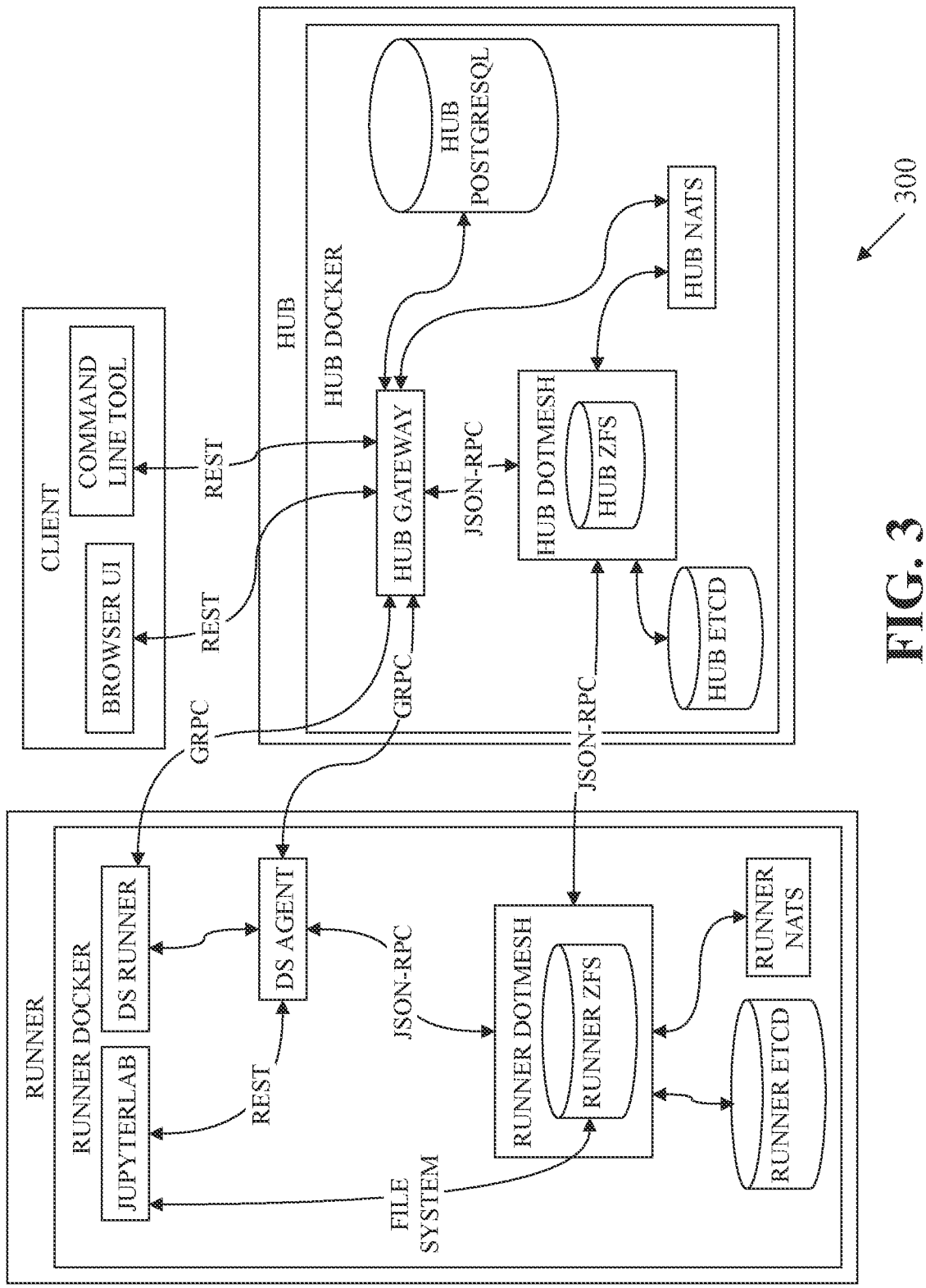
FIG. 3 is a diagram representatively illustrating elements of the system of FIG. 1.

Diagram 300 of FIG. 3 shows example elements of a system 100. In this version elements are implemented on individual DOCKER containers on the hub and runner. The containers that run a data store (for example the POSTRESQL, ETCD and ZFS containers) are represented with a database symbol, and those represented with rectangles are containers without persistent states. While several sequences of steps could occur using the system 100, one representative example is given here for illustrative purposes. A user may sign up for a user account which, in the implementation shown, is a DOTSCIENCE user account (and elements having DS in them in this drawing represent DOTSCIENCE). This may be done through a browser UI such as using software as a service (SaaS) or using a private installation on the client organization's end.

The hub is a central repository for projects (including stored runs), datasets (or pointers to, e.g., S3 or other datasets), models, and metadata. The hub provides the web UI that users log into to interact with the system. The runners are where runs (data engineering, model training, etc.) happen. Runs which generate labeled models automatically are stored to a model library of the hub and available to the user via a models interface. Requests to start workloads such as JUPYTERLAB or command-line tasks submitted via "ds run" are sent to the hub and forwarded to the runners. Runners run a lightweight scheduler as a DOCKER container which connects to the hub and requests tasks to execute (e.g., JUPYTERLAB or command-line tasks). Their storage is used for transient working state for workloads, and as a cache of workspace data from the hub. The hub tracks runner states and allows download/upload of files from the workspace data on the hub.

For this example we will assume the user's team lead previously signed up for an account and that the team lead has created a data science project using the system. The user gives his/her username to the team lead and the team lead then adds the user as a collaborator on the project. The user now has read access to the data science project and can review the history of the project to learn about its beginning, what changes have been made, and its current state. The user may also "fork" the project, creating a separate writable copy which the user may modify as desired.

User interactions with the system may occur via browser UIs implemented using the hub, though some of the UI details could be accessed through local software installed on the client end, with some UI details stored locally on the client's device. The user account and records of who owns a project, who is a collaborator, etc. may be stored in the HUB POSTGRESQL, controlled by code in the gateway responding to application programming interface (API) requests from the web UI. Actual project code and data storage, including history and project file "snapshots," may be stored in the HUB ZFS filesystem managed by the HUB DOTMESH container, with low-level metadata stored in the HUB ETCD database, and internal events such as triggering the creation of the copy scheduled via the hub's NATS queue. In implementations there is a table in the hub's POSTGRESQL DB which records actions performed by each user.

Runners are connected to the hub by starting a DOCKER container (dotscience-runner) which opens a GRPC connection to the hub and awaits instructions. The user then sends instructions to start tasks (interactive JUPYTER or ds run CLI tasks) on a runner. When the runner receives this instruction, it starts a container called the DOTSCIENCE-AGENT (DS AGENT) which synchronizes datasets and workspaces (mounted as the home directory from the perspective of the task) onto the runner.

In this example the user selects a selector using the web UI to start JUPYTERLAB. On a runner the DS RUNNER picks this request from the gateway via GRPC and starts the DS AGENT. The DS AGENT installs DOTMESH, NATS and ETCD if not already installed on the runner and then tells the runner's DOTMESH to pull the data for the project from the hub's DOTMESH into the runner's ZFS and ETCD, with the runner NATS queuing the request. The DS AGENT starts JUPYTERLAB in a container on the runner (e.g., a bundled JUPYTERLAB-TENSORFLOW container, as an example) with access to the ZFS filesystem (or, in the case of CI systems using "ds run," spawns a container with the user's specified DOCKER image).

In this example the user writes more code on the JUPYTERLAB notebook and runs it. While the code runs it writes to files and the DS AGENT detects changes appearing on disk. A component called the committer is running within the DS AGENT process and watches for new runs—in "ds run" the run metadata is written to STDOUT by the PYTHON library and picked up at the end of the run by the DS AGENT, in JUPYTER it is written into the notebook itself and saved to disk and the committer is continually watching for changes to notebook files which contain the metadata JSON written by ds.publish in the PYTHON library—either acts as a trigger. In this example a plugin in JUPYTERLAB asks the DS AGENT for its status and displays to the user through the web UI that changes to files have been detected but no run metadata is detected, so that nothing is being done yet with the changed files. Code calls the PYTHON library to record what it is doing and puts its metadata in the JUPYTERLAB notebook, which JUPYTERLAB saves to disk.

The DS AGENT detects new metadata in the notebook and the committer automatically creates a new lightweight filesystem snapshot in the RUNNER ZFS filesystem with the code, data, metadata and other metadata obtained from other sources (the environment, changed files on disk not accounted for in the metadata from the PYTHON library, etc.). DOTMESH creates the snapshot at the request of the DS AGENT. The request is queued in NATS and processed by doing a ZFS snapshot and updating the metadata cache in ETCD.

The DS AGENT instructs DOTMESH to push the snapshot up to the hub, which it does. The HUB DOTMESH stores the new data in ZFS, updates its metadata in ETCD, and so forth. The JUPYTERLAB plugin is reporting the DS AGENT'S actions to the user while this happens.

In this example the user likes the results and uses the web UI to submit a pull request. This is put into the POSTGRESQL DB on the hub, stating there is a pull request from the user's copy of the project to the original project. The team lead sees the pull request, notices the good results, and accepts the pull request. The GATEWAY handles this request by asking DOTMESH what snapshots exist in the user's project and in the original/master project, seeing that there is an extra snapshot in the user's project, and asking DOTMESH to copy it into the master project.

In implementations each project on a runner gets its own containers except for a shared DS RUNNER container created only once to manage the runner and a tunnel manager container shared between all the running agents which handles routing of HTTP requests from the end user's device to JUPYTERLAB instances on the runner. For each project the DS AGENT container is created to manage the project plus the actual workload container (e.g., JUPYTERLAB container). If a user is working on multiple projects they may be running multiple JUPYTERLAB instances on the same runner, in different containers. If a single runner is shared between members of a team running different projects a similar functionality may allow projects owned by different users to run side by side on the same runner, with one DS RUNNER container and multiple DS AGENT containers (one for each project), separate project/workload containers (e.g., JUPYTERLAB containers), etc.

Accordingly, in implementations the runner performs the following steps to perform a task: ensures the required workspace data is on the runner and up to date (if this is the first task using a workspace or dataset it is copied from the hub in its entirety, if previously pulled only the changes are downloaded); ensures the required DOCKER images for the workload are up to date on the runner (e.g., the supplied JUPYTERLAB image or the user's DOCKER image for a command-line task); if required (for JUPYTERLAB only) set up a tunnel for incoming HTTP connections to the hub to be relayed to the workload container; start the workload in its own DOCKER container with the appropriate workspace and any datasets mapped into its filesystem; monitor the workload for new runs and send them to the hub (along with a snapshot of the generated data); and, when the workload finishes (JUPYTER is stopped or the command-line task finishes) upload any final runs and output data and clear up. In implementations each runner authenticates to the hub using a unique runner token.

Because the system uses DOTMESH, which uses ZFS, it very efficiently synchronizes changes to workspaces and datasets (both of which can contain large data files) between the hub and the runners. Only the blocks that have changed on disk from one run to another need to be synchronized to the hub, and because ZFS knows which blocks have changed there is no need to scan or hash large files. ZFS can support multi-petabyte datasets and billions of files. This improves the functioning of computers performing data science tasks by reducing storage and making file transfer much quicker and easier.

Configurations for DOCKER, DOTMESH, ZFS, and KUBERNETES

DOTMESH snapshots the state of an application as it exists in DOCKERized data stores such as databases, key-value stores and message queues. It operates at the filesystem level and utilizes the ability of ZFS to support snapshotting of the live filesystem using write-ahead logs. In system 100 DOTMESH operates as a data version control system. One or more data stores are associated to a repository and each time a snapshot is taken their deltas are committed to the repository. This creates a raft of potential new workflows and operations. Whenever the state of a containerized application needs to be captured, moved, or recreated, DOTMESH supports this by providing a unified layer of abstraction via its command line tool or API endpoint. It accordingly facilitates collaboration and management of the data repositories.

The use of DOCKER, DOTMESH and ZFS to implement the systems and methods involves some problem solving. Containerization works by running processes in namespaces so each container has its own filesystem layout distinct from the filesystem as seen by the host computer. ZFS is a kernel component not subject to namespace changes, but DOTMESH runs in a container for ease of deployment. To control ZFS from inside a container, a means to compare the mount tables in the host and container filesystem namespaces was developed to work out how they relate to each other and then configure the DOTMESH server/hub container such that the crucial parts of the filesystem exist at the same locations in the container and host namespaces, in order to create the illusion to ZFS that everything is running in the host namespace.

LINUX containerization involves presenting different views of system elements to different processes. Processes running in a container need to not be able to see the entire host filesystem—the container having a filesystem of its own that it is isolated to. Each process has its own mount table recording what physical filesystem devices are available at what positions in the filesystem. The mount table is a list of what bits of actual physical storage from the hard disk are visible, as what directories, from the perspective of the process using that mount table.

A mount table with three columns will be used as an example, the columns being: (1) the path as it will appear to the process using the mount table; (2) the physical disk to store that path on; and (3) the location on that physical disk to use.

A container might have some subdirectory of the host's filesystem as its "root filesystem" into which all software from the container image is made available, on top of which the container's processes can store temporary files lost when the container is deleted. It might also have access to some data from a directory on the host, made available inside the container at some path such as "/data". The host's mount table might look like "/is/from sd0" meaning that all of the contents of sd0 (the computer's hard disk) is available at the root directory. The container's mount table might look like "/is/var/lib/docker/containers/ABCDEFG/root from sd0" and "/data is/home/user1/mydata from sd0" meaning that two different parts of the filesystem from the computer's hard disk are grafted together into a single "fake" filesystem, as seen by the container. It can't access anything outside of those two bits of sd0 it has been granted.

ZFS was not written with LINUX namespacing in mind, and using it inside containers is fraught with difficulty. Some interactions with ZFS ignore the container mount table entirely and just access files directly from sd0, which works if the mount table has an entry like "/is/from sd0" where the path structure from sd0 is used unchanged. Code using those interfaces from inside a container needs to work out the "real" paths of files they see to pass those to ZFS.

Some other interactions with ZFS do use the mount table, because they are using other parts of LINUX aware of per-process mount tables. Code using those interfaces from inside a container function properly as the paths they "see" are mapped to the correct paths properly.

Some interactions with ZFS use a mixture of both so that if the "real" host paths are used from inside a container half the operation fails, and if the "fake" container-mount-table paths are used the other half fails. In implementations this is solved in two steps. Step 1: software is written to obtain the mount table inside the container, and the mount table of the host, and cross-reference them to find paths to elements inside the container as seen by the host. For example, from the container, deducing that the seen files are actually in "/var/lib/docker/containers/ABCDEFG/root" in the example above. Step 2: a second container is created that is granted access to the directory that is needed, but using the same pathname inside the container as on the host so that the two match.

Steps 1 and 2 are useful for the above reasons and for integration of the systems and methods with KUBERNETES. KUBERNETES allows a request for access to a data storage device (e.g., an AMAZON AWS EBS volume) at a path inside a container of system 100. It implements this by mounting that device on the host at a randomly-selected location, creating a host mount table entry such as "/var/lib/kubernetes/volumes/XYZ is/from amazon-ebs-disk-1". The system 100 requests that it be mounted again into the container using a location requested by system 100, such as making the container mount table "/mydata is/from amazon-ebs-disk-1".

System 100 uses code in step 1 that looks into the container mount table to find that the EBS volume was called "amazon-ebs-disk-1", because that is what is mounted at "/mydata" where the system 100 asked for it to be mounted. It then looks in the host mount table to see that the same device is mounted at "/var/lib/kubernetes/volumes/XYZ" on the host. It then requests a second container mounting the same EBS device at the path "/var/lib/kubernetes/volumes/XYZ" inside the container. This means that the container's mount table now contains an entry of the form "/var/lib/kubernetes/volumes/XYZ is/from amazon-ebs-disk-1"—exactly the same as the host mount table. The system can now use the path "/var/lib/kubernetes/volumes/XYZ" to tell ZFS to perform functions on/with the data on that EBS volume, and the paths will be valid both from the container and host viewpoints, so that ZFS will function properly.

JUPYTERLAB Platform/Software Functions and Customizations

A JUPYTERLAB notebook includes a series of steps that might be executed from top to bottom, but the steps may also be edited individually and run in any order. In implementations the system 100 does not directly observe the user's actions in JUPYTERLAB but, when users use a provided PYTHON library, runs in JUPYTERLAB record markers that the system can find in the notebook file when it is saved, thereby extracting details about the user's action and intent.

In implementations a customized version of JUPYTERLAB is shipped to the runners, the customizations providing improved integration with the system. In implementations this involves bundling a PYTHON library, made available to the PYTHON environment where user code runs inside JUPYTERLAB. That user code calls to explain what it's doing, for example stating that particular points in the code are the start and end of a piece of computation, noting what files that computation reads and writes, recording statistics, recording comments as to the intent, etc. The metadata is recorded and passed through to the DS AGENT looking after the JUPYTERLAB instance. This allows system tracking of PYTHON and IPYTHON models.

If a user is working within a JUPYTER notebook via the system's web UI the PYTHON library is already installed (it is installed in the container that the user is executing on, on the runner). In this case no installation is needed and the user may simply "import dotscience as ds" in the notebook. If the user is using the system 100 to track data or a model whose source code is a script other than a JUPYTER notebook then the PYTHON library may be installed using a ready-made DOCKER image or by installing it from the PYTHON Package Index (PYPI), as non-limiting examples.

The customized PYTHON library allows a user to customize what is recorded about a run. The library has interactive and script modes activated by calling ds.interactive( ) or ds.script( ). The interactive mode is used when writing code in a JUPYTERLAB notebook using the web UI, but when writing code in a PYTHON script file the script mode is used.

Examples of the types of information that can be recorded about a data/model run using the system, and of some of the functions that may be performed, include the following: (1) the start and end time of a run may be recorded by calling start( ) and end( )—if end( ) is not called the system will assume the run as finished when publish( ) is called—the system will also record the start and end times of the actual execution of the workload (which is the entire script for a command workload, or the time between saves for a JUPYTER workload), which is stored separately; (2) the details of what happened when a run "failed" may be recorded by calling ds.set_error( )—for example ds.set_error ('The data wasn't correctly formatted'); (3) a description of the run may be recorded, which will later help users viewing a provenance graph, by calling ds.publish( ); (4) a declaration of what data files the run reads and writes may be recorded (to correctly track the provenance of data files) by calling ds.input( ) and ds.output( ), or declaring them explicitly with ds.add_input( ) and ds.add_output( ), or several may be declared at once with ds.add_inputs( ) and ds.add_outputs( ); (5) arbitrary labels may be attached to runs while returning the label value with ds.label( ), explicitly with ds.add_label( ), or en mass with ds.add_labels( ); (6) summary statistics (such as measurement of the performance of a run, how well a model trained, etc.) may be stored by calling ds.summary( ), explicitly with ds.add_summary( ) or en mass with ds.add_summaries( ); (7) data science often involves running the same algorithm while changing some parameters, and these input parameters may be declared to keep track of them and find the best ones by returning the parameter value with ds.parameter( ), explicitly with ds.add_parameter( ) or en mass with ds.add_parameters( ); and (8) multiple runs may be performed in a row by calling ds.start( ) at the beginning and ds.publish( ) at the end of each one. These are just examples, and other calls may be used to perform other functions.

A JUPYTERLAB plugin is shipped to the runner to provide a dynamic component in the JUPYTERLAB UI showing the status of the DS AGENT's understanding of the changes just made, such as whether there are any modified files not yet accounted for in the metadata from the PYTHON library and, when a change is spotted, whether it is finished uploading to the hub. The plugin in implementations is written in TYPESCRIPT and PYTHON.

JUPYTERLAB allows the user to run PYTHON code and stores the code its output text inside the notebook file. To record details of the runs the PYTHON library generates markers in the form of comments which are stored in the notebook as output text from running the program. These comments have a structure the DS AGENT finds when scanning the notebook for output. The DS AGENT recognizes these as comments from the PYTHON library and extracts the metadata encoded in the comments. An example of the comments generated by the PYTHON library is discussed in the below section regarding DOTMESH and run metadata. The DS AGENT picks up the comments to combine with the other data it has to produce run metadata.

DOTMESH and Run Metadata

In implementations the system defines a "run metadata format" to record the results of each data science run. This in implementations includes a mixture of automatically-obtained data (such as the date and time, the identity and capabilities of the computer the run was executed upon, what versions of what data were available to it and what output data was found after the run completed) and data provided by the user about their intentions or details the system cannot automatically determine, such as exactly what data files out of those available were actually used as inputs. Accordingly, the system may automatically monitor what it can of the user's workload by observing changes made to the data accessible to it, and may provide easy-to-use tools for the user to declare information the system cannot automatically attain. In implementations the two sources may be cross-referenced and discrepancies highlighted to aid the user in realizing when they have not correctly declared information about their workload. When the user has not declared everything or has made a declaration that contradicts system observations, the run has still happened and the system records the contradictory and incomplete data. This may complicate algorithms extracting the origin of each version of a data file to show its provenance.

The system 100 may run DOTMESH within the hub and runner containers, configured to capture snapshots from stateful DOCKER and KUBERNETES applications as "datadots" or simply "dots" and gives the ability to label, store and share them as one would with version-controlled code. Whenever the state of a containerized application needs to be captured, moved or recreated, DOTMESH supports this by providing a unified layer of abstraction via its command line tool or API endpoint. A datadot allows the user to capture an application's state and treat it like a GIT repository. An example is starting a POSTGRESQL container using a datadot called "myapp":

docker run-d-volume-driver dm \
-v myapp:/var/lib/postgresql/data--name postgres postgres:9.6.6

This creates a datadot called myapp, creates the writeable filesystem for the default master branch in the datadot, mounts the writeable filesystem for the master branch into /var/lib/postgresql/data in the POSTGRES container, and starts the POSTGRES container. Switching to it using "dm switch myapp" makes it the "current" dot, the dot which later dm commands will operate on by default. A datadot may be committed by running: dm commit-m "empty state". This creates a commit: a point-in-time snapshot of the filesystem state on the current branch for the current dot. If POSTGRESQL then writes data to the DOCKER volume this new stage can be captured in another commit with: dm commit-m "some data". There will then be two commits, frozen-in-time snapshots created from the state of the master branch at the point in time when created. DOTMESH can also define subdots, which may be thought of as different "partitions" of the master branch's writeable filesystem in the sense that they divide it up so that different containers can use different independent parts of it. Commits and branches of a datadot apply to the entire datadot, not specific subdots. This means that the datadot commits can represent snapshots of the state of an entire application, not the individual data services.

When one or more data science runs completes a commit is performed on all modified datasets to capture the generated data, and on the workspace dot itself to capture the code that was run and the fact that it was run. The workspace dot has special DOTMESH commit metadata to mark it as a data science run of system 100. Any filename or pathname recorded in this metadata is relative to the root of a mounted dot, not the root of the filesystem in the container where the workload was run. Paths use forward slash separators and do not start with a forward slash as they are all relative paths, and may not contain "." or " . . . " as any component of the path.

With regards to core data: "type=dotscience.run.v1" marks a run as a run commit of system 100; "author=ID" stores the ID of the user; "success=true" or "false" indicates whether the execution succeeded (if not specified it is assumed it did); and "message=STRING" contains an indication that the system made the commit (or an error message it if failed).

"workload.type=jupyter" marks a run as a JUPYTER workload; "workload.image=JUPYTERIMAGE" is the name of the DOCKER image running JUPYTER; "workload.image.hash=IMAGE HASH" is the hash of the DOCKER image running JUPYTER.

With regards to command runs: "workload.type=command" marks this as a command workload; "workload.image=DOCKER IMAGE NAME" is the DOCKER image the workload was executed inside; "workload.image.hash=DOCKER IMAGE HASH" is the hash of the DOCKER image the workload was executed inside; "workload. command=JSON LIST OF STRINGS" is the command executed inside the DOCKER image; "workload. environment=JSON OBJECT MAPPING STRINGS TO STRINGS" is the shell environment used when executing the command.

With regards to runner details: "runner.name=STRING" is the name of the runner instance (e.g., hostname); "runner.version=STRING" is the name of the runner software, including version number, e.g., DOTSCIENCE KUBERNETES runner v.1.2; "runner.platform=linux" is the host platform the runner ran on; "runner.platform_version=STRING" gives, in LINUX runners, the output of the "uname-a" command; "runner.cpu=JSON LIST OF STRINGS" gives the CPUs the runner used—on a LINUX runner this should be computed by the command (or an equivalent) "grep 'model name'/proc/cpuinfo sed 's/^[^:]*://'"; "runner.gpu=JSON LIST OF STRINGS" gives the GPUs the runner used; "runner.ram=INTEGER" gives the number of bytes of physical random access memory (RAM) the runner had; and "runner.ram.ecc=true" or "false" indicates, if set to true, that the runner used error correcting RAM and, if set to false, that it did not, and if not set at all that this is unknown.

With regards to execution details, logs of the workload execution are stored in a subdot of the workspace called dotscience.logs. Their names, relative to the subdot root, are stored in the JSON list given by: "exec.logs=JSON LIST OF FILENAMES". The final part of the filename (after the last /) determines the type of the log: "workload-stdout.log" stores the standard output of the workload; "workload-stderr.log" stores the standard error of the workload, and others are logs from parts of the infrastructure. In implementations a directory named after the run ID is created by the runner to store the logs, and files named as above are stored within. Further execution details are: "exec.start=YYYYMMDDTHHMMSS.SSS . . . " gives the UTC time of workload execution start; "exec.end=YYYYMMDDTHHMMSS.SSS . . . " stores the UTC time of workload execution end; "exec.cpu-seconds=FLOAT" gives the CPU-seconds consumed by the workload; and "exec.ram=INTEGER" gives the peak RAM usage of the workload in bytes.

With regards to datasets: "input-dataset.REF=ID@COMMIT" indicates the dataset with the ID, at version COMMIT, was mounted at the path REF under the current working directory when the workload executed; and "output-dataset.REF=ID@COMMIT" indicates the dataset with the ID was mounted at the path REF under the current working directory when the workload executed, and the resulting state of the dataset was committed and resulted in version COMMIT.

With regards to run details: "runs=JSON LIST OF STRINGS" gives a list of run IDs recorded in this commit, in the order of occurrence. Run IDs are arbitrary, but globally unique strings—a universally unique identifier (UUID) would be appropriate.

Metadata for each run is stored in the following properties: "run.RUN ID.authority=workload, derived, or correction" indicates the authority by which this run metadata is known. If declared directly by the workload it is set to "workload". If not provided by the workload and the execution engine derived it automatically (e.g., by recording access to the filesystem) it is set to "derived". If the workload declared one or more runs' metadata, but at the time of the commit being made, the execution engine detected access to files beyond what was declared in "workload"-authority runs, then a "correction" run is added to document the undeclared file accesses; the presence of this run inherently calls the "workload-"authority runs into question.

A commit may have either no runs, a single "derived" run (because the workload emitted no metadata), or one or more "workload" runs that the workload declared; in the latter case there may also be a single (but only one) "correction" run. It is illegal to have more than one "derived" run, a mixture of "derived" and "workload" runs, or a "correction" run without a "workload" run.

An optional description of what happened in a run may be given by "run.RUN ID.description=STRING". The name of the source file inside the workspace dot that executed this run may be given by "run.RUN ID.workload-file=FILE". If "run.RUN ID.error=STRING" is not present the run is deemed successful. If present it indicates the run failed, the STRING message explaining how. A list of which files in the workspace dot were read in the run is given by "run.RUN ID.input-files=JSON LIST". Each element in the JSON list is of the form FILENAME@COMMIT; the FILENAME is the full path from the root of the workspace dot, and COMMIT is the commit of the workspace dot where the file was last written to. As filenames could contain '@' symbols but commit IDs cannot, the string after the final '@' symbol should be considered the commit ID. Only data files should be listed—source code files or reference data files implicitly read as "part of the workload," as opposed to input files, need not be listed. The distinction between the two may not be clear, so judgement must be applied.

A list of which files in the workspace dot were written in the run is given by "run.RUN ID.output-files=JSON LIST". Each element in the JSON list is a filename relative to the root of the workspace dot. Unlike "run.RUN ID.input-files," these do not have commit IDs because the changed files are being written to the workspace dot that the metadata is being committed to (so the commit ID is not known at the time the metadata is written).

A list of which dataset files mounted at REF were read in the run is given by "run.RUN ID.dataset-input-files.REF=JSON LIST". The format is as per the "run.RUN ID.input-files": a list of elements of the form FILENAME@COMMIT, where FILENAME is relative to the root of the dataset and COMMIT is the commit of that dataset where the file was last written to.

A list of which dataset files mounted at REF were written in the run is given by "run.RUN ID.dataset-output-files.REF=JSON LIST". Each element in the JSON list is a filename relative to the root of the dataset. As with "run.RUN ID.output-files", commit IDs are not recorded for the dataset output files—they are recorded in the commit identified by "output-dataset.REF=ID@COMMIT". That ID could be duplicated into every entry in this list, but it would be redundant and inconsistent with "run.RUN ID.output-files". Arbitrary "key=value" labels for the run are given by "run.RUN ID.label.KEY=VALUE".

If some of run outputs are independently packageable built "artefacts" that could be deployed into an environment they can be so labeled to enable deployment automation. For example, if the run produces an ML model, model file(s) can be labeled as an artefact by "run.RUN ID.label.artefact: NAME=JSON OBJECT" so it could be deployed into production. "TYPE=TENSORFLOW-MODEL" gives the model type, the example given here is a TENSORFLOW model. The "FILES=JSON OBJECT" field lists all the files comprising the built artefact. The keys of the JSON object depend on the type of model, and the values are paths relative to the workspace root which can refer to files or entire subdirectories. The files may be in the workspace or a dataset; the list of dataset mount prefixes in run metadata may be consulted to locate them. All files referenced in a build artefact created by this run should be listed as outputs using the appropriate "run.RUN ID.output-files" or "run.RUN ID.dataset-output-files.REF" fields, but files listed in a model do not need to be listed as outputs—they may be present in the relevant dots already and not generated by this run, but still part of the model (e.g., static configuration files or files generated by prior runs not changed by this run). For TENSORFLOW models the keys in the JSON object are: "model", referring to the main model files; and "classes", referring to the "classes.csv" file.

There may be other metadata depending on the artefact type. The artefact type may declare arbitrary other keys. For TENSORFLOW (TF) models a "version" field is expected whose contents are a string containing the TF version. A label declaring a TF model called "roadsigns" might be: run.02ecdc67-c49e-4d76-abe8-1ee13f2884b7.label.artefact: roadsigns={"type":"tensorflowmodel", "files": {"model": "output","classes":"classes.csv"},"version":"1.14.0"}.

Summary statistics, used to drive the leaderboard/EXPLORE UI, are given by "run.RUN ID.summary.KEY=VALUE". "run.RUN ID.parameters.KEY=VALUE" records an input parameter. "run.RUN ID.start=YYYYMMDDTHHMMSS.SSS . . . "

records UTC start time of the run. "run.RUN ID.end=YYYYMMDDTHHMMSS.SSS . . . " records UTC end time.

Any datasets modified by runs in the commit must also be committed, before the workspace dot is committed; the dataset commit IDs are recorded in the "run.RUN ID.dataset-output-files.REF" metadata key. The following metadata must be attached to the dataset commits referenced by a version 1 run metadata record: "type=dotscience.run-output.v1" marks that the commit is a result of a DOT-SCIENCE/system 100 run that recorded using version 1 of the metadata format; the ID of the workspace dot is given by "workspace=ID OF WORKSPACE DOT". A list of files modified as part of the run with the given ID is given by: "run.RUN ID.dataset-output-files=JSON LIST OF FILES". Only files in this dataset are listed. The entries in the JSON lists are paths to files relative to the root of the dataset. The RUN ID must match a RUN ID specified in the metadata of the workspace dot commit referring to this dataset commit.

The workload may output metadata incorporated into the metadata commit. Each run included in the commit is recorded by the workload as a single JSON document, which must be output to its standard output stream (for a command workload) or into the notebook (for a JUPYTER workload), encoded in UTF8, in the following structure, which must come immediately after a newline (defined as a UNIX-style line feed character, or a Windows-style carriage return then line feed pair): "PREFIX[[DOTSCIENCE-RUN:RUN ID]] PSON[[/DOTSCIENCE-RUN:RUN ID]]" or, when necessary, the following structure: "PREFIX[[DOTSCIENCE-RUN-BASE64:RUN ID]] JSON ENCODED IN BASE64 [[/DOTSCIENCE-RUN-BASE64:RUN ID]]".

If newlines (UNIX or WINDOWS-style) occur within the JSON or JSON ENCODED IN BASE64 sections, and the string PREFIX follows that newline, the entire "newline+ PREFIX" group is considered a single newline. This allows correct embedding of run metadata in output streams that automatically prefix every line, or the use of line comment prefixes (such as # or // in many languages) to escape them from other processing. No extra whitespace is allowed in the [[ . . . ]] headers and footers, as they are matched exactly on a byte-for-byte basis. Implementations are encouraged to use newlines and other non-significant whitespace, as allowed within JSON, to make JSON human readable. Implementations using the first form are responsible for choosing a RUN ID such that the string [[/DOTSCIENCE-RUN:RUN ID]] does not occur inside the JSON.

With regards to the content of the metadata JSON, in implementations the metadata JSON must be a JSON object with the following keys: "version=1" declares this metadata to use version 1 of the metadata specification; "error=STRING" indicates how the run failed, if not present the run succeeded. An optional description is given by "description=STRING". An optional declaration of the source file executing the run, relative to the workspace dot, is given by "workload-file=STRING". The system attempts to deduce it if missing.

A list of filenames read by this run, relative to the workspace dot, is given by "input=JSON LIST"; however, if the first component of the path is the REF of a dataset, then the file comes from within that dataset rather than the workspace dot. A list of filenames that were written by this run, relative to the workspace dot, is given by "output=JSON LIST"; however, if the first component of the path is the REF of a dataset, then the file comes from within that dataset rather than the workspace dot. "labels=JSON OBJECT" is an object mapping string label names to label value strings, storing arbitrary key=value labels for this run. "summary=JSON OBJECT" is an object mapping string summary-statistic names to value strings, recording the quantitative success of the run. "parameters=JSON OBJECT" is an object mapping string parameter names to value strings, recording input parameters to the run. The time that execution of the run started, in UTC, is given by "start=YYYYMMDDTHHMMSS.SSS". The time that execution of the run ended, in UTC, is given by "end=YYYYMMDDTHHMMSS.SSS".

As an example of data science runs performed using system 100 and associated metadata, an example is given of workspace dot A. The user requests to run a command that reads from dataset B (with a REF of "b"), modifies (reads and writes back to) dataset C (with a REF of "c"), and writes to dataset D (with a REF of "d"), as well as interacting with some data files in the workspace dot. This results in commits to the workspace dot A, and datasets C and D; there is no commit on dataset B as it was only read from. Metadata output by this workload is written in the non-base64 style, with a prefix of #. Two runs occurred, which read and wrote the same files (they ran the same code producing the same description), but with a different input parameter resulting in different summary statistics. Semicolons are added to indicate new lines: # [[DOTSCIENCE-RUN:02ecdc67-c49e-4d76-abe8-1ee13f2884b7]]; # {; # "version": "1"; # "description": "Curve fit"; # "input": ["foo.csv", "b/input.csv", "c/cache.sqlite"]; # "output": ["log.txt", "c/cache.sqlite", "d/output.csv"]; # "labels": { }; # "parameters": {"smoothing": "1.0"}; # "summary": {"rms_error": "0.057"}; # "start": "20181004T130607.225"; # "end": "20181004T130608.225"; # }; # [[/DOTSCIENCE-RUN: 02ecdc67-c49e-4d76-abe8-1ee13f2884b7]]; # [[DOTSCIENCE-RUN:cd351be8-3ba9-4c5e-ad26-429d6d6033de]]; # {; # "version": "1"; # "description": "Curve fit"; # "input": ["foo.csv", "b/input.csv", "c/cache.sqlite"]; # "output": ["log.txt", "c/cache.sqlite", "d/output.csv"]; # "labels": { }; # "parameters": {"smoothing": "2.0"}; # "summary": {"rms_error": "0.123"}; # "start": "20181004T130608.579"; # "end": "20181004T130609.579"; # }; # [[/DOTSCIENCE-RUN: cd351be8-3ba9-4c5e-ad26-429d6d6033de]].

The commit created on A (workspace dot) is as follows (with added semicolons indicating new lines): type=dotscience.run.v1; author=452342; date=1538658370073482093; workload.type=command; workload.image=busybox; workload.image.hash= busybox@sha256:2a03a6059 f21e150ae84b097386360 9494aad70f0a80eaeb64bddd8d92465812; workload. command=["sh","–c","curl http://localhost/testjob.sh|/bin/sh"]; workload. environment={"DEBUG MODE": "YES"}; runner.version=Runner=Dotscience Docker Executor rev. 63db3d0 Agent=Dotscience Agent rev. blacc85; runner.name=bob; runner.platform=runner.platform_version=Linux a1bc10a2fb6e 4.14.60 #1-NixOS SMP Friday August 3 05:50:45 UTC 2018; x86_64 GNU/Linux; runner-.ram=16579702784; runner.cpu=["Intel(®) Core(™) i7-7500U CPU @ 2.70 GHz", "Intel(®) Core(™) i7-7500U CPU @ 2.70 GHz", "Intel(®) Core(™) i7-7500U CPU @ 2.70 GHz", "Intel(®) Core(™) i7-7500U CPU 2.70 GHz"]; exec.start=20181004T130607.101; exec.end=20181004T130610.223; exec.logs=["16204868-ae5a-4574-907b-8d4774aad497/agent-stdout.log", "16204868-ae5a-4574-907b 8d4774aad497/pull-workload-stdout.log","16204868-ae5a-4574-907b-8d4774aad497/ workload stdout.log"]; input-dataset.b=<ID of dot B>@<commit ID of dot B before the run>; input-dataset.c=<ID of dot C>@<commit ID of dot C before the run>; output-dataset.c=<ID of dot C>@<commit ID of dot C created by this run>; output-dataset.d=<ID of dot D>@<commit ID of dot D created by this run>; runs= ["02ecdc67-c49e-4d76-abe8-1ee13f2884b7", "cd351be8-3ba9-4c5e-ad26-429d6d6033de"; "31df506d-c715-4159-99fd-60bb845d4dec"]; run.02ecdc67-c49e-4d76-abe8-1ee13f2884b7.authority=workload; run.02ecdc67-c49e-4d76-abe8-1ee13f2884b7.input-files=["foo.csv@<some earlier commit ID of workspace dot>"]; run.02ecdc67-c49e-4d76-abe8-1ee13f2884b7.dataset-input-files.b= ["input.csv@<some earlier commit ID of b>"]; run.02ecdc67-c49e-4d76-abe8-1ee13f2884b7.dataset-input-files.c=["cache.sqlite@<some earlier commit ID of c>"]; run.02ecdc67-c49e-4d76-abe8-1ee13f2884b7.output-files= ["log.txt"]; run. 02ecdc67-c49e-4d76-abe8-1ee13f2884b7.dataset-output-files.c=["cache.sqlite"]; run.02ecdc67-c49e-4d76-abe8-1ee13f2884b7.dataset-output-files.d=["output.csv"]; run.02ecdc67-c49e-4d76-abe8-1ee13f2884b7.summary.rms_error=0.057; run.02ecdc67-c49e-4d76-abe8-1ee13f2884b7.parameters.smoothing=1.0; run.02ecdc67-c49e-4d76-abe8-1ee13f2884b7. start=20181004T130607.225; run. 02ecdc67-c49e-4d76-abe8-1ee13f2884b7.end=20181004T130608.225; run.cd351be8-3ba9-4c5e-ad26-429d6d6033de.authority=workload; run.cd351be8-3ba9-4c5e-ad26-429d6d6033de.input-files=["foo.csv@<some earlier commit ID of workspace dot>"]; run.cd351be8-3ba9-4c5e-ad26-429d6d6033de.dataset-input-files.b= ["input.csv@<some earlier commit ID of b>"]; run.cd351be8-3ba9-4c5e-ad26-429d6d6033de.dataset-input-files.c=["cache.sqlite@<some earlier commit ID of c>"]; run.cd351be8-3ba9-4c5e-ad26-429d6d6033de.output-files=["log.txt"]; run. cd351be8-3ba9-4c5e-ad26-429d6d6033de.dataset-output-files.c=["cache.sqlite"]; run.cd351be8-3ba9-4c5e-ad26-429d6d6033de.dataset-output-files.d=["output.csv"]; run.cd351be8-3ba9-4c5e-ad26-429d6d6033de.summary.rms_error=0.123; run.cd351be8-3ba9-4c5e-ad26-429d6d6033de.parameters.smoothing=2.; run.cd351be8-3ba9-4c5e-ad26-429d6d6033de.start=20181004T130608.579; run.cd351be8-3ba9-4c5e-ad26-429d6d6033de.end=20181004T130609.579; run.31df506d-c715-4159-99fd-60bb845d4dec.authority=correction; run.31df506d-c715-4159-60bb845d4dec.description=File changes were detected that the run metadata did not explain; run.31df506d-c715-4159-99fd-60bb845d4dec.output-files=["mylibrary.pyc"].

As B is only used as an input, nothing was changed so there is no commit. The version of B that was used is still recorded in the workspace dot commit above. A commit was created on C. The ID of this commit is recorded in output.c in the workspace dot commit as indicated below (with added semicolons indicating new lines): type=dotsciencesun-output.v1; workspace=<ID of dot A>; run.02ecdc67-c49e-4d76-abe8-1ee13f2884b7.dataset-output-files= ["cache.sqlite"]; run.cd351be8-3ba9-4c5e-ad26-429d6d6033de.dataset-output-files=["cache.sqlite"]. A commit was created on D. The ID of this commit is recorded in output.d in the workspace dot commit as indicated below (with added semicolons indicating new lines): type=dotscience.run-output.v1; workspace=<ID of dot A>; run.02ecdc67-c49e-4d76-abe8-1ee13f2884b7.dataset-output-files=["output.csv"]; run.cd351be8-3ba9-4c5e-ad26-429d6d6033de.dataset-output-files=["output.csv"].

The workload may output metadata declaring runs and what files were read/written, and the execution engine may monitor the runtime environment to observe the workload's behavior. The two may or may not tally. There are three interesting cases. Case 1: A run happens and outputs no metadata because it has not been annotated. In this case a single run commit is generated with the behavior that can be observed, with the run's authority property set to derived. Case 2: A fully instrumented run happens and clearly records everything it did in its metadata prints and this corresponds exactly to what was observed. In this case the run metadata provided by the workload is recorded, with the run's authority properties set to workload. Case 3: Similar to Case 2, except a few things are missed and extra accesses to files are observed. The run metadata provided by the workload is recorded, with the run's authority properties set to workload, then an extra run (with a new UUID) is created, added to the end of the run list, listing all the otherwise unaccounted-for accesses, with authority set to correction.

The system 100 traces the provenance of files, i.e., allowing the user to know how a file in a dot came to be. The dot may be a dataset or a workspace dot. In either case, the user can read back through the commits on that dot to find the most recent commit (not including commits after the commit containing the version of the file that is being traced) containing metadata recording a write to that file. This will give the ID of the run that created that file. The workspace dot commit containing that run must then be found. If the file was in a workspace dot it is already found; if in a dataset, the workspace property of the commit needs to be read to find the ID of the workspace dot and walk its commit history to find the run (which should be cached in an index).

Given the workspace dot commit and the run ID, the full metadata of the run can be extracted—including the commit IDs of all dots that went into it and the lists of files read from them. These can then be recursively examined using this algorithm to find their provenance, until the trail runs dry; at that point, the entire provenance tree of that file has been extracted.

Data Runs and Model Runs

Figure 4:
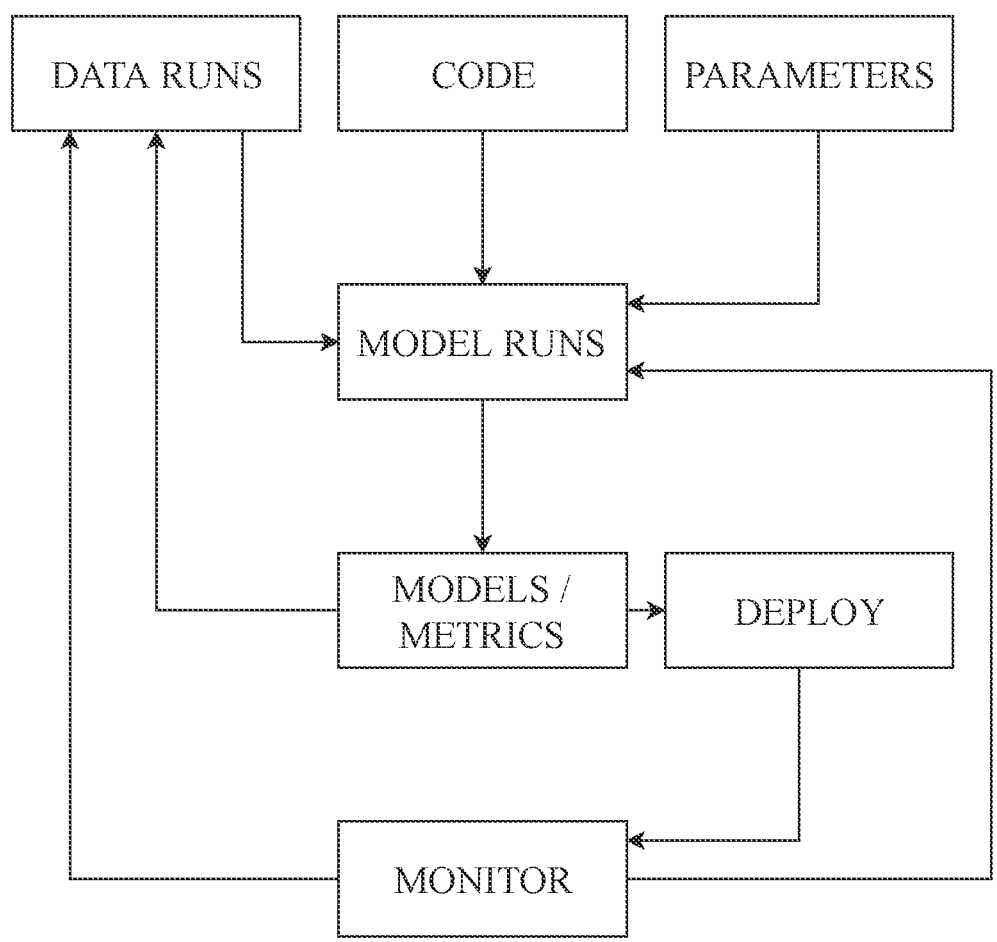
FIG. 4 is a diagram illustrating methods implemented using the system of FIG. 1.

Referring now to FIG. 4, a diagram 400 representatively illustrates methods implemented using system 100. In normal DEVOPS for software development code is tested, deployed, monitored, edited, retested, redeployed, etc. Machine learning includes more elements, however, including input and intermediate datasets, code, parameters, and models. Accordingly, system 100 tracks "runs" of both datasets and models. Herein these are called, respectively, data runs and model runs. Data runs may, for example, use input raw data and output training data to be used to train a machine learning model. Each run executed in system 100 bundles together the complete context that went into creating an intermediate dataset or a model, including data, code, parameters, who performed the run and when, where the data is stored, etc.

FIG. 4 representatively illustrates that one or more data runs may be performed, the output of the one or more runs being used to later perform one or more model runs (such as by training an ML model using the output of a data run). The data runs are used to modify an input dataset or use only one or more portions of the dataset to perform a model run. Code and parameters are also used to perform the model runs. One or more model runs are performed, and output from this are one or more ML models and metrics. This process may be repeated numerous times to obtain different models with different characteristics, and numerous data runs may also be performed at any time so that the user may utilize an iterative, experimental approach. All the while that the data runs and model runs are being performed, the system 100 is tracking each individual run. At any point a model may be deployed and then monitored, such as using statistical monitoring methods, as will be described hereafter. The monitoring may reveal issues with the deployed model or improvements that can be made and additional data runs and/or model runs may be performed, as desired, to continue improvement of the model. The ability of the system 100 to track the provenance of all data runs and model runs allows users to, for any given run, determine the parameters, input data, etc., that went into the run.

As indicated above, the system tracks data science data runs. Data runs include data engineering such as processing raw data to generate training data. This may include selecting only a subset of the raw data or otherwise modifying it. As raw data is processed, features engineered, and samples annotated with labels, every data version is recorded and made available for model development with full provenance. This allows a single user or team of users to have no issue determining which data was used to train a given model.

Once the data is annotated and ready to start building models, the system 100 tracks model runs. This allows optimal team productivity with shared knowledge to eliminate silos. It removes key person risk by making it easy for anyone to pick up where another left off. While executing model runs the user may return to perform additional data runs. Once the user has a model with desired features that appears to be accurate it may be deployed. The system 100 may be used to host models in production and/or may integrate into an existing DEVOPS stack. The system allows users to place models into production faster and keep them performing reliably. The user is also alerted to issues faster with statistical monitoring to guarantee fixes are working with forensic provenance tracking. After deployment the user may again return to perform additional data runs and/or model runs as needed.

Data run types may include any data ingestion/importing or manipulation discussed herein and may further include cleaning data (removing irrelevant/inaccurate/incomplete rows or columns not needed), anonymization (removing/obfuscating personal data); pre-processing; merging datasets; summarizing (e.g., a list of events is given but what is needed are frequency of events so events are counted per time period); analysis (extracting statistics as an end in itself or a check to see if input data looks as expected), etc. Analyzing data may create an output file in the form of a set of discrete statistics (e.g., "Total sales recorded: 109; Total value: $15,000; Unique customers: 57"), a table of data (e.g., showing total sales, total value and customer count per region) or a chart. The data analysis may or may not generate a file, but if a file is generated it may be for example tabular data, such as a CSV file, or a chart.

Example System Methods And UIs—Hello, Dotscience! Example

Data science methods implemented using the system 100, which have been described to some extent above, will now be described in more detail by making reference to a number of UIs displayed on the one or more end user devices. FIG. 5 shows an interface which may be arrived at after a sign-in page. The sign-in page may include fields for a user to sign in with a third-party account such as a GITHUB account, and may also allow a user to sign in using a username, email address and/or password. After logging in the user may be brought to an interface such as (or similar to) interface 500 of FIG. 5.

On interface 500 it is seen that menu items along the top allow a user to select between a projects interface, a datasets interface and a docs interface. The datasets interface allows the user to add one or more datasets such as, by non-limiting example, an AMAZON S3 dataset. The docs interface takes the user to a landing page with links for the user to find information about the system 100 and its capabilities, how it functions, how to properly operate within it, etc. In implementations a resources page may allow a user to upload files to the hub, but for large files the user may also be able to load the files using an API, secure copy (SCP) or wget (from the web), or another command line method in an open terminal in JUPYTERLAB.

Figure 6:
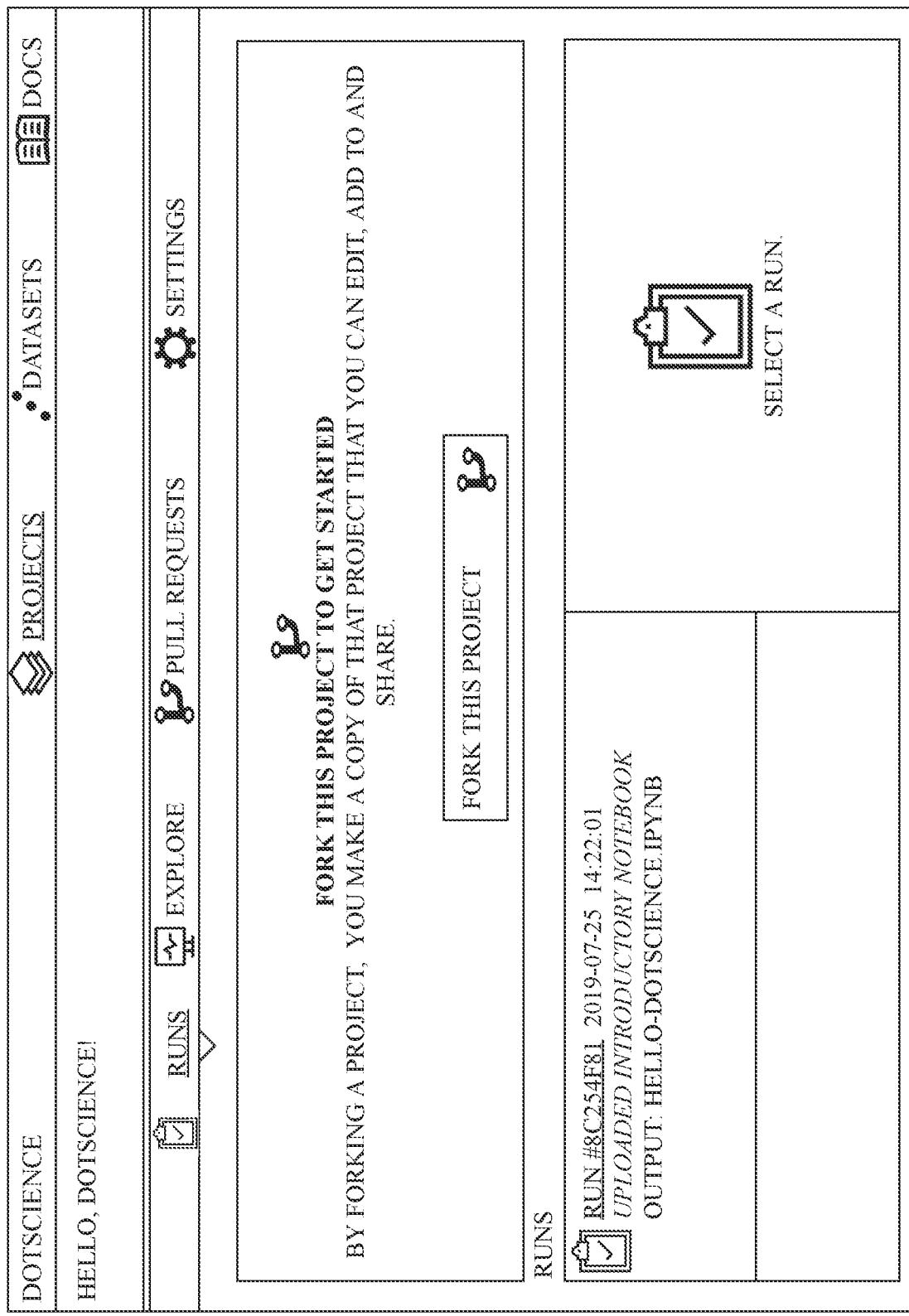
FIG. 6 is an implementation of another UI of the system of FIG. 1.

In FIG. 5 the user is on the projects interface which shows a list of all projects to which the user has access. The user in this case has no projects, including no shared projects. There is a public project listed, however, which is called "HELLO, DOTSCIENCE!" and which is a read only project owned by "ADMIN." The user may select the "HELLO, DOTSCIENCE!" link to "fork" this project. Forking a project in this disclosure means creating a read/write copy of the project so that the user can then make edits to the copy. Selecting the "HELLO, DOTSCIENCE!" link in this implementation brings up a runs interface such as (or similar to) interface 600 of FIG. 6. The "HELLO, DOTSCIENCE!" title of the project is seen at the top of the interface. The runs interface includes menu items along the top allowing a user to select RUNS, EXPLORE, PULL REQUESTS and SETTINGS. The user is currently on the RUNS tab (to display the runs interface), and it is seen on the bottom left that one run has been recorded for this project, which was the uploading of an introductory notebook so that the output was a notebook titled HELLO-DOTSCIENCE.IPYNB. The date and time of the run are listed, and the run has a unique identifier shown as well (RUN #8C254F81). The user may select the run to see more details.

Figure 7:
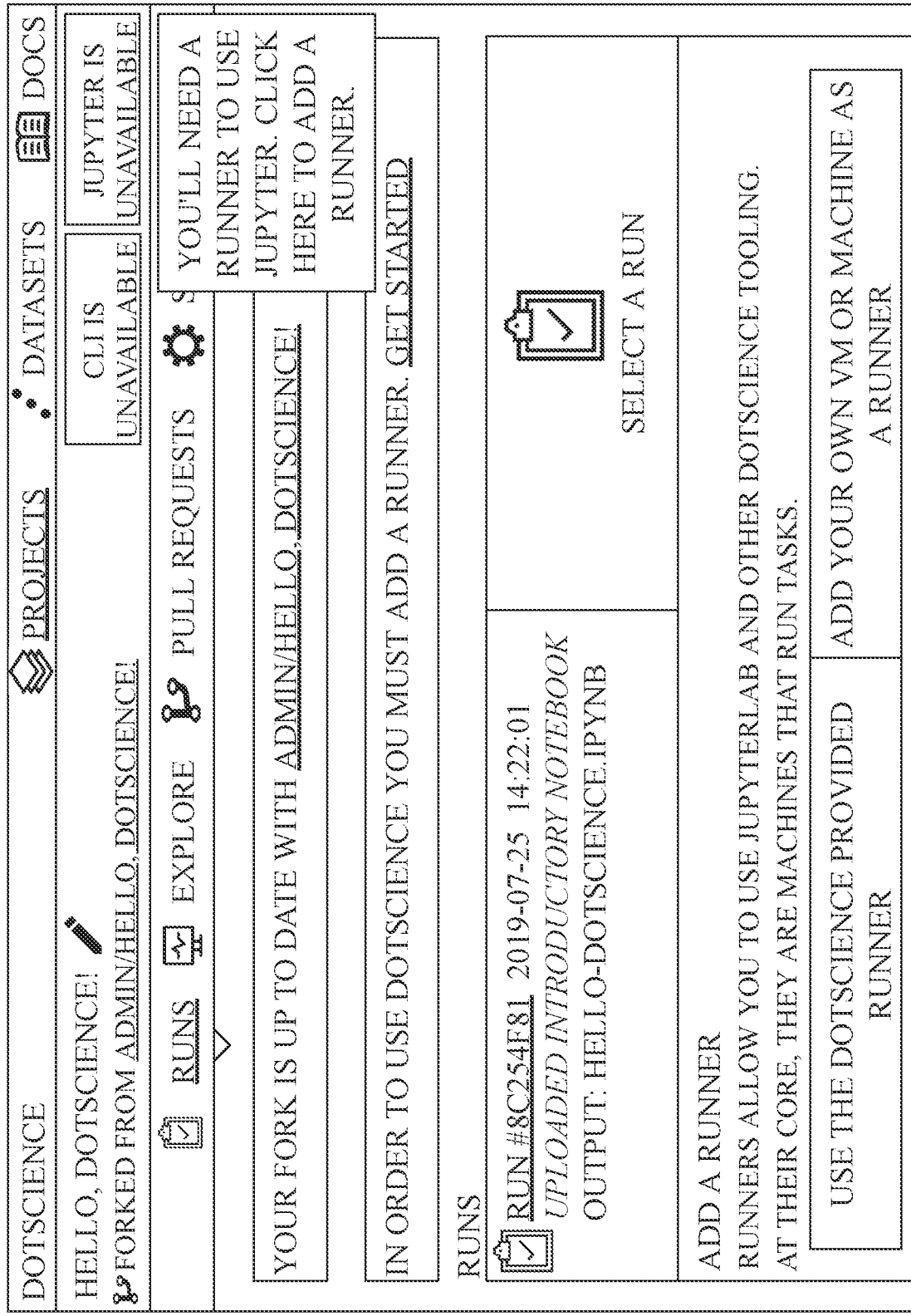
FIG. 7 is an implementation of another UI of the system of FIG. 1.
Figure 8:
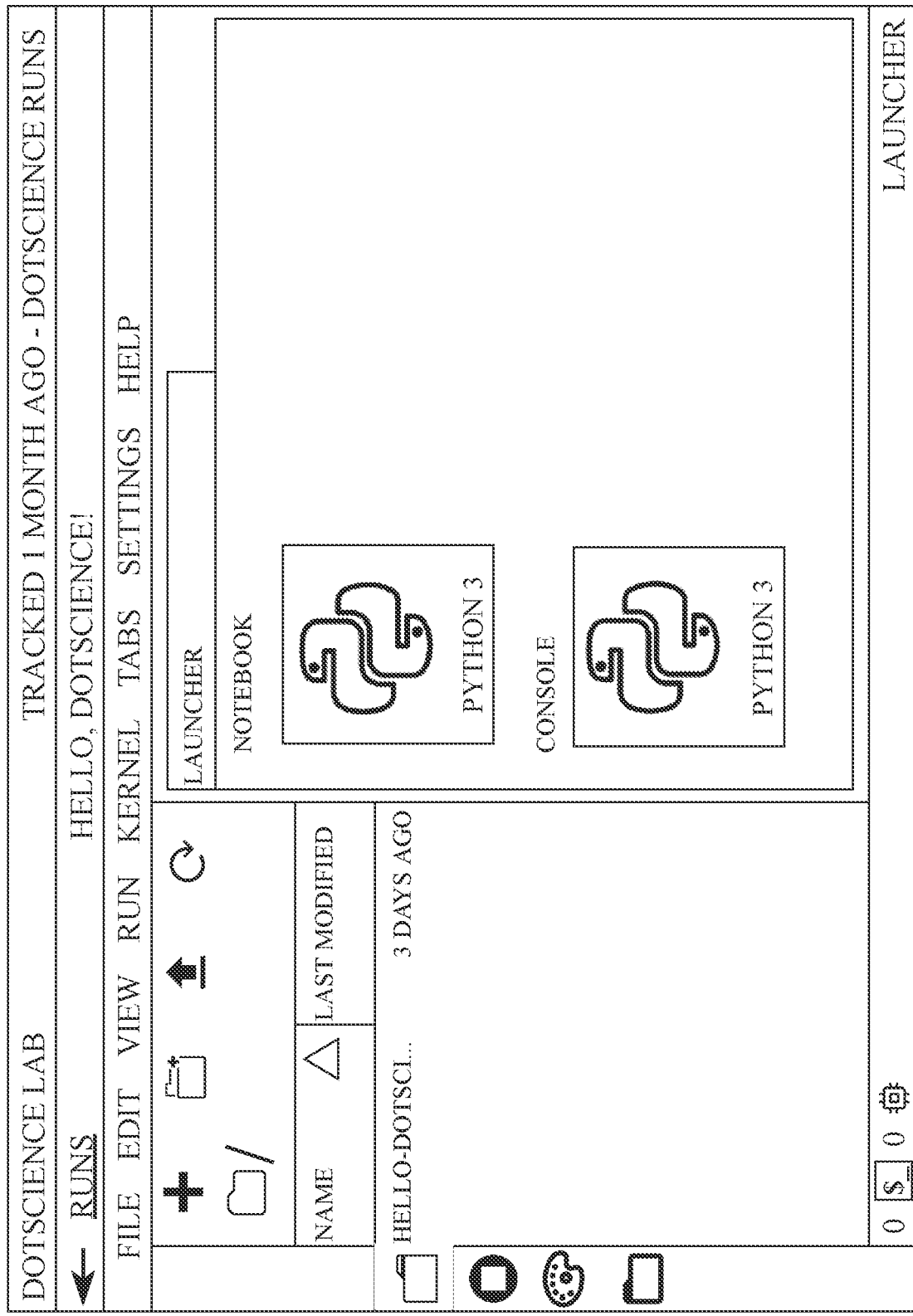
FIG. 8 is an implementation of another UI of the system of FIG. 1.

In the middle of interface 600 is a section discussing creating a fork of the project. The description indicates to the user that forking the project includes creating a copy that can be edited, added to and shared. A "FORK THIS PROJECT" selector is shown which, when selected, brings the user back to the projects interface 500 except that a "HELLO, DOTSCIENCE!" project is then listed in the "YOUR PROJECTS" section. The user may click on this project to then bring up an interface such as (or similar to) the runs interface 700 of FIG. 7.

Interface 700 includes the "HELLO, DOTSCIENCE!" title at the top except now with an edit selector that the user could select to give this forked project a new name, if desired. In this case the user is going to leave the name as is. An indicator below the title indicates that this project was forked from ADMIN/HELLO, DOTSCIENCE! The user in this case is still on the runs interface. A section shows that the fork is up to date with ADMIN/HELLO, DOTSCIENCE! A RUNS section shows the run that was previously discussed, which is the uploading of an introductory notebook.

Another section states that in order for the user to use the system 100 to record data science runs the user must add a runner, and the user may select GET STARTED to add a runner. Selectors at the top right show that command line interface (CLI) and JUPYTER are currently unavailable. A popup states that the user will need to add a runner to use JUPYTER, and the user may click within this section to add a runner as well. At the bottom of interface 700 is an ADD A RUNNER section with an explanation that runners allow the user to use JUPYTERLAB and other system tooling, and that the runners are machines that run tasks. A first selector allows the user to use a system-provided runner to do data runs and model runs. A second selector allows the user to add their own machine or virtual machine as a runner, so that the user can select whatever machine they want to perform the runs. This allows a user to bring their own computing elements to a data science project if desired. The UIs which are described herein are all provided to the user via the hub, as described with respect to FIGS. 1-3, while the machine learning and model training occur on the runners of system 100.

In this representative example the user chooses to use the system provided runner, and when selected the system provides a GOOGLE CLOUD virtual machine linked with the user's account so that the user can perform data science runs. While the VM runner is being set up a new window appears (not shown) which displays a unique identifier for the runner (which may be a system-assigned identifier stored in the one or more databases), a status (for example "provisioning runner"), a connection indicator (for example "connecting to DOTSCIENCE" or in other words connecting to the hub), a compute indicator (for example CPU or GPU), and a storage indicator (for example "10 GB"). The provided VM in this implementation will have DOCKER installed and will automatically start the DOTSCIENCE runner container which connects to the hub to receive instructions. After the runner container is connected to the hub the window shows a status of ONLINE and a connection indicator of CONNECTED. Once this is done, the JUPTYER IS UNAVAILABLE selector switches to a JUPYTER IS AVAILABLE selector (which may or may not include a nested "OPEN" selector) and the CLI IS UNAVAILABLE selector similarly switches to a CLI IS AVAILABLE selector (which may or may not include a nested "START" selector).

In the representative example the user selects the JUPYTER IS AVAILABLE selector (or in implementations the nested "OPEN" selector). A new window or section (not shown) will display log messages as the runner JUPYTERLAB container is starting. After a few seconds a notebook interface such as (or similar to) interface 800 is displayed. The project title is displayed at the top of this interface along with a RUNS selector which allows the user to return to the runs interface. A menu bar shows FILE, EDIT, VIEW, RUN, KERNEL, TABS, SETTINGS, and HELP selectors which may be selected to provide various functions. Below this menu bar are additional selectors including a selector for adding a document, adding a folder, uploading an item, and refreshing the interface. A path indicator also shows the path of the currently selected document or folder (in this case no document is selected and the path is empty). A left side tab menu has selectable tabs to display folders, along with other tabs including a DOTSCIENCE tab. The folders tab is currently selected and the HELLO-DOTSCIENCE.IPYNB folder is listed as an available folder, along with an indication that it was last modified 3 days ago. On the right side of the interface a LAUNCHER tab is also displayed which includes NOTEBOOK and CONSOLE selectors. To the extent that the notebook interfaces disclosed herein may be used for data engineering they may be termed data engineering interfaces.

Figure 9:
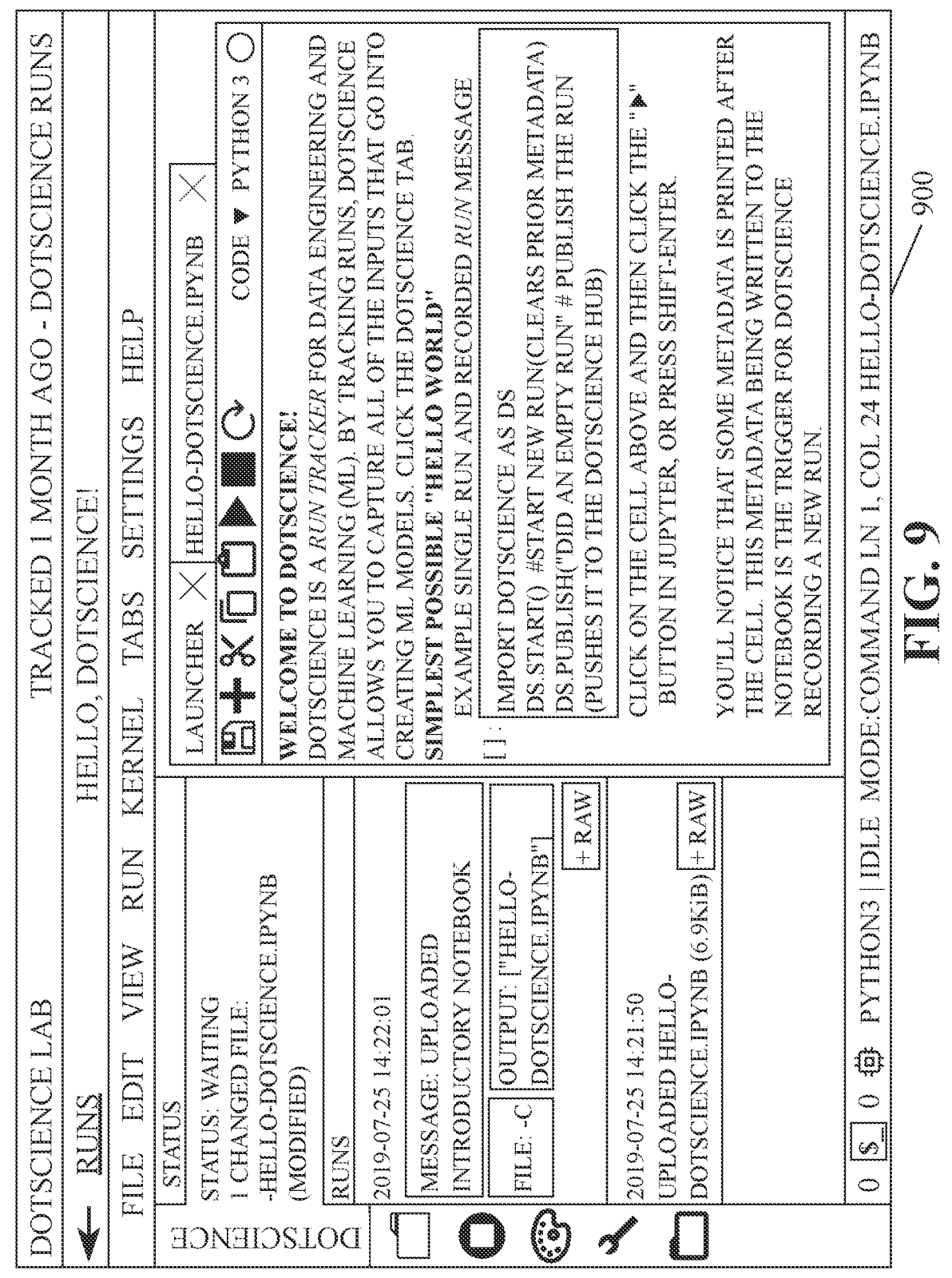

The user may select the HELLO-DOTSCIENCE.IPYNB folder and a new tab will appear displaying that notebook next to the LAUNCHER tab, as shown in notebook interface 900 of FIG. 9. In this view the user has also selected the DOTSCIENCE tab of the left menu. The DOTSCIENCE tab shows the JUPYTER plugin items that were discussed to some extent above. For example, A STATUS section shows files that have changed and whether they have been recorded/uploaded to the hub from the runner. System 100 automatically detects and versions these files when a run is performed—automatically versioning the file system helps to make all data science runs reproducible. Presently the status is WAITING and there is an indication of one changed file. A RUNS section includes a list of runs that the system 100 has and/or is recording (by uploading to the hub and storing data in the one or more DBs) and associated messages, outputs, file locations, and links to raw data.

In the HELLO-DOTSCIENCE.IPYNB tab there are a number of menu items including SAVE, ADD, CUT, COPY, PASTE, RUN, STOP and REFRESH selectors. There is also a code indicator and a PYTHON 3 indicator which indicates whether PYTHON 3 is idle or active (currently it is idle indicated by an empty circle, whereas when active it is a filled circle, and an indication at the bottom of the interface also the PYTHON status). At the bottom of the interface are also displayed a mode, a location within the notebook (LN 1, COL 24) and the notebook title. The notebook is a JUPYTERLAB or IPYTHON notebook having an IPYNB file type.

As indicated previously, the system operates using "runs" of data and of models. The notebook tab of FIG. 9 states that the system is a "run tracker" for data engineering and machine learning that allows the user to capture all of the inputs that go into creating ML models. An example run is provided in the notebook, which is a "HELLO WORLD" run. This is simply an empty run that may be recorded. The cell that may be run in JUPYTER includes the following lines (with added semicolons indicating new lines): IMPORT DOTSCIENCE AS DS; DS.START( )#START NEW RUN(CLEARS PRIOR METADATA); DS.PUBLISH ("DID AN EMPTY RUN") #PUBLISH THE RUN (PUSHES IT TO THE DOTSCIENCE HUB).

Figure 10:
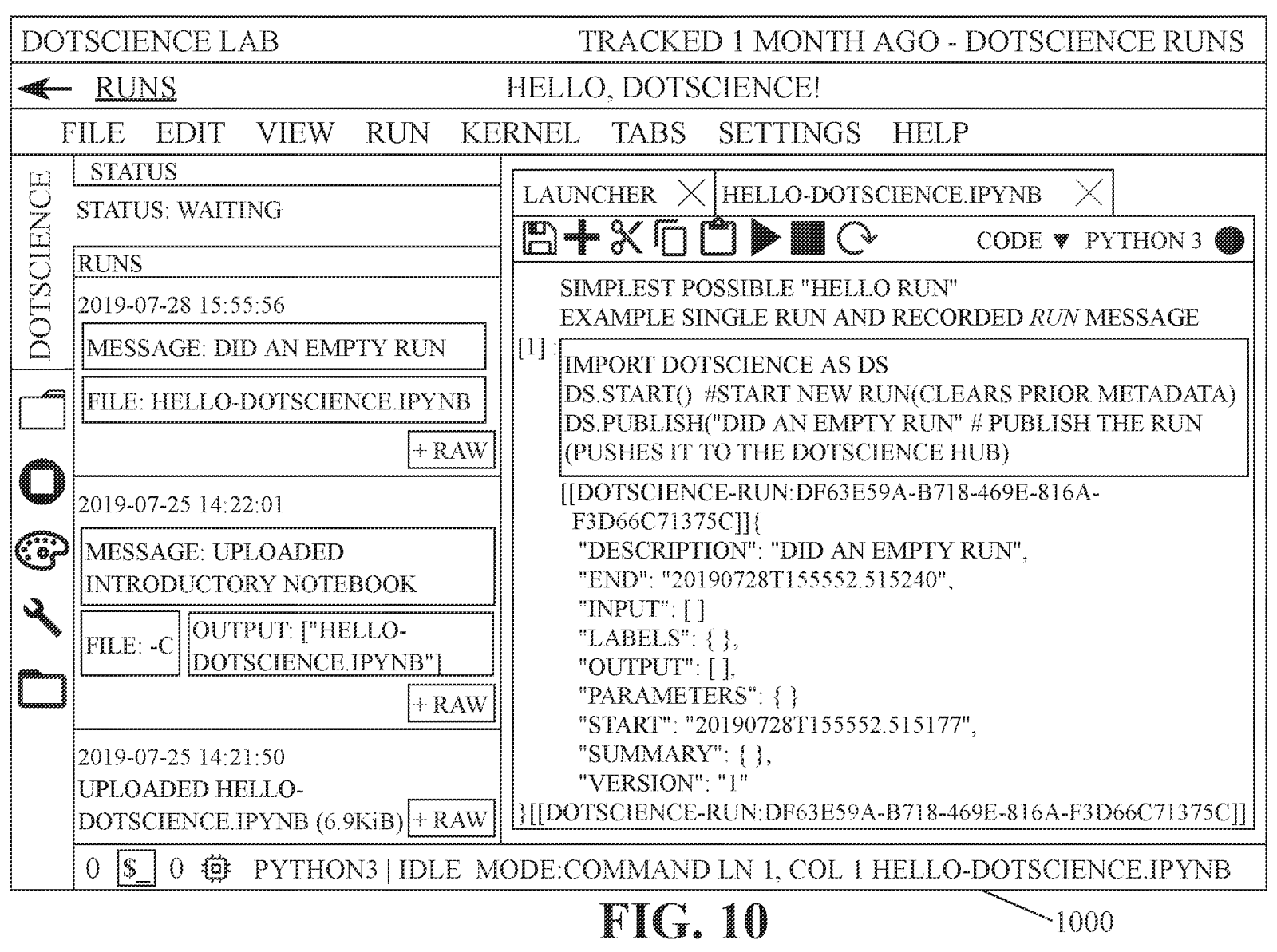

This run simply imports the DOTSCIENCE PYTHON library, starts a new run, and then publishes the run. The user may click on the cell and click the RUN or PLAY selector or may press shift+enter to run the cell. Text within the notebook states that the user will notice some metadata printed after the cell. This metadata being written to the notebook is the trigger for the system recording a new run. When the user performs the run the metadata is written to the notebook as shown on notebook interface 1000 of FIG. 10. The metadata is shown as follows (with added semicolons indicating new lines): [[DOTSCIENCE-RUN:DF63E59A-B718-469E-816A-F3D66C71375C]]{; "DESCRIPTION": "DID AN EMPTY RUN"; "END": "20190728T155552.515240"; "INPUT": [ ]; "LABELS": { }; "OUTPUT": [ ]; "PARAMETERS": { }; "START": "20190728T155552.515177"; "SUMMARY": { }; "VERSION": "1";}[[DOTSCIENCE-RUN:DF63E59A-B718-469E-816A-F3D66C71375C]].

Figure 11:
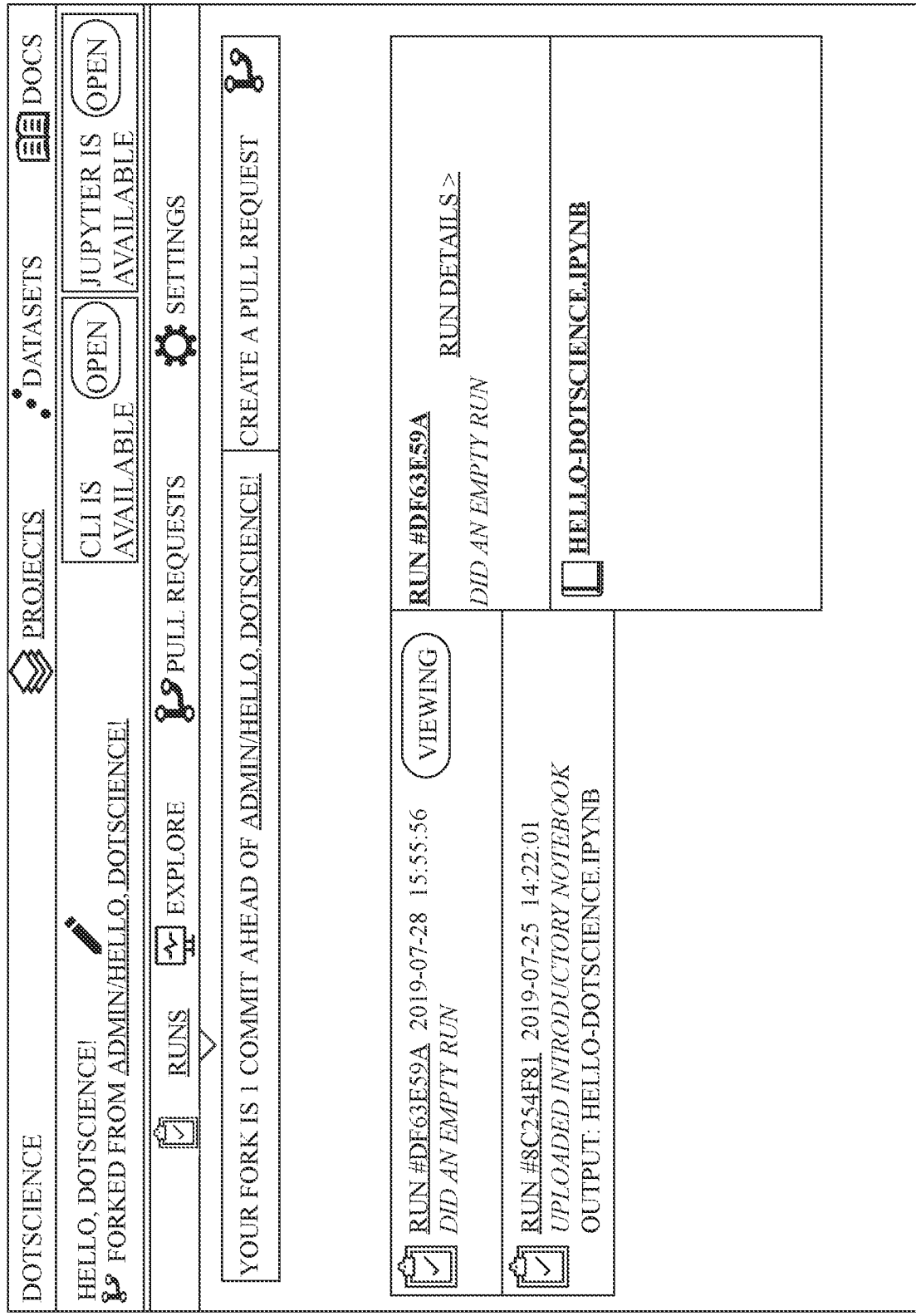
FIG. 11 is an implementation of another UI of the system of FIG. 1.

In the DOTSCIENCE tab on the left side the RUNS section now indicates that an empty run was done in the HELLO-DOTESCIENCE.IPYNB notebook, and the metadata can be seen to be recorded in the notebook itself. If the user now selects the RUNS selector at the top left of interface 1000 the runs interface 1100 of FIG. 11 is displayed. A section indicates that the user's fork is now 1 commit ahead of "ADMIN/HELLO, DOTSCIENCE!" and a selector to create a pull request is also shown. These will be explained in more detail later.

Figure 12:
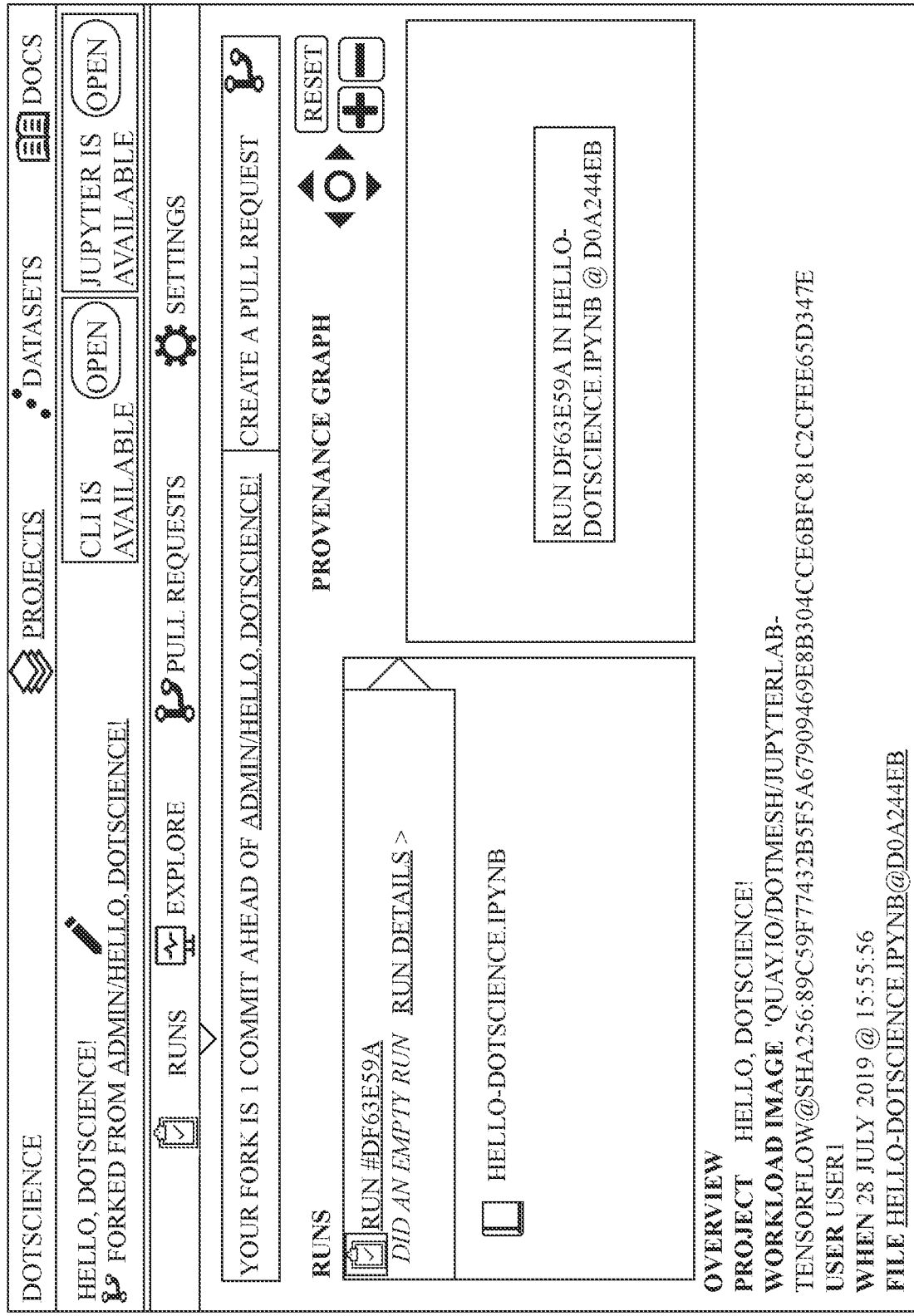
FIG. 12 is an implementation of another UI of the system of FIG. 1.

It is seen on interface 1100 that there are two recorded runs, the first run being the uploading of the introductory notebook, and the second being the empty run which was just performed. Interface 1100 initially shows, to the right side, the message "select a run" but here the user has already selected the empty run (RUN #DF63E59A) which brings up the run's unique identifier, a link to see the run details, and includes links to the files related to the run (in this case just the notebook itself). A "VIEWING" indicator also displays which run is being viewed. The user may select the RUN DETAILS selector to then bring up an interface such as (or similar to) runs interface 1200 of FIG. 12. The provenance graph reveals that this is a very simple run, only involving one file. The OVERVIEW information also shows which version of the DOCKER image (workload image) was used, which user performed the run, and when. When a user later performs data science model runs, such as runs that generate, train, test, and/or validate ML models, those run details may be displayed using an interface similar to FIG. 11 and the overview details (including user performing the run and DOCKER image used to perform the run) and provenance details may also be displayed using an interface similar to FIG. 12. The user can also click on the notebook indicator and a NOTEBOOK window/section will be shown (not shown in the drawings) within interface 1200 which will display a snapshot of the notebook at that point in time (essentially showing the same as what is shown in the notebook tab in FIG. 10). In this NOTEBOOK section/window a SHOW DIFF selector is also shown which, when selected, may display the difference between the notebook before and after the run.

An example is now given of training an ML model. ML models have parameters like learning rates and summary statistics like accuracy. These can be recorded as metadata in the notebook to include them in the history of the project and to allow team members to see them. A sample cell to train an imaginary neural network may be as follows (added semicolons indicating new lines): DS.START( )# START A NEW RUN; DS.PARAMETER("LEARNING_RATE", 0.001) # A PRETEND LEARNING RATE; DS.SUMMARY ("ACCURACY", 0.99) # A GREAT ACCURACY SCORE; DS.PUBLISH("TRAINED IMAGINARY NEURAL NET") # A MEANINGFUL RUN MESSAGE.

This is just an imaginary neural network training as the training would occur between START and PUBLISH, which would not happen in this example, but this example simply shows how the "learning rate" parameter and the "accuracy" summary statistic may be recorded in the metadata, as follows (with added semicolons indicating new lines): [[DOTSCIENCE-RUN:f6e62f05-7e8f-409a-849d-7d558711df2f]]{; "description": "trained imaginary neural net"; "end": "20190728T155856.209620"; "input": [ ]; "labels": { }; "output": [ ]; "parameters": {; "learning_rate": "0.001";}; "start": "20190728T155856.209511"; "summary": {; "accuracy": "0.99";}; "version": "1";}[[/DOTSCIENCE-RUN:f6e62f05-7e8f-409a-849d-7d558711df2f]].

The JUPYTER plugin allows the user to see the run captured and pushed to the hub in the STATUS/RUNS sections. The recorded accuracy could then, for example, be used to provide a graph which plots various runs against one another to compare the accuracy of each, which will be discussed in more detail later. Each run plotted on the chart may be hovered over to display which user performed the run, the run parameters, and run accuracy. The user may click directly on the plotted dot to return to the runs interface detailing the specific run, as in FIG. 12 or, in implementations the runs interface as in FIG. 11.

An example is now given of data runs of ingesting raw data and modifying it (by combining two data sources into one) and then building a linear regression model to predict house prices. The data ingestion run may be done using a cell in the notebook interface as follows (with added semicolons indicating new lines): DS.START( ); !wget-q-0 data1.csv \; https.://github.com/dotmesh-io/dotscience-demo/blow/master/bay_area_zillow_agent1.csv ?raw= true; !wget-q-0 data2.csv \; https://github.com/dotmesh-io/dotscience-demo/blob/master/bay_area_zillow_agent2.csv?raw=true; ds.output("data1.csv"); ds. output("data2. csv"); ds.publish("ingested ZILLOW property data").

In this data run two sets of raw data are downloaded and the data files are captured as output files, and a message is published about how some property data was ingested. The metadata recorded in the notebook when this run is performed is as follows (with semicolons added to indicate new lines): [[DOTSCIENCE-RUN:17d3cbfa-985a-4c27-860e-83f0d86e6e1e]]{; "description": "ingested ZILLOW property data"; "end": "20190728T160101.821413"; "input": [ ]; "labels": { }; "output": [; "data1.csv"; "data2.csv";]; "parameters": { }; "start": "20190728T160058.026237"; "summary": { }; "version": "1";}[[/DOTSCIENCE-RUN: 17d3cbfa-985a-4c27-860e-83f0d86e6e]].

After this run is performed the user may select the RUNS selector of the notebook interface to return to the runs interface and, after selecting this run, the interface 1100 will list the data files that were ingested, DATA1.CSV and DATA2.CSV, along with the HELLO.DOTSCIENCE.IPYNB notebook. The user may select a specific output file, for example the DATA1.CSV file, to display the provenance graph which for this file will show a diagram having a first item as "RUN 17D3CBFA IN HELLO-DOTSCIENCE.IPYNB CA74FA00" an arrow indicating "OUTPUT" to another item "DATA1.CSV @ CA74FA00" indicating this file was output from the specified run at the CA74FA00 version of the code. There will also be a "Download" selector allowing the user to download the current version of this file.

The user may also select a "Run details" selector to view run details of the data run. The provenance graph for the data run itself will show a first item as "RUN 17D3CBFA IN HELLO-DOTSCIENCE.IPYNB @ CA74FA00", an arrow indicating "OUTPUT" from the first item to a second item "DATA1.CSV @ CA74FA00", and an arrow indicating "OUTPUT" from the first item to a third item "DATA2.CSV @ CA74FA00", thus showing the overall run as outputting the two data files from the run. The user can, from an interface such as (or similar to) interface 1200, select the notebook selector to see how the notebook was changed during the last run, which in this case will just show the metadata that was added to the notebook after the run. The OVERVIEW section will also be displayed to show the overview details of the run.

After this a data run may be done which combines these two datasets together. This may be done using a cell in the notebook interface as follows (with semicolons added to indicate new lines): import pandas as pd; ds.start( ); inputs= [pd.read_csv(ds.input("data1.csv")), pd.read_csv(ds.input ("data2.csv"))]; df=pd.concat(f for fin inputs); df.to_csv (ds.output("combined.csv")); ds.publish("combined data files").

In this case we read in the two data files and write out a combined csv file, the recorded metadata is (with semicolons added to indicate new lines): [[DOTSCIENCE-RUN:

b82e5773-bb28-4d47-8a59-eda251256365]]{; "description": "combined data files"; "end": "20190728T160213.977232"; "input": [; "data1.csv"; "data2.csv";]; "labels": { }; "output": [; "combined.csv";]; "parameters": { }; "start": "20190728T160213.611.002"; "summary": { }; "version": "1";}[[/DOTSCIENCE-RUN: b82e5773-bb28-4d47-8a59-eda251256365]].

When the user returns to the runs interface to view the RUN DETAILS of this run, the provenance graph for the data run itself will show a first item as "RUN 17D3CBFA IN HELLO-DOTSCIENCE.IPYNB @ CA74FA00", an arrow indicating "OUTPUT" from the first item to a second item "DATA1.CSV @ CA74FA00", and an arrow indicating "OUTPUT" from the first item to a third item "DATA2.CSV @ CA74FA00", an arrow indicating "OUTPUT" from the second item and another arrow indicating "OUTPUT" from the third item both to a fourth item "RUN B82E5773 IN HELLO-DOTSCIENCE.IPYNB @ Ef917D12", and finally an arrow indicating "OUTPUT" from the fourth item to a fifth item "DATA COMBINED.CSV @ E5917D12". The OVERVIEW details of the run will also be displayed. As may be seen in FIG. 12, the provenance graph has controls for moving the graph in any direction, zooming in and out, and for resetting to the original placement and zoom. In some cases the provenance graph may include too many items to be displayed all at once without zooming out and/or moving the graph.

Now that the two datasets have been combined into a combined dataset, a machine learning model may be trained on the dataset. The example is a simple linear regression. The provenance of the model data file will be tracked as well as the accuracy statistics from testing it. An example notebook cell used to build the model is as follows (with semicolons added to indicate new lines): from sklearn.linear_model import LinearRegression; from sklearn.metrics import mean_squared_error; from sklearn.externals import joblib; from sklearn.model_selection import train_test_split; import numpy as np; ds.start( ); features=['finishedsqft']; X=df[features]; Y=df['lastsoldprice']; ds.parameter('features',",".join(sorted(features))); df=pd.read_csv(ds.input (combined.csv)); X_train, X_test, y-train, y_test=train_test_split(X, Y, test_size=0.3, random_state=1); Regressor=LinearRegression( ); Regressor.fit(X train, y_train); y_pred=regressor.predict(X_test); regressor_score=regressor.score(X_test, y_test); ds.summary('regressor_score', regressor_score); lin_mse=mean squared_error(y_pred, y_test); lin_rmse=np.sqrt(lin_mse); ds.summary('lin_rmse', lin_rmse); joblib.dump(regressor, ds. output('linear regressor.pk1')); ds.publish("trained linear regression model").

In this run the linear regressor is instrumented with ds.start, the only parameter in this case is the list of features, the combined csv file is being read in, the linear regressor is being trained, the error rate is being found, the resulting model is being saved as a PICKLE (PKL) file and a statement is published.

The recorded metadata is as follows (with semicolons added to indicate new lines): [[DOTSCIENCE-RUN: 5cbda4c2-e155-4b0d-900e-535eb7531da4]] {; "description": "trained linear regression model"; "end": "20190728T160330.980999"; "input": [; "combined.csv.";]; "labels": { }; "output": [; "linear_regressor.pk1";]; "parameters": {; "features": "finishedsqft";}; "start": "20190728T160330.850957"; "summary": {; "lin_rmse": "855408.505037345"; "regressor_score": "0.35677710327221";}; "version": "1";}[[/DOTSCIENCE-RUN: 5cbda4c2-e155-4b0d-900e-535eb7531da4]].

After the run is performed the STATUS section shows "PUSHING" along with a percentage indicating how much of the files have been updated to the hub. The HELLO.DOTSCIENCE.IPYNB is shown as "modified" while the LINEAR_REGRESSOR.PKL is shown as "added." When the user then goes to the run details from the runs interface the provenance graph shows the same as was described earlier for the previous run except that the fifth item "DATA COMBINED.CSV @ E5917D12" now has an arrow indicating "OUTPUT" to a sixth item "RUN 5CBDA4C2 IN HELLO-DOTSCIENCE.IPYNB @ 9CCDA263" which in turn has an arrow indicating "OUTPUT" to a seventh item "DATA LINEAR_REGRESSOR.PKL @ 9CCDA263". The OVERVIEW details are also shown. The user can accordingly see that the regression model was created from model run 5CBDA4C2 from a combined dataset combined during data run B82E5773, which combined dataset was formed using two datasets imported during data run 17D3CBFA. In this example the same user performed all of these runs, but in implementations a team of users could be performing different runs and each user would be able to, using the run details and provenance graphs, determine the user and history of every data run and model run of the project.

In implementations the provenance graph shows runs and data in different colors, for example showing runs with a white background and input/output data with a grey background.

The above model may be tuned in the notebook. For example, the "features" portion of the cell may be modified to: features=['finishedsqft', 'bedrooms', 'bathrooms', 'totalrooms']. When the cell is then run again another run is captured (RUN #74A36EF8), and this time the output/recorded metadata includes (with semicolons added to indicate new lines): "lin_rmse": "846343.9627939219"; "regressor_score": "0.3703370078959445". This run accordingly produces a different score for the regression model, with the error rate going down when the new features are added, and the user may view these two runs on a graph plotting the LIN_RMSE summary statistic on the y-axis to compare the error rates through the EXPLORE tab. When hovering over each plotted point the user performing the run is shown, along with parameters and summary statistics. The graph allows the user to visually see the effect of the parameters on the summary statistic, for example in this case that adding bedrooms, finishedsqft, and totalrooms to the parameters decreases the error rate.

While the above example discusses the use of JUPYTER notebooks for performing data and model runs and for capturing/tracking run information, the same cell scripts could be run through command line interface (CLI) script runs, or other software could be used, to perform the same functions.

Example System Methods And UIs—Roadsigns Example

Figure 13:
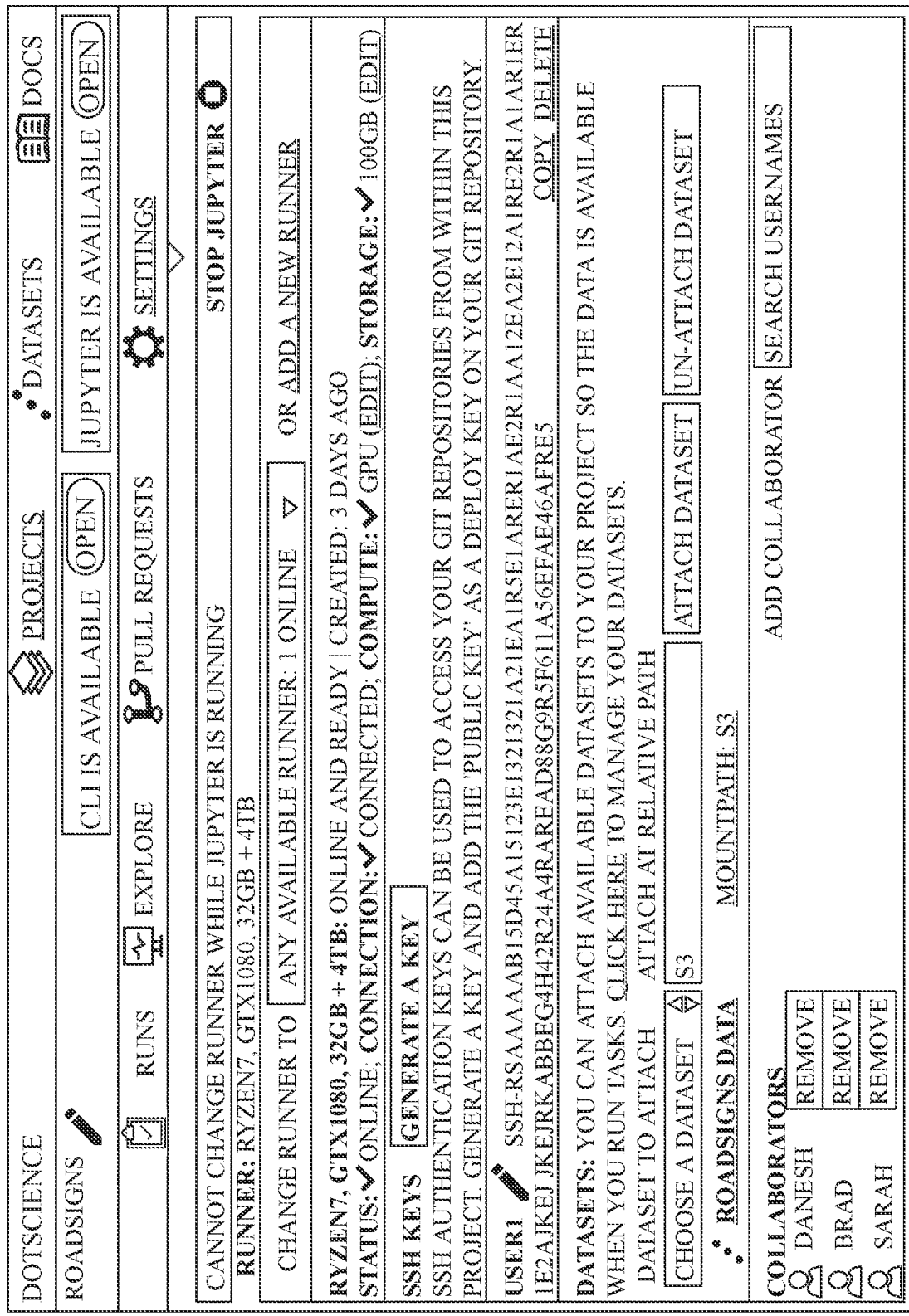
FIG. 13 is an implementation of another UI of the system of FIG. 1.

An example will now be given of data runs and model runs which use code from GITHUB and data from AMAZON S3 to train a TENSORFLOW/KERAS neural network, deploy the results to production, and monitor the deployed model to determine road signs. This is just an example, and other models could be used to perform a variety of other functions. The data engineering begins by ingesting data from S3 and ingesting GITHUB hosted source code. This example begins at projects interface 500 on which the user selects the "ADD NEW+" selector to create a new project, bringing the user to a UI showing a default project name that the user can edit. In this example the user changes the project name to "Roadsigns" and the selects the SETTINGS tab to bring the user to an interface such as (or similar to) settings interface 1300 of FIG. 13. In this example the user has already been in JUPYTER and has returned to the SETTINGS tab. Accordingly, interface 1300 shows that a runner is already running and gives the details of the runner, and selectors allow the user, if desired, to switch to a previously added runner or to add a new runner, though the user must select STOP JUPYTER before switching runners. JUPYTER may be started again by opening the notebook interface. The specifications of the runner are also shown, some of which are seen to be editable by the user.

An SSH KEYS section allows the user to generate a key using a GENERATE A KEY selector to access GIT repositories from within this project. After the key is generated it may be added as a public key on the GIT repository. Here the user has generated a USER1 key, and selectors allow the user to copy and/or delete this key. In this example the user copies the generated key, navigates to a GITHUB keys interface, selects a NEW SSH KEY selector thereon, pastes the key in and gives the key a name (in this case the name given is "roadsigns project in dotscience") and selects an ADD SSH KEY selector on the GITHUB interface to add the key.

Figure 14:
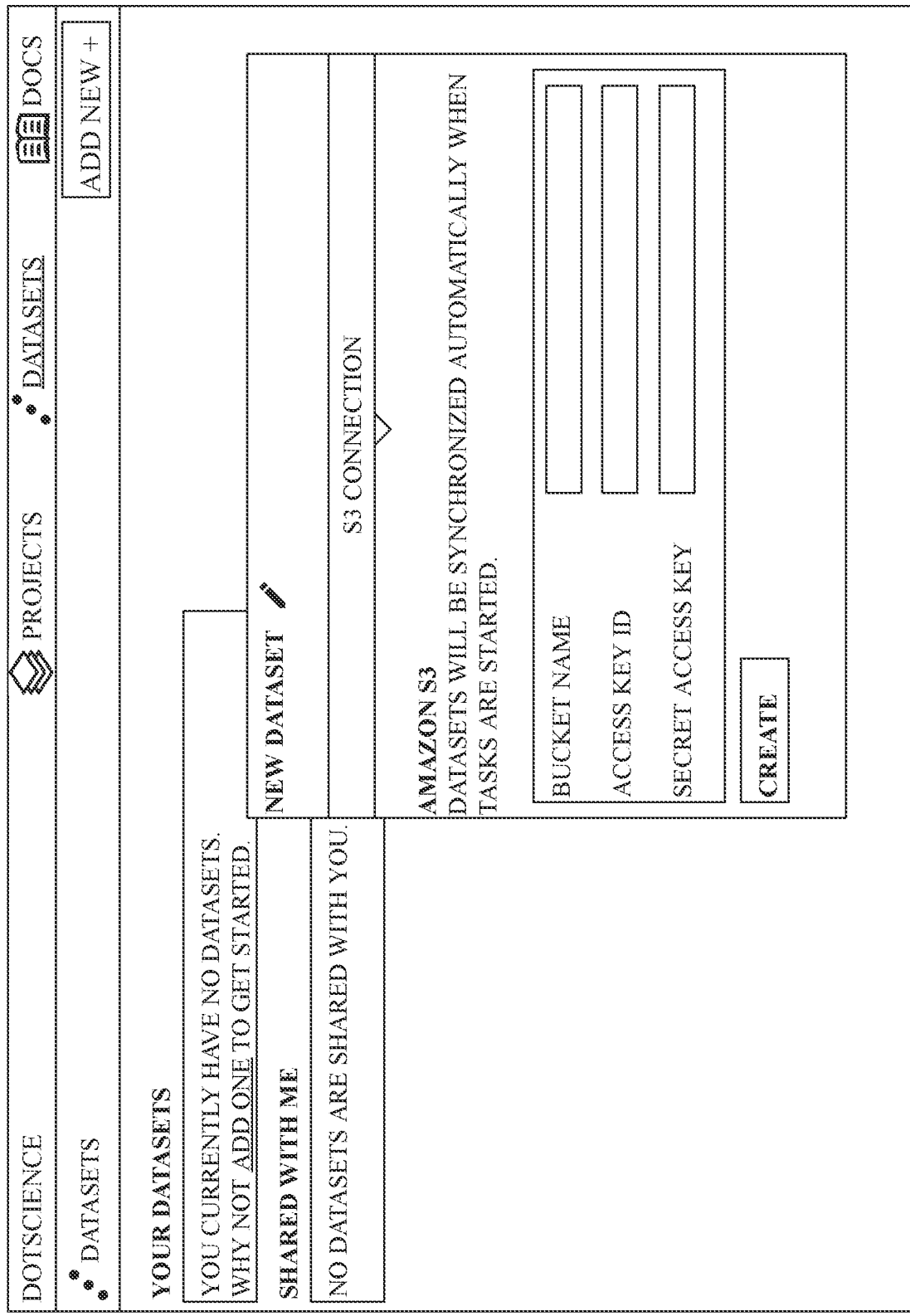
FIG. 14 is an implementation of another UI of the system of FIG. 1.

A DATASETS section of interface 1300 allows the user to attach datasets to the project for code ingestion. In this example the user has previously stored two data files in an AMAZON S3 bucket titled dotscience-roadsigns-data, one raw data file titled roadsigns.p and the labels for that data in a signnames.csv file. This was done using the previously described datasets interface, which will now be described in more detail. At the datasets interface 1400 of FIG. 14 (accessed using the top DATASETS menu item) the user is shown a "YOUR DATASETS" section and a "SHARED WITH ME" section. An "ADD NEW" selector takes the user to an interface for adding a dataset (the "ADD ONE" selector does the same). Here the interface for adding a new dataset is shown as a popup interface, but in other implementations it could be a separate page. An editable tile "NEW DATASET" is shown and the user may provide credentials for accessing the external dataset. For example, in implementations the user may input an S3 bucket name in a first field, an access key ID in a second field, and a secret access key in a third field, select a "CREATE" selector, and thus initiate linking of the S3 dataset with the user's account so that the hub/runner may access the dataset(s). If the credentials are input incorrectly an error message will appear. After the user adds the S3 dataset to the account the dataset will appear in the "YOUR DATASETS" section of the datasets interface. The user may also share the dataset with other users using one or more share selectors (not shown), and if a user has any projects shared with the user those will appear in the "SHARED WITH ME" section. In implementations S3 datasets may be mirrored to hub storage for improved performance and reduced latency.

Once the user has added a dataset to the user's account the user may attach the dataset to any given project. In the FIG. 13 example the user could select the CLICK HERE selector in the DATASETS section to take the user to the datasets interface, described above, if the user has not already attached one or more datasets to the user's account. In this example the user has already added the ROADSIGNS data to the user's account from an S3 bucket and has, in the DATASETS section of interface 1300, selected the ROADSIGNS DATA dataset from a dropdown list (which may have predictive text features) and inserted "S3" in the "ATTACH AT RELATIVE PATH" field, then selected ATTACH DATASET to attach the dataset to the project. The user could select UN-ATTACH DATASET to detach the dataset from the project, if desired.

A COLLABORATORS section allows the user to add collaborators to the project. The user may search using the ADD COLLABORATOR field, which may provide a list of users matching the first one or more characters typed in by the user, and in this example the user has added Danesh in India, Brad in New York and Sarah, a team manager, in London. Adding these other users as collaborators allows them to see the project, fork the project, etc., as will be described hereafter.

The user may do data engineering work in a number of ways and have the data runs automatically tracked by system 100. In this example the user will do data engineering using PYTHON scripts which are versioned in GITHUB. The user previously prepared a script for ingesting raw data from S3 and splitting it into two modelling sets: a large set and a small set each containing training, test, and validation sets. The user in this example runs the script using VISUAL STUDIO CODE (VSC). FIG. 15 shows data engineering interface (interface) 1500 which is a VSC interface with the PYTHON script open. Starting with line 21, the user is importing DOTSCIENCE as ds, NUMPY as np, and importing PICKLE, and will start in line 29 by loading the dataset from S3 (the relative mount path in system 100 as previously defined). In line 32 a directory called "data" will be made and as seen in lines 36 and 37 the data will be split up into various training, test, and validation sets. As seen in data engineering interface (interface) 1600 of FIG. 16 (which is a continuation of interface 1500 scrolled further down), at line 54 the labels will be copied. These operations have been wrapped up in ds.start( ) and ds.publish( ) commands so that the first run ingests the data from S3, splits it up in various ways and writes it to a data directory as seen in line 48, and every time data is written to the data directory the system will annotate that the data is an output file, and similarly the system will annotate that the initial raw data (the data being ingested from S3) is an input file (see lines 29, 48). There are similar input and output statements for the labels at line 54.

Looking now at the first user1@dot line below line 55, the user can use a "ds run" command to execute this run, which is being told to use a certain docker image, ($IMAGE), a certain project (roadsigns), a certain branch (master), and a certain GIT repo ($REPO). A .env file is shown below this which shows the GITHUB repo (REPO+git@github . . . ) and that the image is a DOCKER image (quay.io/dotmesh . . . ) which has all the needed libraries in it. If the user runs this command it runs the PYTHON script roadsigns-e2e/data-engineering.py which has been committed to the GITHUB repo and returns the output on the terminal. This could also be hooked up to a CRON job or a system like APACHE AIRFLOW to automate ingesting data and making it available to the ML team. In interface 1600 it is shown that once the run is executed an "Executing run ID . . . " is shown and then the stored metadata is shown. This metadata stores information about the data run and this metadata will be stored in one or more databases of the hub for later retrieval so that the user may view the provenance and details of the run.

If the user were to return to a runs interface similar to interface 1200 the interface may show a counter or "loading" indicator which indicates that the hub is receiving the results of the data engineering runs (data runs)—the runner uploading to the hub the data that it has generated. Once the runs are uploaded to the hub the user may see, at runs interface 1700 of FIG. 17, the two runs that were recorded in the code. RUN #6F1EC6F1 is simple and just copied the signnames.csv file from S3 and the provenance graph for that would be very simple: a first element "DATA SIGN-NAMES.CSV @ 95BA4034" with an arrow indicating an OUTPUT of a second element "RUN 6F1EC6F1 IN ROAD-SIGNS-E2E/DATA-ENGINEERING.PY DDBBD4D4", the second element with an OUTPUT arrow indicating a third element "DATA DATA/SIGNNAMES.CSV @ DDBBD4D4". This indicates that names were ingested from S3, a copy operation performed, and data is written out to DATA/SIGNNAMES.CSV in the project.

Figure 17:
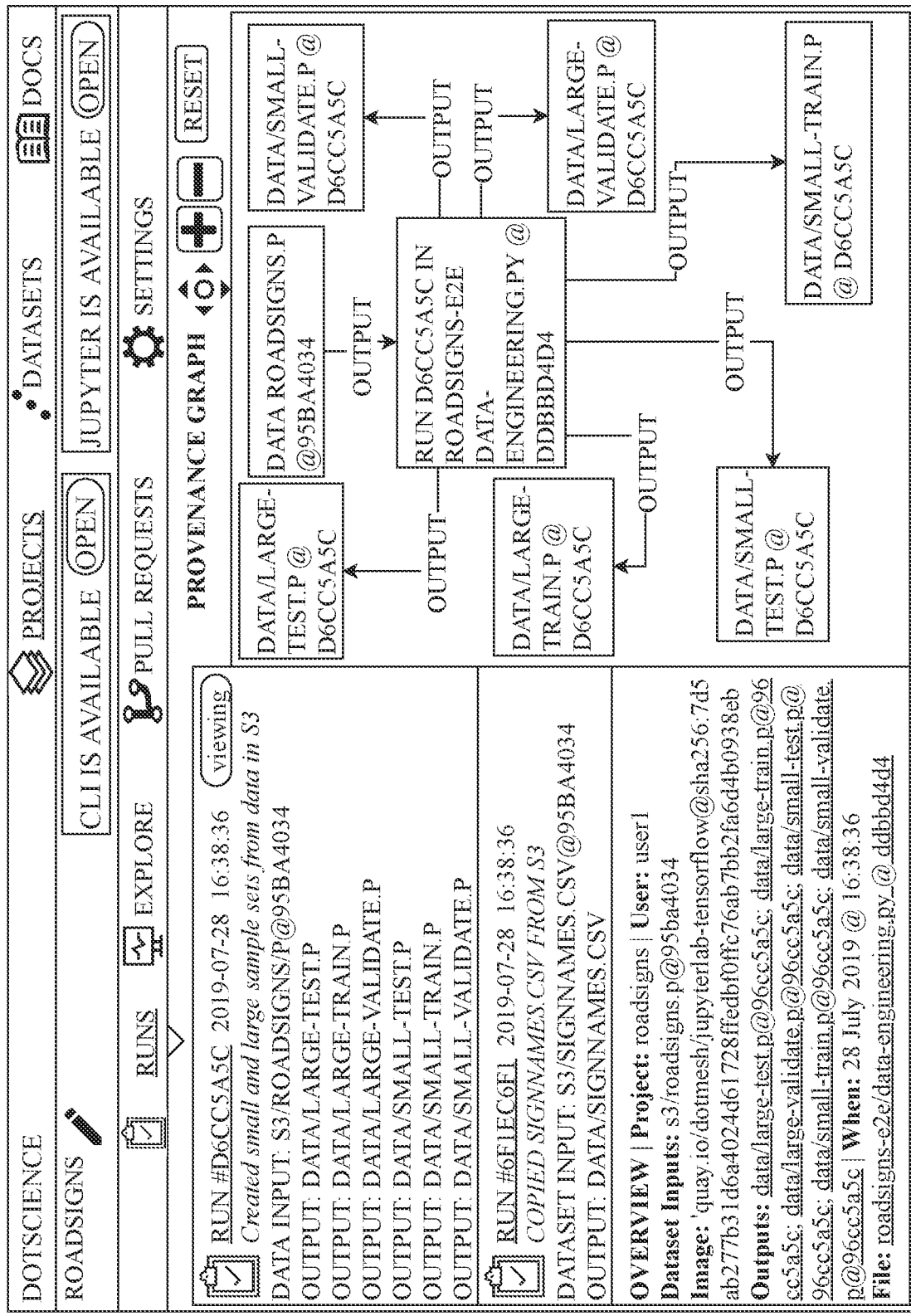
FIG. 17 is an implementation of another UI of the system of FIG. 1.

It is also seen that RUN #D6CC5A5C which was performed on the runner took the input data file and output six data files which are now stored in the hub. Upon first selecting RUN #D6CC5A5C a first window (similar to FIG. 21) may open showing a list of links to the different output datasets, a link to the data/signnames.csv file, a link to a roadsigns-e2e/README.md file, a link to a roadsigns-e2e/data-engineering.py file, a link to a roadsigns-e2e/model-training.ipynb file, and a link to the run details for the run, and upon selecting a RUN DETAILS link the user may view the provenance graph diagram shown in FIG. 17 along with the OVERVIEW information. Accordingly, FIG. 17 shows a hybrid of two interface views combined together for ease of viewing the elements shown. The provenance graph shows the input raw data file, the run, and the six output data files. The OVERVIEW section shows which version of the file from the S3 dataset was attached at that path and it has versioned that S3 dataset as 95BA4034. It also recorded which version of the DOCKER image was used, and all of the outputs, and it recorded that the run happened in the DDBBD4D4 version of the data engineering PYTHON script. The provenance graphs shows that the data engineering set was run through the data engineering script and that it output the various sets. It is useful to have different training set sizes because training a neural network on a large dataset can take some time, so it can be useful to begin with a small training set. The user may return to interfaces 1500/1600 and the VSC interface will also show that the two runs are completed, details of the runs, and that the metadata for each was recorded (and shared/displayed on interfaces 1500/1600 as well).

Figure 18:
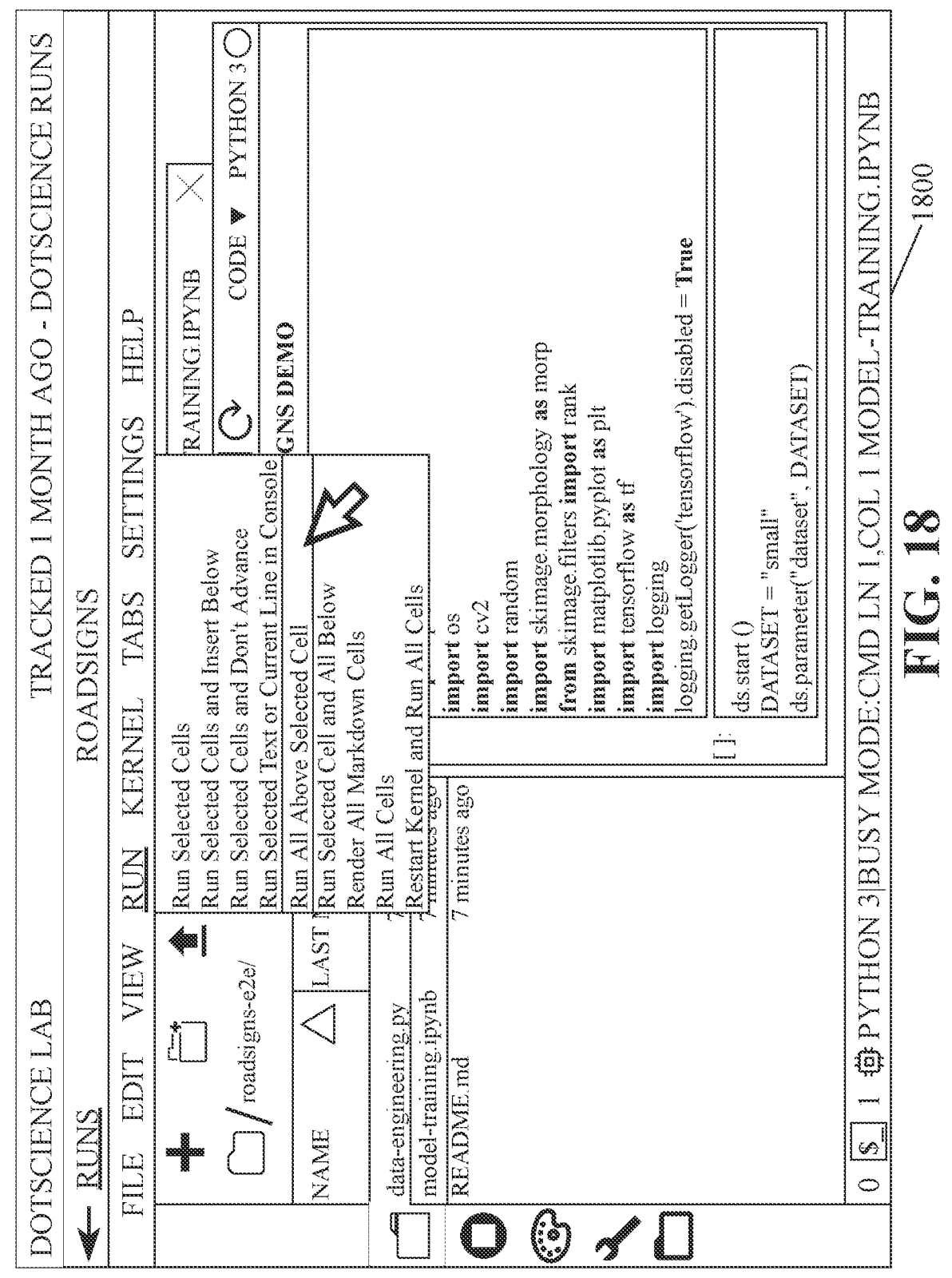

Now that this data engineering step has been completed, a certain version of the dataset is ready to be used as input training data for development of an ML model. The next step is model development which will entail building a neural network. The attached runner has a GPU for fast and efficient model training. The user returns to interface 1700 and opens JUPYTER which brings up an interface such as (or similar to) notebook interface 1800 of FIG. 18. Initially the folders shown on the left hand side include a "data" folder, a "roadsigns-e2e" folder, and an "S3" folder. If the user selects the data folder the files large-test.p, large-train.p, large-validate.p, signnames.csv, small-test.p, small-train.p, and small-validate.p will be listed, along with the last modified time. If the user selects the "S3" bucket, since the S3 bucket is mounted inside JUPYTER the original roadsigns.p and signnames.csv files will be listed there—if the user wanted to access the raw data files or if there were other S3 buckets the user wanted to use for training that could be done. For this example the user will use the data in the "data" folder which is the output of the last run and which is stored in the project. In FIG. 18 the user has selected the "roadsigns-e2e" folder which is the checked out GITHUB repo checked out by the prior "ds run" command, which lists the data-engineering.py, model-training.ipynb and README.md files, and the user has selected the model-training.ipynb notebook file, which is the model training notebook which will be used to process the data. The model training notebook in this case will build a neural network that is able to predict roadsigns, and has the following cells which may be run (with added semicolons indicating new lines).

First cell: import dotscience as ds; import numpy as np; import pandas as pd; import pickle; import cv2; import random; import skimage.morphology as morp; from skimage.filters import rank; import matplotlib.pyplot as plt; import tensorflow as tf; import logging; logging.getLogger (tensorflow).disabled=True.

Second cell: ds.start( ); DATASET="small"; ds.parameter ("dataset", DATASET). This cell starts by using the small dataset.

Third cell: train=pickle.load(open(ds.input(" . . . /data/%s-train.p" % (DATASET,)),"rb")); valid=pickle.load(open (ds.input(" . . . /data/%s-validate.p" % (DATASET,)),"rb")); test=pickleload(open(ds.input(" . . . /dataNs-test.p" % (DATASET,)),"rb")). This cell reads in the training, validation and test set of the small dataset.

Fourth cell: import csv; #Mapping ClassID to traffic sign names; signs=[ ]; with open(ds.input(' . . . /data/signnames.csv'), 'r') as csvfile:; signnames=csv.reader(csvfile, delimiter=','); next(signnames,None); for row in signnames:; signs.append(row[1]); csvfile.close( ). This cell reads in the labels.

Fifth cell: X_train, y_train=train['features'], train['labels']; X_valid, y_valid=valid['features'], valid['labels']; X_test, y_test=test['features'], test['labels']; # Number of training examples; n_train=X_train.shape[0]; # Number of testing examples; n_test=X_test.shape[0]; # Number of validation examples; n_validation=X_valid.shape[0]; # What's the shape of a traffic sign image?; image_shape=X train[0].shape; # How many unique classes/labels there are in the dataset; n_classes=len(np.unique(y_train)); print ("Number of training examples:", n_train); print("Number of testing examples:", n_test); print("Number of validation examples:", n_validation); print("Image data shape=", image_shape); print("Number of classes=", n_classes). This cell prints the number of training examples, testing examples, validation examples, image data shape, and number of classes, which are 10000, 1000, 500, (32, 32, 3); and 18, respectively. The (32, 32, 3) indicates 32 by 32 images with 3 channels of color.

Sixth cell: X_train[0].shape.

Seventh cell: #define helper functions; def list_images (dataset_y, ylabel=" ", cmap=None):; """Display a list of images in a single figure with matplotlib.; Parameters:; images: An np.array compatible with plt.imshow.; lane1 (Default=No label): A string to be used as a label for each image.; cmap (Default=None): Used to display gray images.;"""; plt.figure(figsize=(15, 16)); for i in range(6):; plt.subplot(1, 6, i+1); indx=random.randint(0, len(dataset)); #Use gray scale color map if there is only one channel; cmap='gray' if len(dataset[indx].shape)==2 else cmap; plt.imshow(dataset[indx], cmap=cmap); plt.xlabel(signs [dataset_y[indx]]); plt.ylabel(ylabel); plt.xticks([ ]); plt.yticks([ ]); plt.tight_layout(pad=0, h_pad=0, w_pad=0); plt.show( ); def histogram_plot(dataset, label):; """Plots a histogram of the input data.; Parameters:; dataset: Input data to be plotted as a histogram.; lane1: A string to be used as a label for the histogram.;"""hist, bins=np.histogram(dataset, bins=n_classes); width=0.7*(bins[1]−bins[0]); center= (bins[:−1]+bins[1:])/2; plt.bar(center, hist, align='center', width=width); plt.xlabel(label); plt.ylabel("Image count"); plt.show( ); def gray_scale(image):; """; Convert images to gray scale.; Parameters:; image: An np.array compatible with plt.imshow.;"""; return cv2.cvtColor(image, cv2.COLOR_RGB2GRAY); def local_histo_equalize(image):; """; Apply local histogram equalization to grayscale images.; Parameters:; image: A grayscale image.;"""; kernel=morp.disk(30); img_local=rank.equalize (image, selem=kernel); return img_local; def image_normalize(image):; """; Normalize images to [0, 1] scale; Parameters: image: An np.array compatible with plt.imshow.;"""; image=np.divide(image, 255); return image; def preprocess(data):; """; Applying the preprocessing steps to the input data.; Parameters:; data: An np.array compatible with plt.imshow.;"""; gray_images=list(map(gray_scale, data)); equalized_images=list(map(local_histo_equalize, gray_images)); n_training=data.shape; normalized_images=np.zeros((n_training[0], n_training[1], n_training[2])); for i, img in enumerate(equalized_images): normalized_images[i]=image_normalize(img); normalized_images=normalized_images[ . . . , None]; return normalized_images.

Eight cell: X_valid_preprocessed=preprocess(X_valid); X_test_preprocessed=preprocess(X_test); X_train_preprocessed=preprocess(X_train). This cell preprocesses images.

A ninth cell uses tf.keras to decode base64 and resize the image to a tensor of shape (32, 32, 1). In implementations the model must be supplied urlsafe base64. The user can convert regular base64 to urlsafe using PYTHON's base64 module. A tenth cell trains the network using grayscale images.

Figure 19:
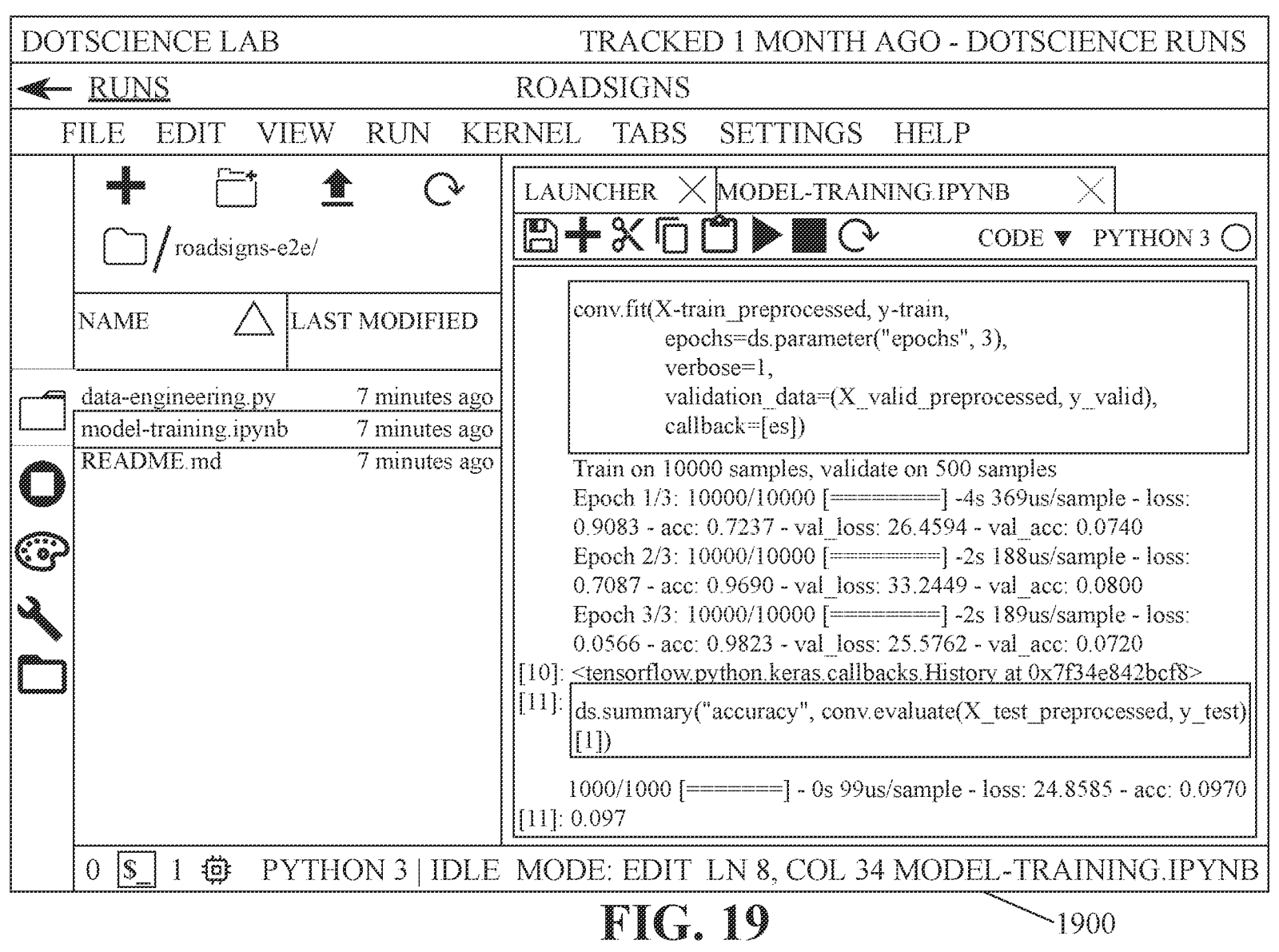

The user may run any of these cells individually or may, as indicated by the RUN dropdown menu of FIG. 18, run certain selected cells, all above a selected cell, a selected cell and all below, etc. The cells comprise or include editable fields so that by selecting either the "Run All Cells" or other selectors the user may execute all of the cells (i.e., execute all of the editable fields) or execute some subset thereof (i.e., execute fewer than all of the editable fields or cells). Because each cell can be run to perform one or more tasks it is also accurate to call each cell an "executable cell." It is noted that, although the cells in the drawings have lines drawn around them, such a line is not needed for the editable field to constitute a "cell"—rather the executable cell is simply an identifiable editable portion or section of text displayed on the user interface that may be executed alone or together with other editable portions/sections. The cell could, for example, be displayed in a different font, or different text color, to indicate it as an editable and executable field. Additionally, in some implementations all of the displayed text may be edited as desired by a user, but only the text of the editable/executable cells is used to execute data science model runs. In this case the user runs cells 1-10 to train the neural network on 10000 samples and validate it on 500 samples to get the results shown on notebook interface 1900 of FIG. 19. This shows the neural network was trained with accuracies on the test set of 72.37%, 96.90% and 98.23%, but the validation accuracies are 7.40%, 8.00% and 7.20%, respectively, and the accuracy score on the test set was 9.7%. This indicates the model is poor at predicting road signs. This model used the ADAM optimizing algorithm (optimizer) and 3 epochs.

The user stops JUPYTER and returns to the VSC interface 1500. It may be seen by line 36 of FIG. 15 that the prior data run only took the first 10,000 road sign images of the combined dataset to create the small training set. The user hypothesizes that perhaps the first 10,000 images only include a subset of the total labels/road signs that are needed to train the model. Ideally one would want some of all the different road signs in the small training set to properly train the neural network. The user determines that if the data is shuffled before taking the first 10,000 images, the model might be trained better using the small dataset. Referring to data engineering interface (interface) 2000 of FIG. 20, the user has a GIT branch already (GIT checkout shuffle-data) which introduces new lines 37-45 which does a random shuffle using a fixed seed.

The user then does another ds run command to rerun the two data runs (for the data and for the labels). It can be seen that the user changes the reference from "master" to "shuffle-data". These data runs would normally overwrite the previously output data files, which could be problematic. But, because the user is using system 100 to perform the data and model runs, this problem is solved because each version of the data is automatically recorded along the way.

Figure 21:
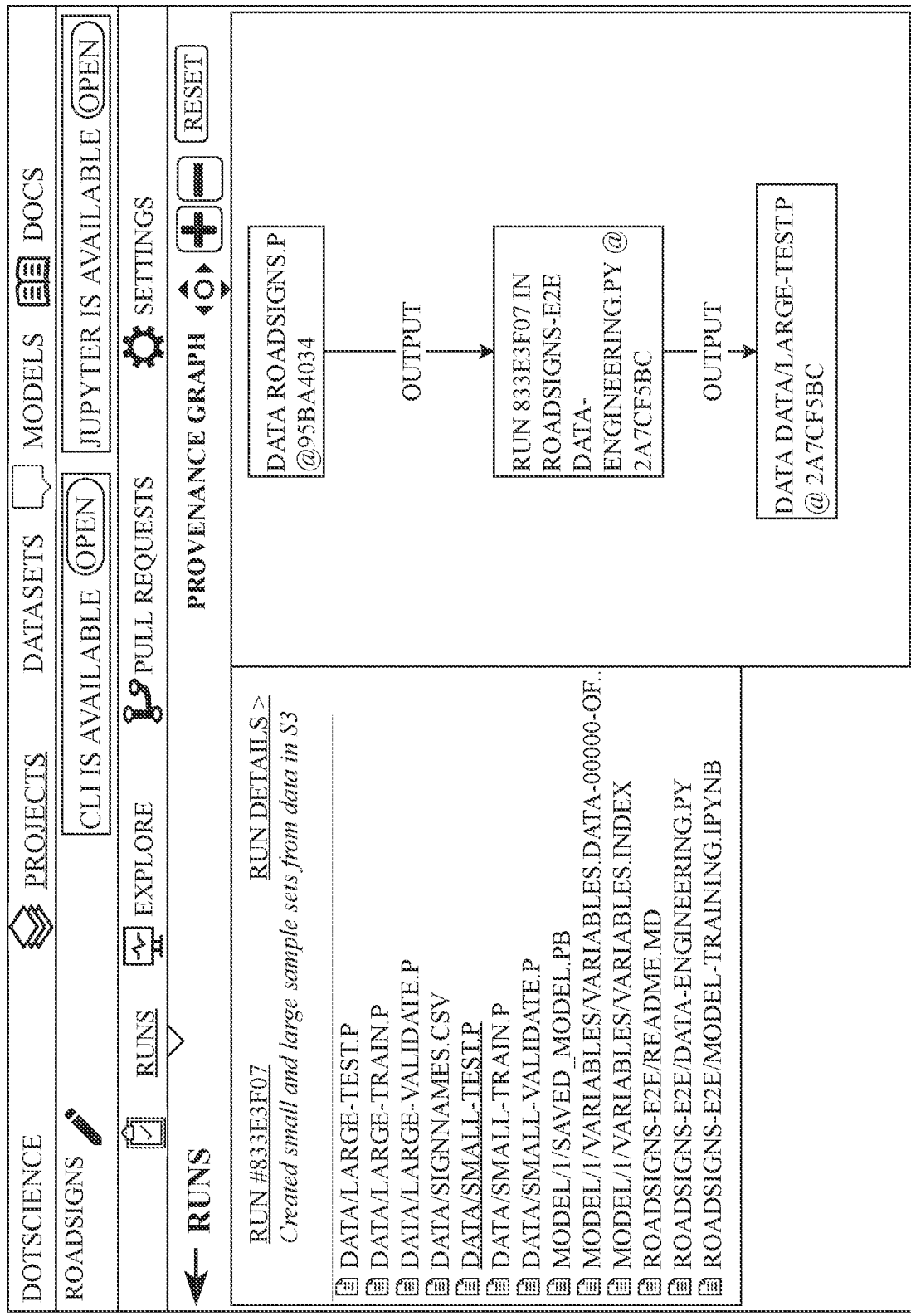
FIG. 21 is an implementation of another UI of the system of FIG. 1.

This data run outputs the sign names again as RUN #DB6D933A and outputs the 6 data files again as RUN #833E3F07. The user may return to the runs interface, previously described, to see these runs. In runs interface 2100 of FIG. 21 the user has selected RUN #833E3F07 and has selected the DATA/LARGE-TEST.P file to view its provenance graph. The user can also view the ROAD-SIGNS-E2E/DATA-ENGINEERING.PY file by clicking on it and this will bring up the code in a window (where the provenance graph is now shown) so the user may see that the code included the shuffling criteria. The provenance graph of FIG. 21 shows that the data run used the 95BA4034 version of the raw dataset to create the 2A7CF5BC version of the large dataset. The user could view the prior data run to see that the 95BA4034 version of the raw dataset was used to create the DDBBD4D4 version of the large dataset. In this way, when datasets are modified and models are trained, the system tracks which code version was used, which inputs were used, and which outputs were generated with each data run and model run.

Figure 22:
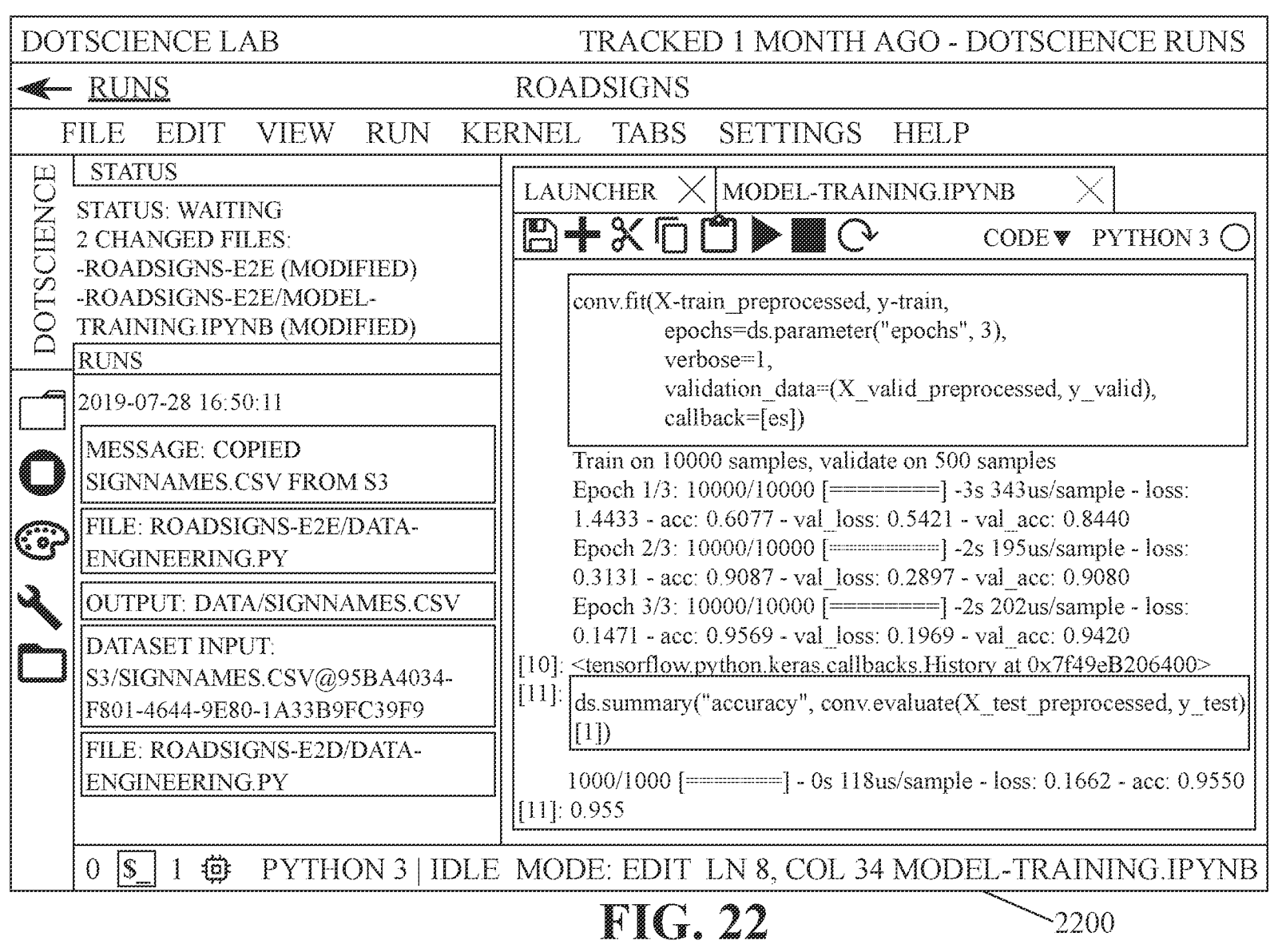

The user at this point starts JUPYTER again to retrain the model, with the idea that with the shuffled data the model will be trained better. The user selects RUN ALL CELLS from the RUN menu and obtains the results shown by notebook interface 2200 of FIG. 22. The accuracy score is 95.5%, which is much improved. The user then determines to deploy this model to production to see how it performs. The model was automatically saved using another cell which included a ds.output(MODEL_DIR) line and the model was labeled using another cell to indicate the version of TENSORFLOW that was used, and another cell does the ds.publish command.

Figure 23:
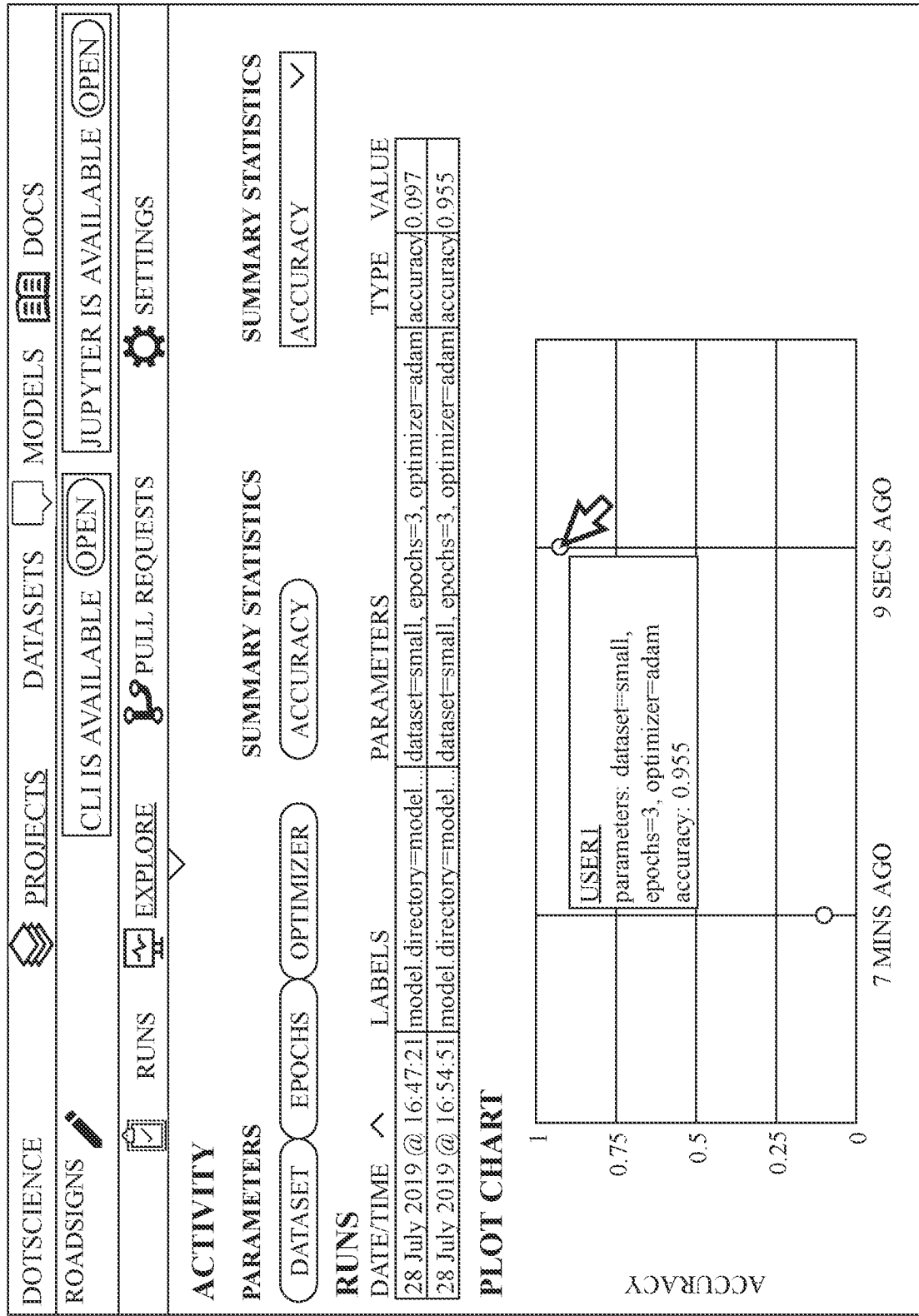
FIG. 23 is an implementation of another UI of the system of FIG. 1.

Interface 2300 of FIG. 23 is an explore interface accessed by selecting the EXPLORE tab, and shows the parameters used (dataset, epochs, optimizer) and the output summary statistics (accuracy). A table shows the model runs including the date/time, labels, parameters, and accuracy. A plot chart shows the two model runs plotted on a graph that includes accuracy on the Y axis. This allows the user to see a visual representation of the difference in accuracy between the two runs. In this case the accuracy went from about 9.7% to 95.5% not by changing the epochs or the optimizer, but by changing the small dataset to include shuffled data. The explore interface also allows the user to see accuracy differences resulting from different parameters, discussed below, including only differences in the value of one hyper-parameter, for instance.

Figure 24:
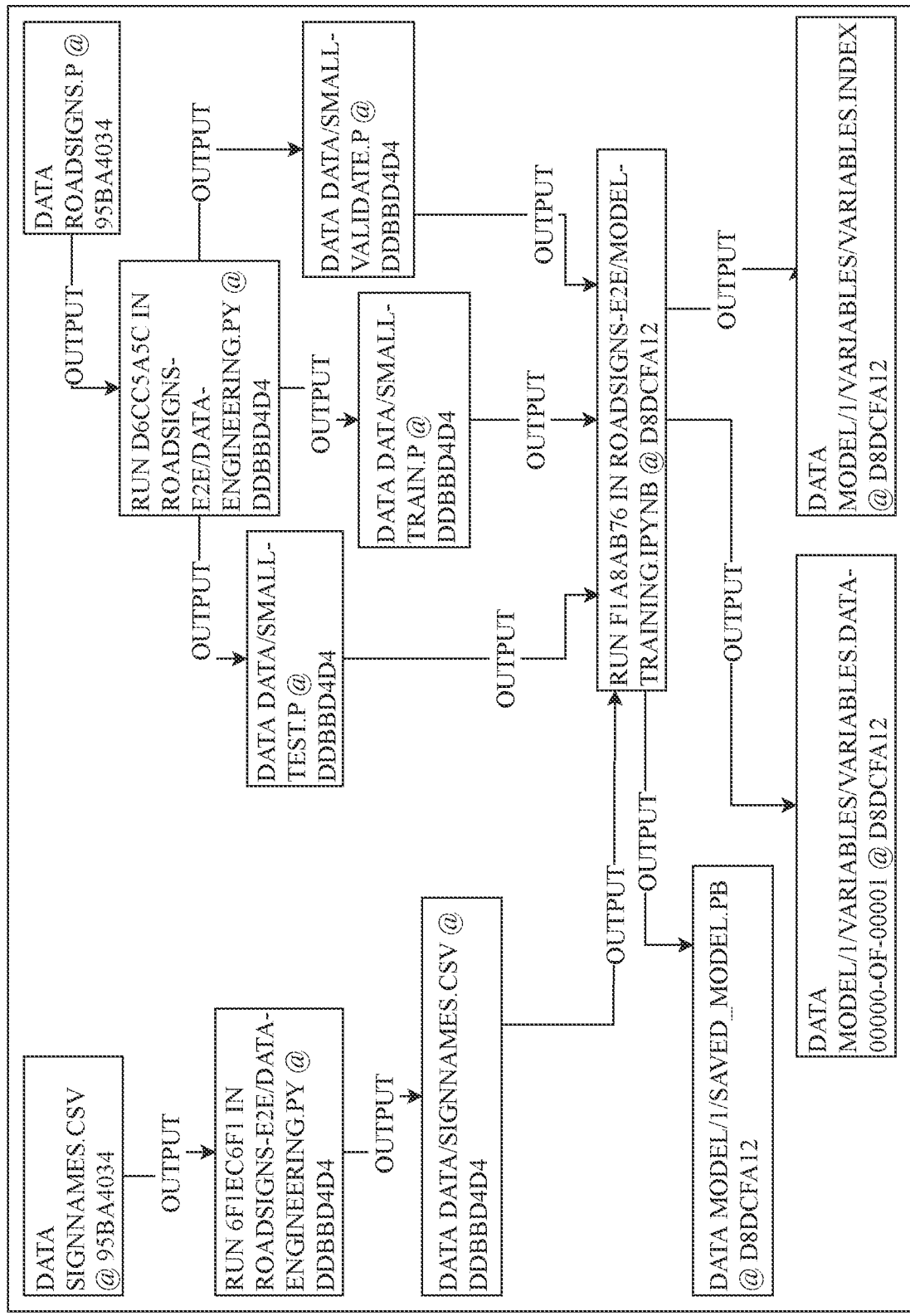
FIG. 24 is an implementation of another UI of the system of FIG. 1.
Figure 25:
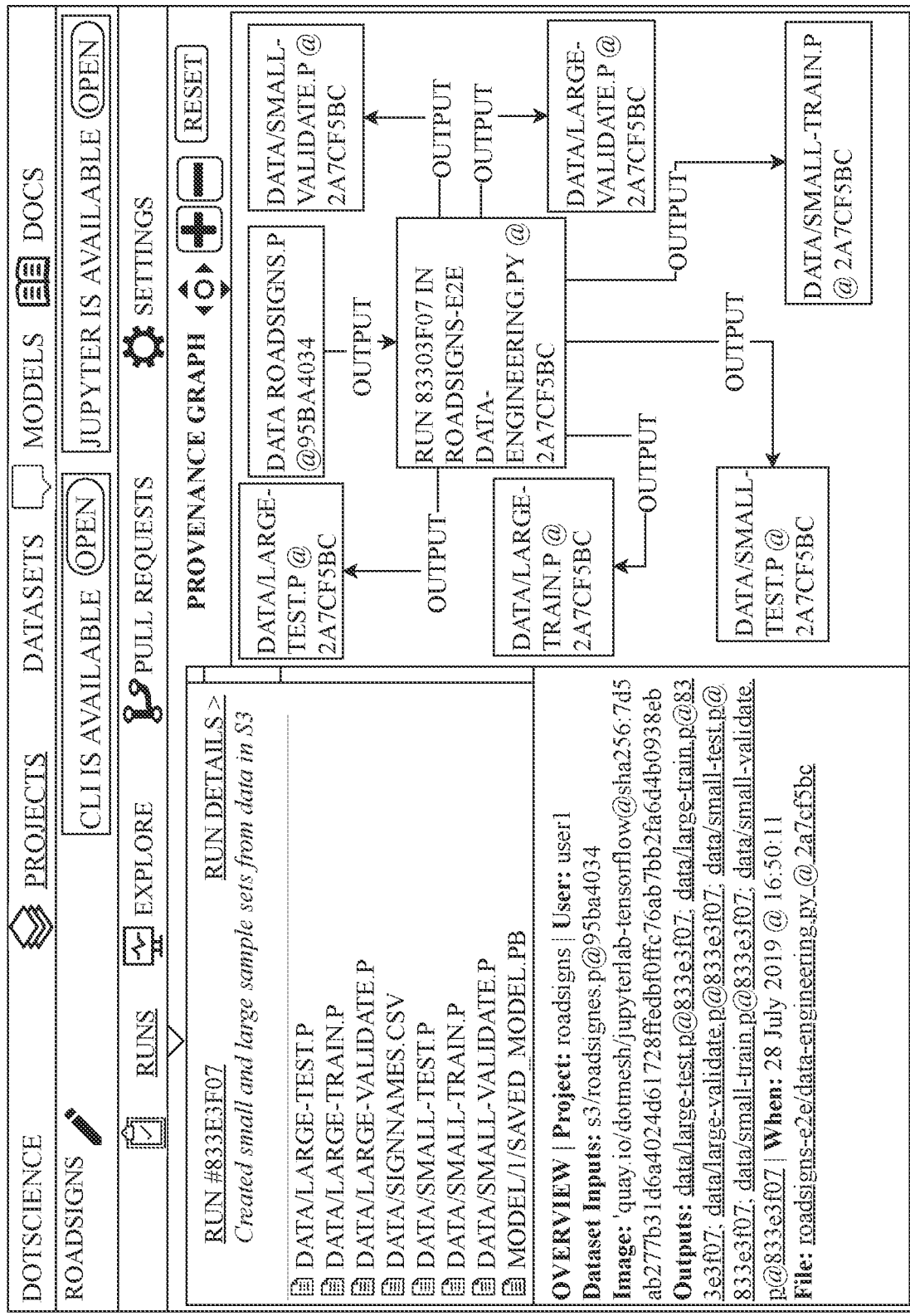
FIG. 25 is an implementation of another UI of the system of FIG. 1.

When the user hovers over one of the runs, as in FIG. 23, the user, parameters, and summary statistics are shown. The user could click on this data point to go to the runs interface for the run. The user in this case does this for the lower accuracy run and is brought to the runs interface (similar to FIG. 21) for that specific run and selects to see the run details. For simplicity runs interface 2400 of FIG. 24 shows only the provenance graph so that all of the graph can be seen in the drawing. The graph shows which raw data was used to create the small test, train and validation models and which label file was used to create the output label file. These four files are then seen as inputs to the model training run F1A8AB76 which outputs model D8DCFA12 (including its variables and variables index). The user (or any later user) can see what version of the training code was used to output the model, which datasets were used by the training code, which data engineering script generated the datasets, and which ingested raw data was used by the data engineering script. From this provenance graph the user can see that the bad model was created using the DDBD4D4 datasets. The user can similarly look at the provenance graph for the good model and see that it was trained using the 2A7CF5BC datasets. The user could go to the data engineering run (data run) for the good model (RUN #833E3F07) and for the bad model (RUN #D6CC5A5C) and see all the details in the OVERVIEW section of the runs interface, such as who did the run, when it occurred, etc. A representative example of this is shown by runs interface 2500 of FIG. 25. System 100 is tracking the data versions that are used to train ML models so that users may later see the information. Any of the individual files listed on the left side of FIG. 25 could be selected to see the provenance for that specific file.

As seen in FIG. 21, once a model is created within any project the topmost menu includes a MODELS selector which may be selected to bring the user to a models list as depicted by models interface 2600 of FIG. 26. This list includes, for each model, the project with which the model is associated, the date and time the model was generated, the parameters and summary statistics of the model, and the model framework. A deploy selector is shown for each model and may be used to deploy the model. In FIG. 26 the user has already selected the DEPLOY selector for the bottommost model, which is the more accurate road signs model, and a popup notification indicates that the model has been sent to the CI system and that the user may select a VIEW PIPELINE selector to see the pipeline or a CANCEL selector to cancel.

The user in this example selects VIEW PIPELINE. By selecting this the deployment goes into a CI system which runs a job and pulls the exact model version out of the system's S3 API (the system 100 exposes an S3 compatible API for deploying models so that the CI system pulls the model files from a system S3-compatible endpoint) and then deploys a container image which it has built and optimized for that model using TENSORFLOW SERVING and a model proxy into KUBERNETES (the CI system pushes the model into a DOCKER registry from where a continuous delivery tool can deploy it to, e.g., a KUBERNETES cluster). In this representative example the user has a KUBERNETES cluster running on GOOGLE CLOUD. Accordingly, in this example the system is ingesting data from S3 and deploying models to GOOGLE CLOUD. In other implementations the model may be deployed to any other production environment.

In implementations this model could be deployed on autonomous vehicles to accurately understand road signs. In this example the actual road sign predictor is a software application accessible through a website interface for users to review the prediction accuracy. The website UI shows different types of road signs such as: a 60 km/h speed limit sign, a no entry sign, a pedestrians sign, a stop sign, and a yield sign. Below each sign is a "Predict" selector which the user may select to have the model predict which type of road sign is depicted in the image. In this example the model correctly predicts that the 60 km/h sign is a 60 km/h sign, that the no entry sign is a no entry sign, that the stop sign is a stop sign, and that the yield sign is a yield sign, but inaccurately predicts that the pedestrians sign is a right-of-way at next intersection sign.

The deployed model has some inaccuracies and the user decides to train it on the larger dataset. The user returns to the notebook interface (as in FIG. 18) and changes the second cell entry of DATASET="small" to DATASET="large" and runs all cells again using the stochastic gradient descent (SGD) optimizer and 1 epoch. The user does not have to stop and think about versioning his/her work. The user could push the notebooks to GIT, but because the system automatically captures every run and its full context, the user does not need to manually record which versions of the data are being used or which parameters are used, because they are automatically being recorded and shared with the rest of the team.

Executing a model run to train the model on the larger dataset will train the model on 50,000 samples and validate the model on 839 samples. In this example when the user trains the model on the larger dataset a lower accuracy score of 76.7% is achieved. The user edits one of the cells to train the model on 3 epochs and runs all the cells again and an accuracy of 92.7% is achieved. The larger models take longer to upload to the hub and while being uploaded to the hub the notebook interface shows, in the STATUS section, "PUSHING" followed by a percentage of the file(s) uploaded to the hub. As indicated previously, the notebook interface also displays, on the left hand side in a RUNS section, a list of details of each run. The user believes greater accuracy could be achieved and thinks that Danesh may have some useful ideas on how to do this, and so sends an email or message to Danesh (in some cases through system 100).

Figure 27:
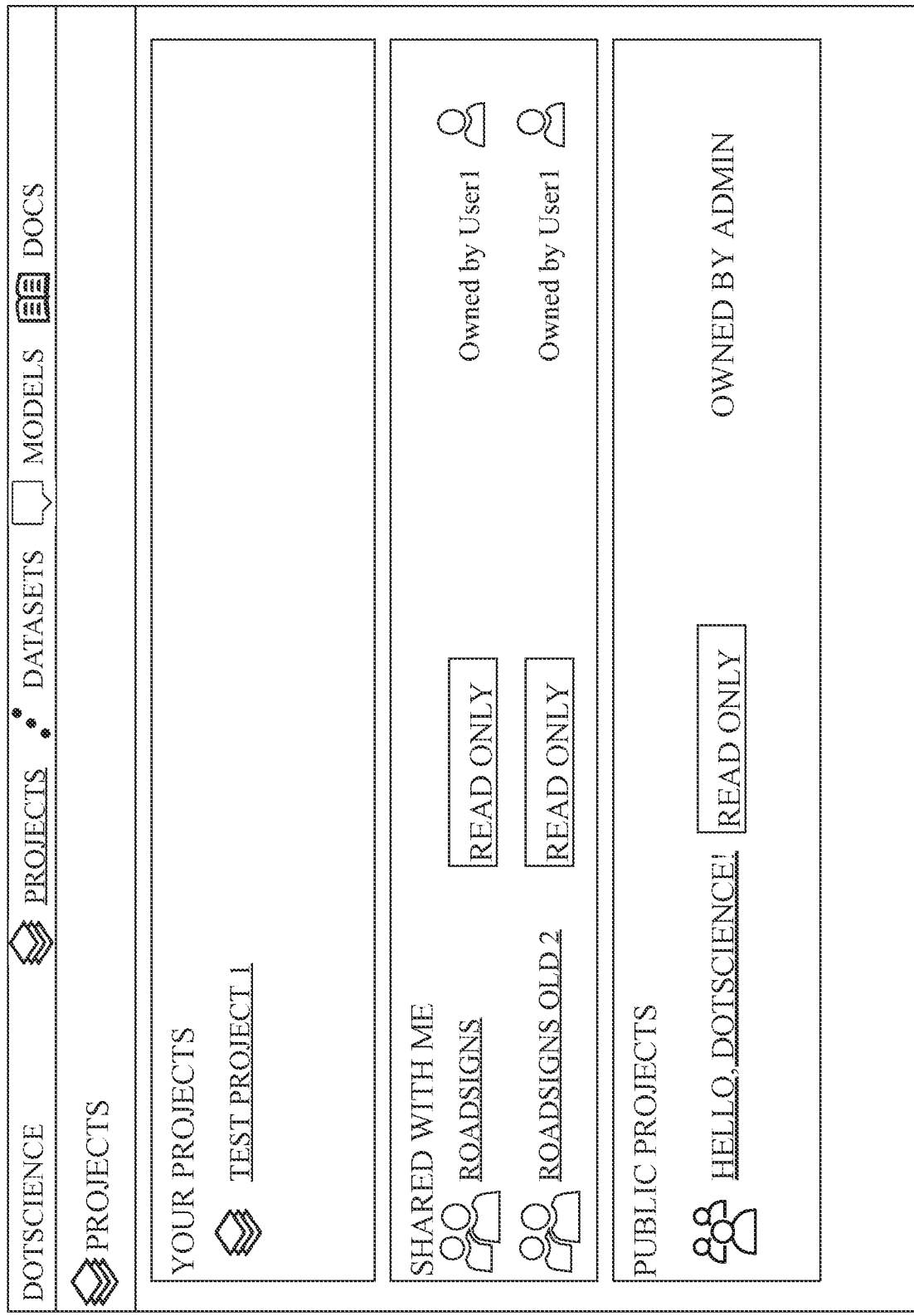
FIG. 27 is an implementation of another UI of the system of FIG. 1.

When Danesh logs into the system he sees, as shown on projects interface 2700 of FIG. 27, that ROADSIGNS is shared with him but is a read only file owned by User1. Danesh selects the ROADSIGNS model and views, on the runs interface (similar to FIG. 17) all runs that have been performed so far, including the provenance graphs and all of the OVERVIEW information for each run and each file. Using the runs interface Danesh sees that RUN #D6CC5A5C created large and small datasets, RUN #F1A8AB76 trained a TENSORFLOW model, RUN #833E3F07 created additional large and small datasets (and by selecting the roadsigns-e2e/data-engineerying.py file while viewing this run he can see that the shuffling code was added in the data engineering script), and that RUN #3D8A6C79 trained another TENSORFLOW model.

Figure 28:
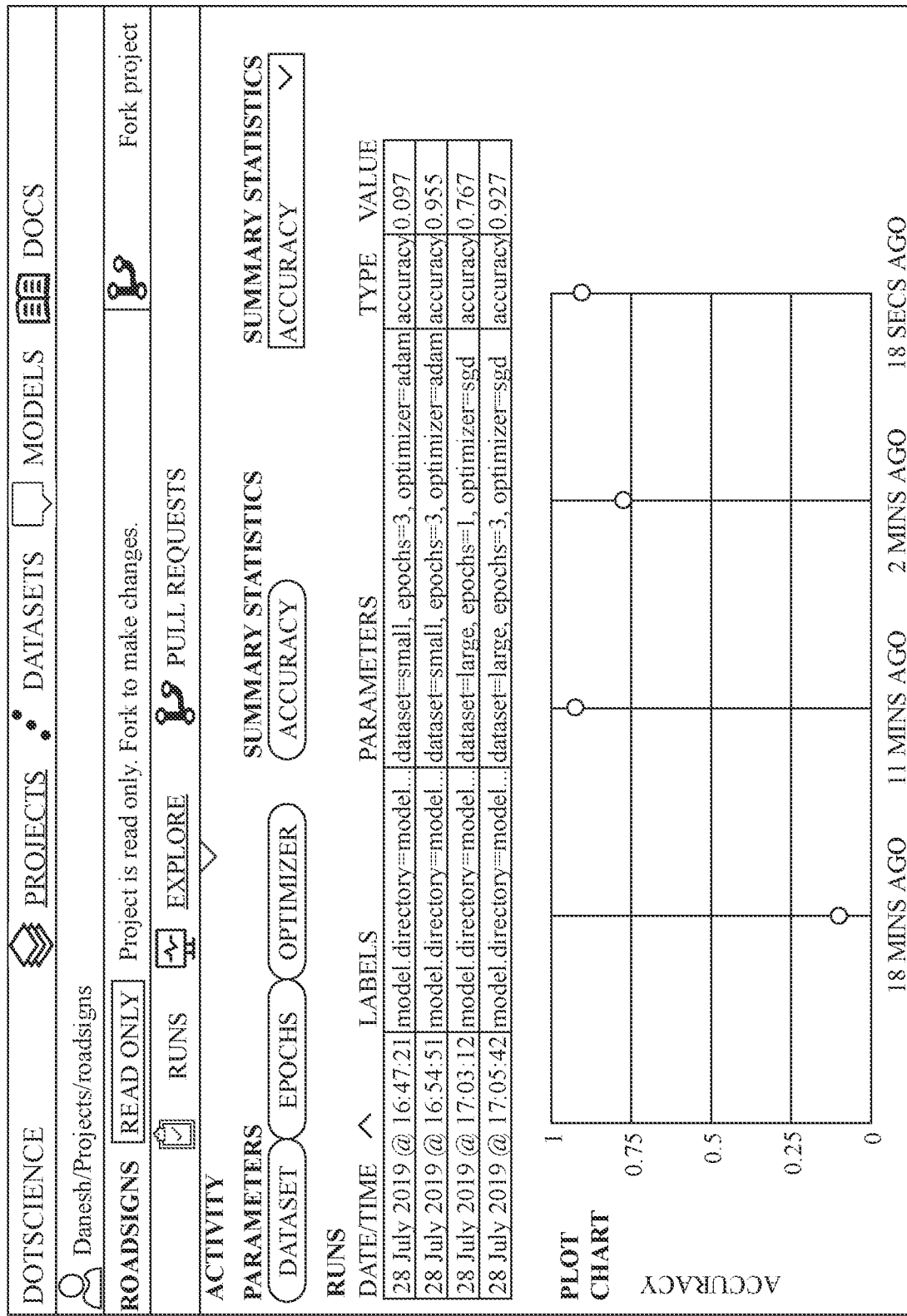
FIG. 28 is an implementation of another UI of the system of FIG. 1.

Danesh can view explore interface 2800 of FIG. 28 to see that four model runs, using different parameters, have achieved accuracies of 9.7%, 95.5%, 76.7% and 92.7%. He sees that 95.5% was achieved with the small dataset but that the accuracy has not been as high with the large dataset. Danesh understands the goal of increasing accuracy on the large dataset. At the top of the RUNS and EXPLORE interfaces Danesh can see an indicator that this project is READ ONLY and a selector is included to fork it. Danesh selects the "Fork project" selector to fork the project, which creates a read/write copy of the project that he can modify without modifying User1's original copy. If Danesh returns to interface 2700 he would then see a ROADSIGNS project in the "YOUR PROJECTS" section that is owned by Danesh. By forking the project Danesh can do concurrent collaboration, trying to achieve greater model accuracy, without making any modifications to the project owned by User1, which User1 may still be working on.

Figure 29:
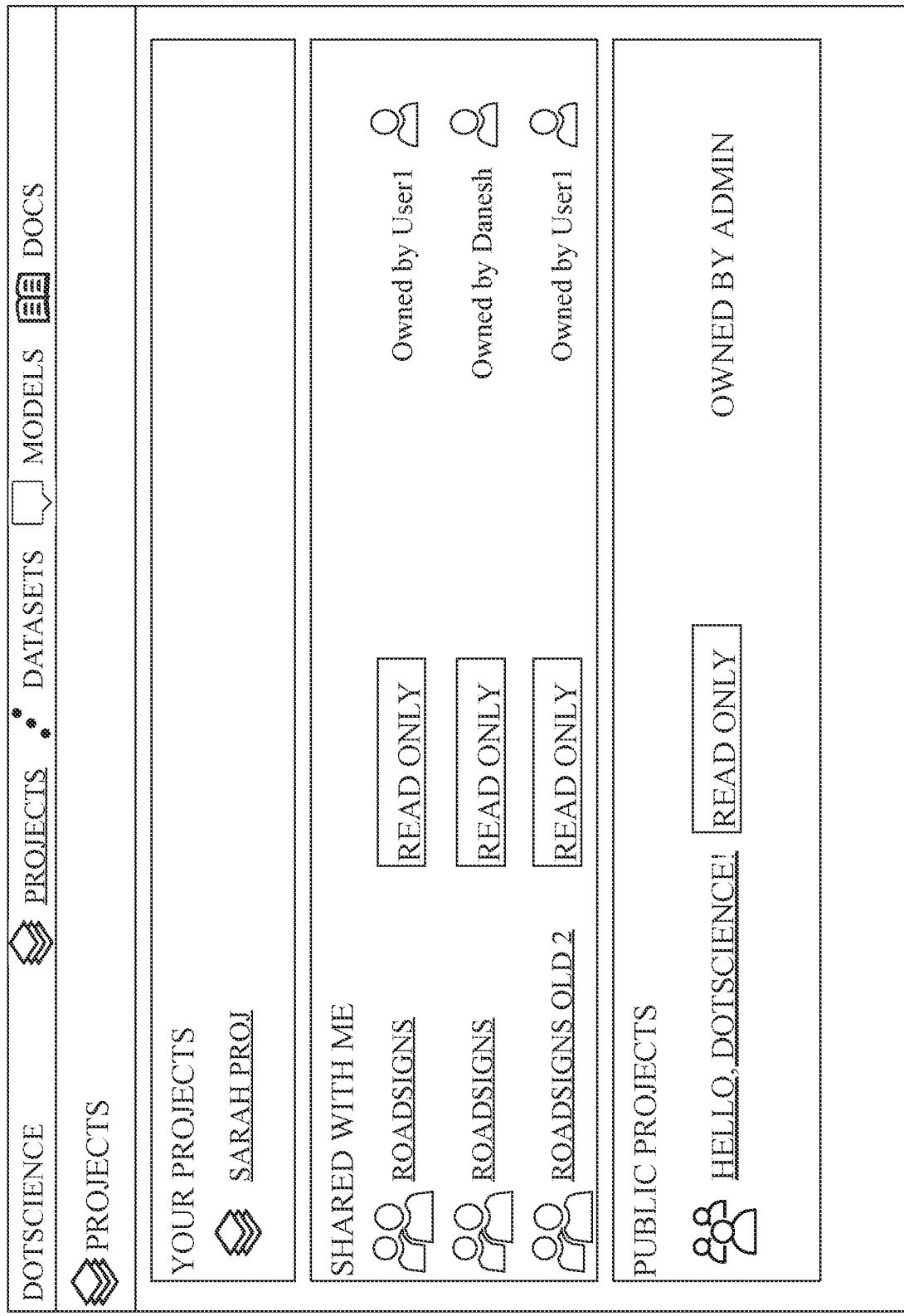
FIG. 29 is an implementation of another UI of the system of FIG. 1.

Projects interface 2900 of FIG. 29 shows the projects interface at Sarah's end. Sarah is the team lead and sees User1's version of the ROADSIGNS project and Danesh's version of the ROADSIGNS project, both of which are read only versions shared with her (though she could similarly fork the project from either version, as Danesh has done). She can view all runs and all accuracy scores for either project, noting that the best accuracy on the large dataset is 92.7%.

Danesh loads JUPYTER on his fork and notices on notebook interface 3000 of FIG. 30, that User1 used the SGD optimizer. Danesh has had good experiences with the ADAM optimizer and switches SGD in this cell to ADAM and runs all cells, achieving 98.1% accuracy.

Figure 31:
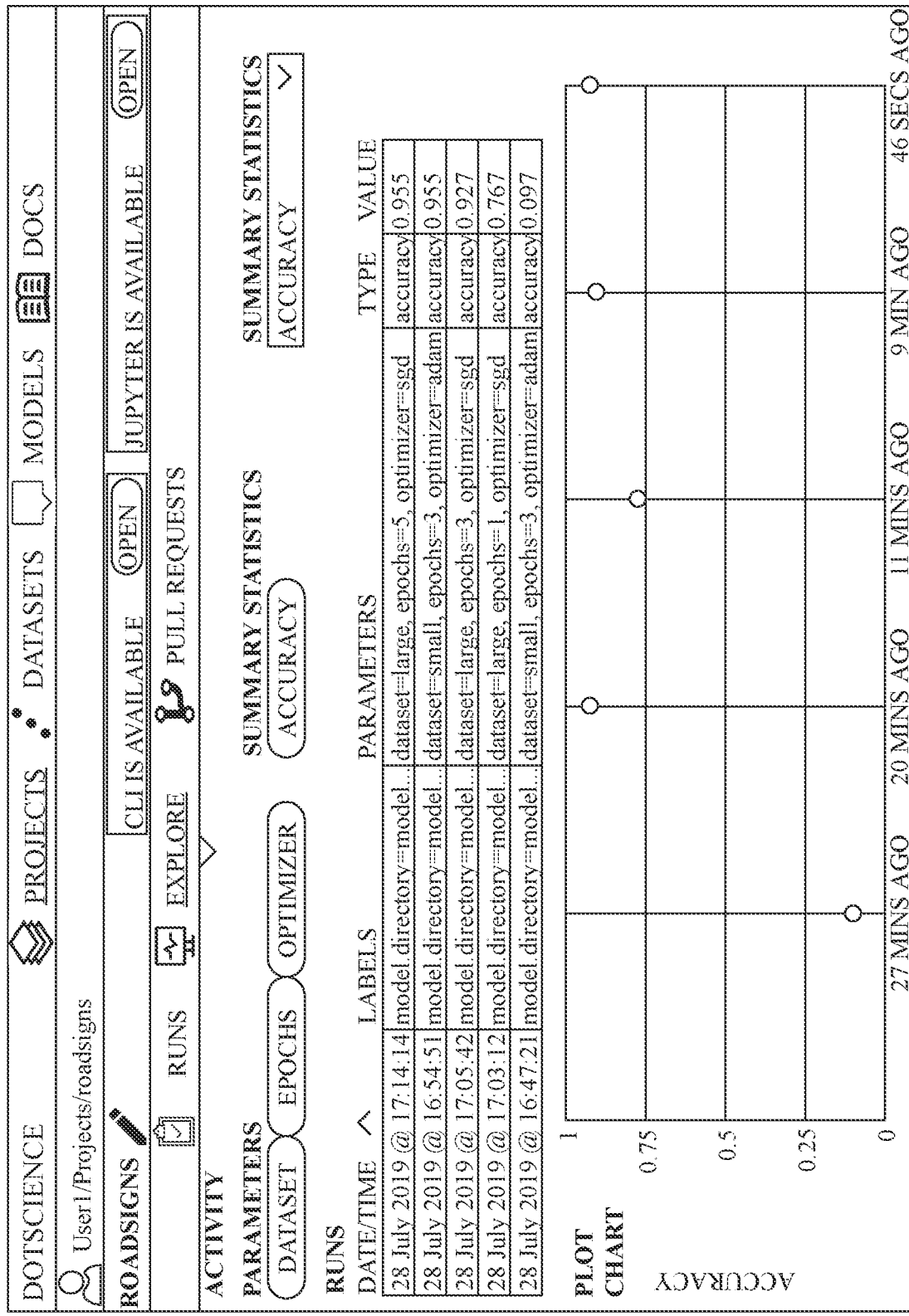
FIG. 31 is an implementation of another UI of the system of FIG. 1.

Danesh wants to propose the change to the ADAM optimizer to User1, but User1 has made changes as well. User1 had decided to change the number of epochs from 3 to 5 and ran that cell and all below it again, and this model run resulted in an accuracy of 95.5%. User1's latest version of the notebook and Danesh's latest version of the notebook have accordingly diverged, since they have made different changes to the convolutional neural net cell shown in interface 3000. User1 does not remember whether this was better than the previous large dataset run, but since User1 is using the system 100 to perform the model runs User1 can review the EXPLORE tab, as seen on explore interface 3100 of FIG. 31, to determine that indeed this last model run is the most accurate User1 has achieved with the large dataset. The plot chart shows the runs organized by accuracy vs. time, though in implementations, as in FIG. 31, the time increments do not change the distance on the x axis between runs (i.e., equal distance between runs regardless of how much time elapses between them). The runs table above the plot chart shows the model runs lined up in decreasing accuracy. In implementations the user may be able to organize this table by date/time of run, labels, parameters, and accuracy, either in increasing or decreasing value or alphabetical order.

Figure 32:
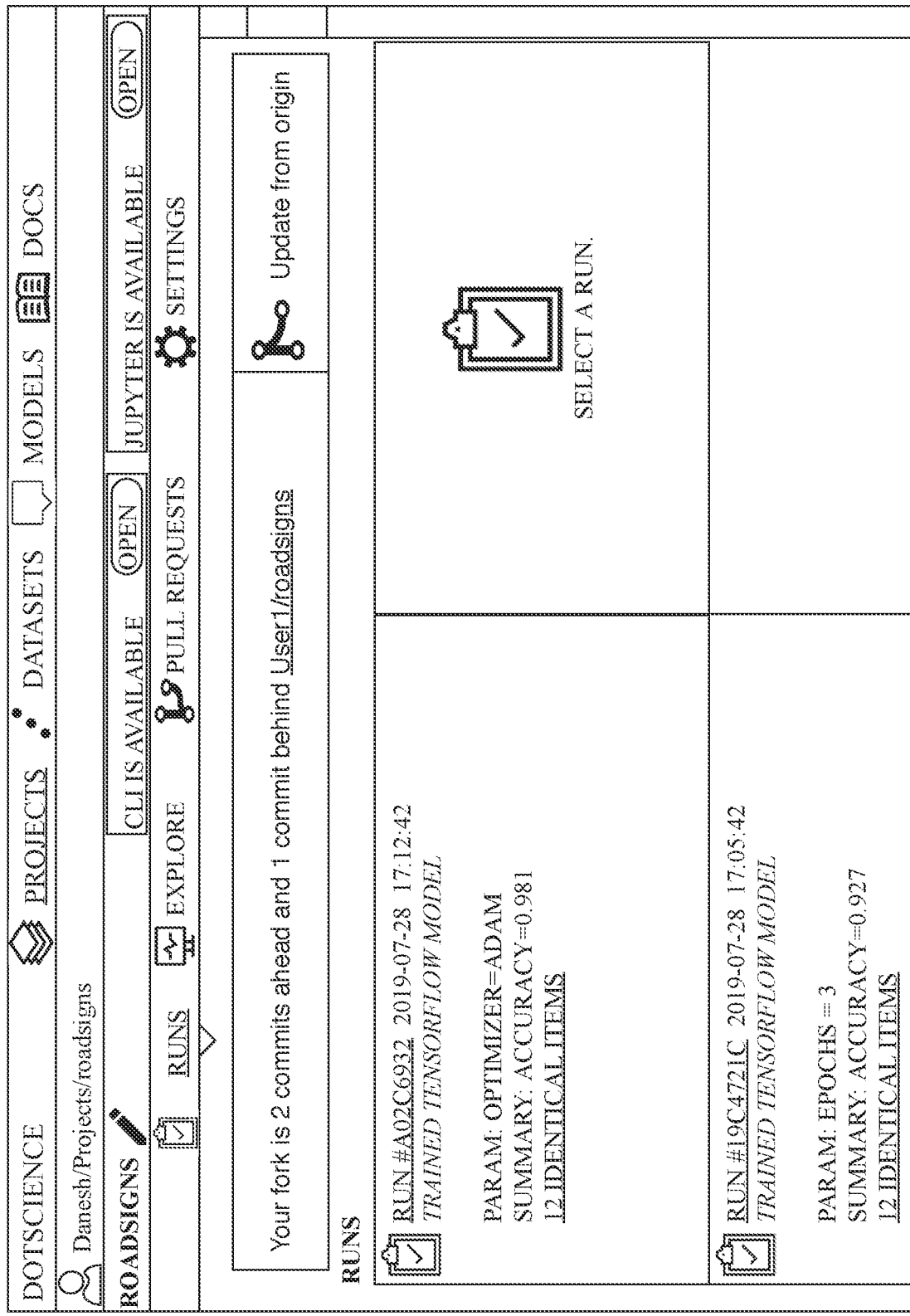
FIG. 32 is an implementation of another UI of the system of FIG. 1.

Turning to runs interface 3200 of FIG. 32, Danesh sees a status indicator stating that his fork is 2 commits ahead and 1 commit behind User1's version of the project. Knowing this, Danesh can select the "Update from origin" selector to update his fork from User1's version of the project. When this is selected a conflict interface 3300 shown in FIG. 33 is displayed.

Danesh has made a few selections on this interface, such as selecting to clear all cell outputs (which by default selects to clear conflicted cell outputs). This selection means the user wishes to discard the outputs of all cells, not just cells with conflicts. This might be useful, for example, when the notebook includes cells that use as inputs the outputs of other cells—in such an instance discarding the outputs of all cells may be useful. Danesh could, alternatively, select to clear only conflicted cell outputs to keep the outputs of only cells without conflicts.

Danesh could also select the "Delete cell" selector on any cell to delete the cell from a merged version that will be created. In any case, Danesh could select the RESET selector at any time to reset to default selections).

Figure 33:
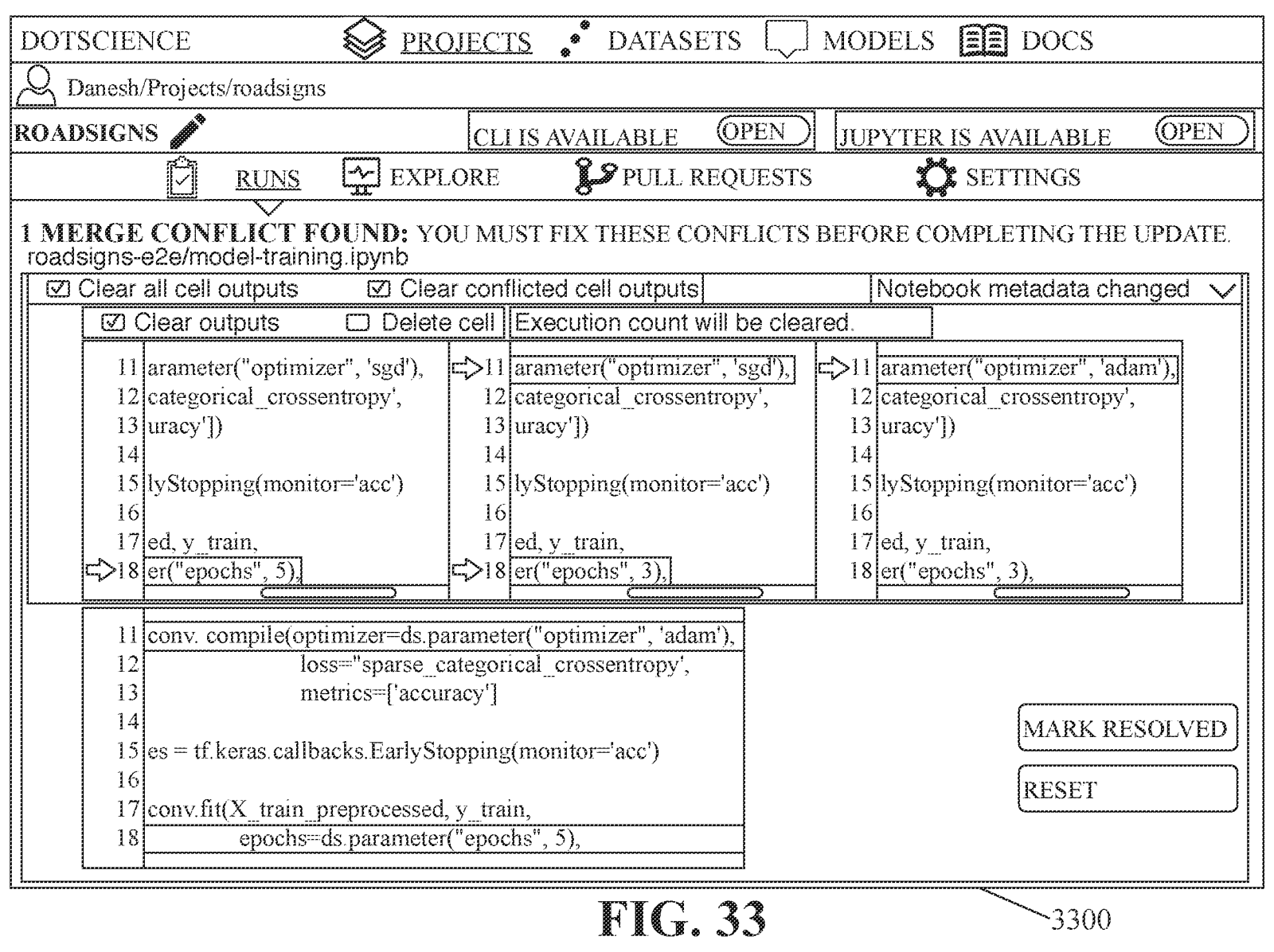

As seen in FIG. 33, system 100 displays notebook conflicts to Danesh. He can see by comparing the first (left) notebook display with the middle notebook display that User1's notebook uses 5 epochs while the original uses 3. He can also see by comparing the middle notebook display with the right notebook display that his model uses the ADAM optimizer while the original model uses the SGD optimizer. In the bottom left window, accordingly, the system indicates that merging both changes would use the ADAM optimizer and 5 epochs.

System 100 shows Danesh differences between the original notebook, User1's notebook and his notebook, and lets him simply and intuitively create a merged notebook without having to use GIT. Danesh selects MARK RESOLVED bringing him to an interface indicating no conflicts are found between his fork and upstream, meaning he can complete the merge. A CANCEL selector displayed on this interface allows him to cancel the merge, and a COMPLETE MERGE selector allows him to complete it. Danesh in this example selects to complete the merge.

Figure 34:
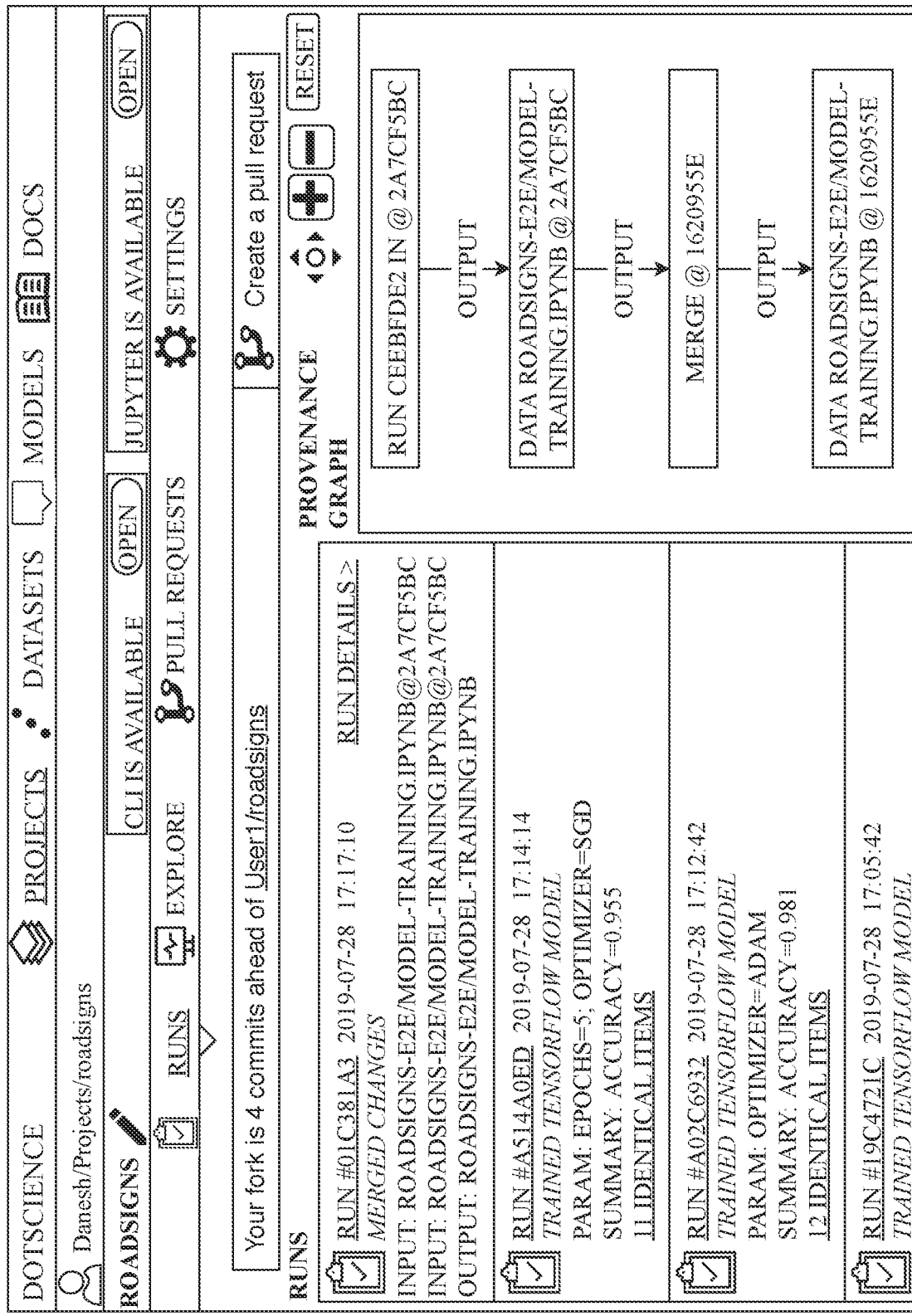
FIG. 34 is an implementation of another UI of the system of FIG. 1.

When the merge is completed Danesh's project merges the run history of the two users so that the run details for RUN #A514A0ED are imported, and the merge itself is included as RUN #01C381A3 (though a model run has not yet been executed using the merged model), as illustrated by runs interface 3400 of FIG. 34. The OVERVIEW for RUN #A514A0ED will show User1 as the user executing that run and the OVERVIEW for RUN #A02C6932 will show Danesh as the user executing that run. In FIG. 34 Danesh has already selected the run details for the latest run and is viewing the provenance graph for the merged run. This graph shows the change to the model (i.e., to the IPYTHON/JUPYTER notebook). In recording this "run" the notebook itself is treated as data in the system rather than code, the run denoting the merge.

The view shown in interface 3400 is again a merged view of two interfaces, in implementations when Danesh selects the RUN DETAILS selector the provenance graph is not immediately shown, but a list of the files related to the run, and the user can then select the run itself or any individual file to see the related provenance graph and overview details. In FIG. 34 these details are merged into the same interface just for ease of showing the elements.

As indicated above, RUN #01C381A3 includes a changed notebook state which has not actually been run. While having this run selected (as in FIG. 34) Danesh opens JUPYTER. The notebook at present includes outdated output from the prior run using the ADAM optimizer and 3 epochs, but the cells are now configured to execute a model run using the ADAM optimizer and 5 epochs due to the merge. Danesh selects the "Run All Cells" option from the RUN menu in the notebook interface, and the accuracy ends up being 98.8%.

Figure 35:
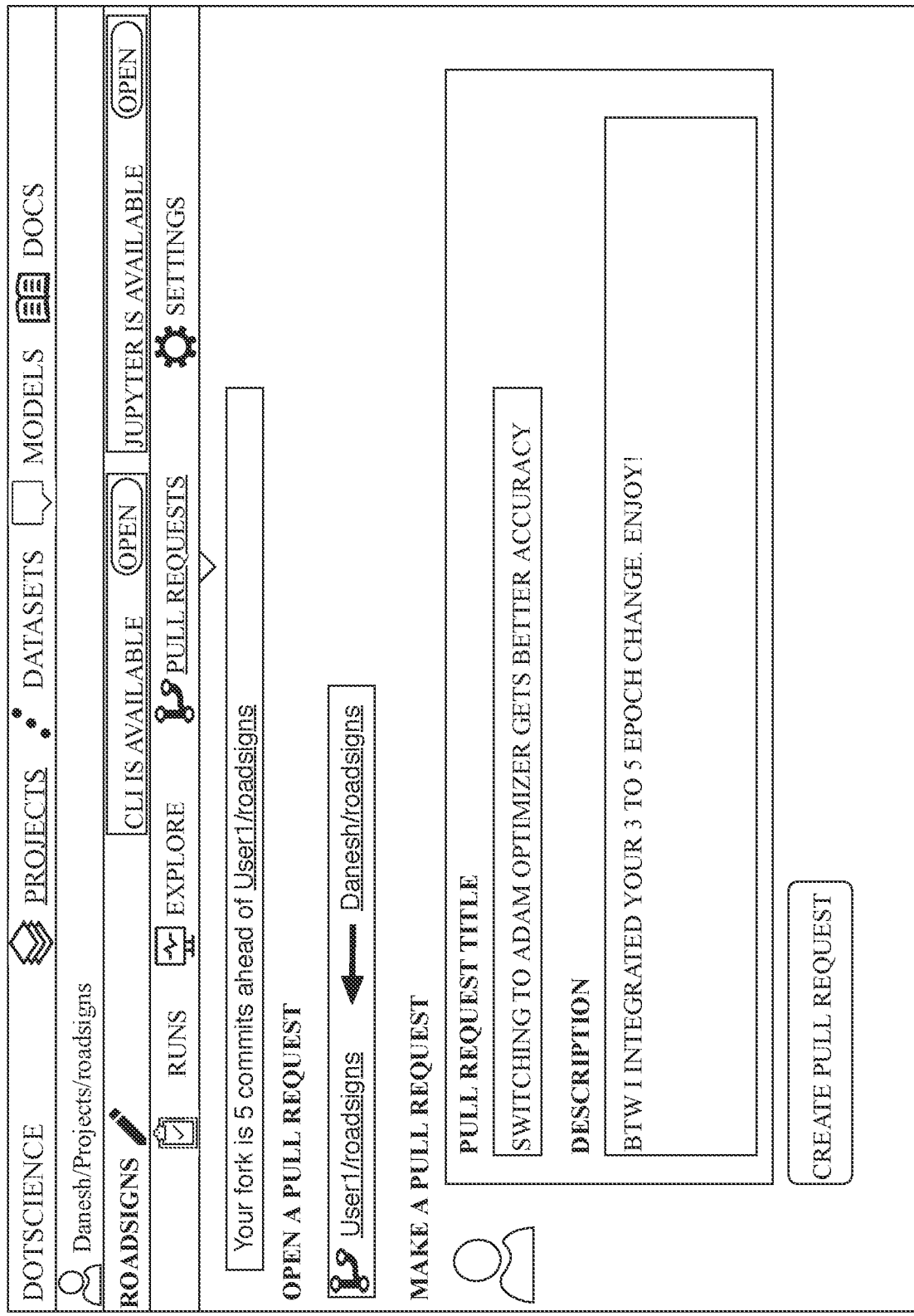
FIG. 35 is an implementation of another UI of the system of FIG. 1.

Danesh sees on the EXPLORE tab that this run is the most accurate. Danesh navigates to the PULL REQUESTS tab to initiate a pull request (or selects the "Create a pull request" selector, previously shown on interface 3400, which is also seen on the EXPLORE tab), which brings Danesh to pull request interface 3500 of FIG. 35. Danesh's fork is 5 commits ahead of User1/roadsigns. The pull request will request User1/roadsigns to incorporate the changes made to Danesh/roadsigns. Danesh may provide a pull request title and description and select CREATE PULL REQUEST to initiate the pull request.

In other implementations Danesh, upon initially selecting the PULL REQUESTS tab (or the "Create a pull request" selector) may be brought to a page which shows the number and detail of the changed files, in this case there are 4 changed files: model/1/saved_model.pb; model/1/variables.data-00000-of-00001; model/1/variables/variables.index; and roadsigns-e2e/model-training.ipynb), and shows changes between User1's latest notebook and the notebook of the pull request, similar to FIG. 33. In this case the difference is the switch to the ADAM optimizer since Danesh already incorporated 5 epochs. On this page Danesh may select a second "Create a pull request" selector to open the MAKE A PULL REQUEST section shown in FIG. 35. In this case Danesh inserts a title and description and selects CREATE PULL REQUEST.

Figure 36:
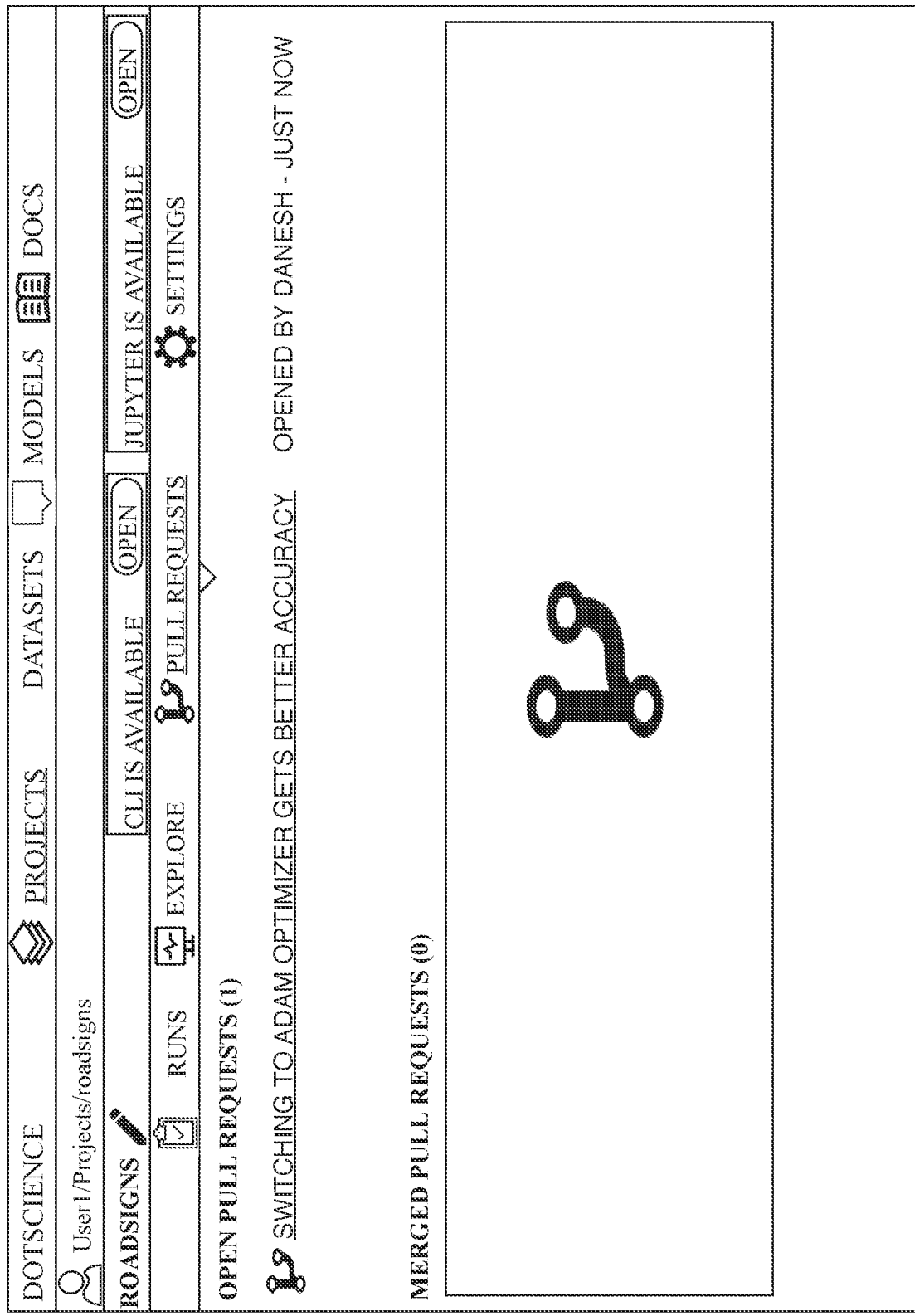
FIG. 36 is an implementation of another UI of the system of FIG. 1.
Figure 37:
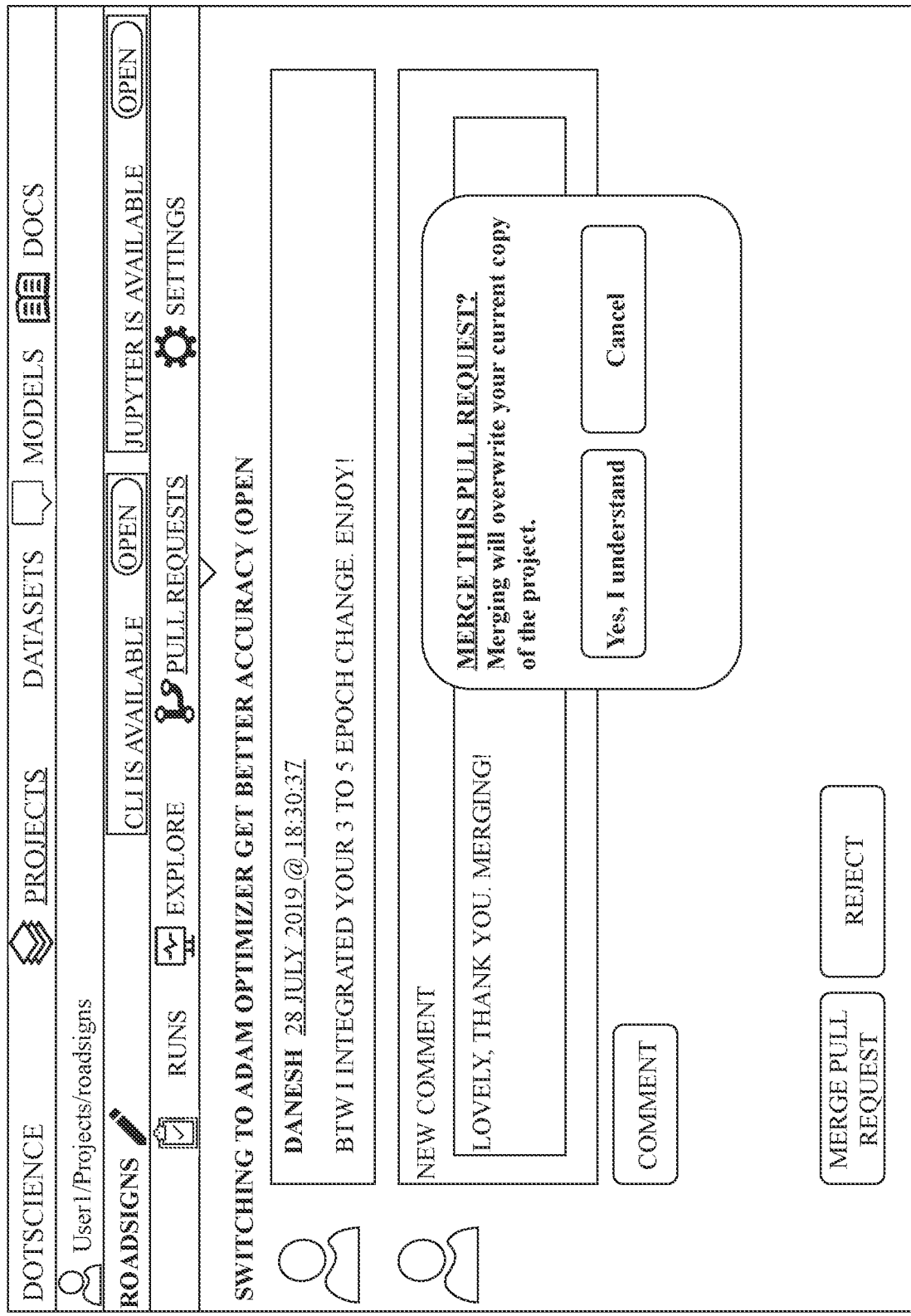
FIG. 37 is an implementation of another UI of the system of FIG. 1.

At User1's end a notification of some sort may be shown on one or more of the UIs (for example showing a number 1 or some highlight on the PULL REQUESTS tab) or an email or other notification may be sent to User1. In any case, User1 navigates to the PULL REQUESTS tab and sees the open pull request initiated by Danesh, as illustrated on pull request interface 3600 of FIG. 36. Upon selecting the open pull request User1 is brought to pull request interface 3700 of FIG. 37 showing Danesh's title and subject, and the date and time of the pull request. User1 can leave a comment for Danesh and upon selecting the COMMENT selector this message will be sent to Danesh). User1 could reject the pull request by selecting REJECT, which in implementations would notify Danesh, but in this example selects MERGE PULL REQUEST which brings up the popup notification "MERGE THIS PULL REQUEST?" which indicates that this will overwrite User1's current copy of the project and allows the user to select a cancel selector to cancel the merge or a confirmation selector to continue with the merge. Once the merge is complete User1's and Danesh's copies of the project, for the time being, are identical.

User1 then could navigate to the RUNS tab to view the runs interface and see all of the runs from beginning to end up to this point, along with the provenance and overview for each run and for each individual file associated with each run. For example, User1 could view the following runs and all provenance and overviews from the runs interface: data run #D6CC5A5C, executed Jul. 28, 2019 at 16:38:36 by User1, creating small and large sample sets from S3 raw data; data run #6F1EC6F1, executed Jul. 28, 2019 at 16:38:36 by User1, copying signnames.csv from S3; data run #62DBC405 (having an execution date and time of 1-1-1 00:00:00) in which the following output files were generated which runs did not account for: data, roadsigns-e2e, roadsigns-e2e/README.md, roadsigns-e2d/data-engineering.py, and roadsigns-e2e/model-training.ipynb; model run #F1A8AB76, executed Jul. 28, 2019 at 16:47:21 by User1, training a TENSORFLOW model using the ADAM optimizer, 3 epochs, and the small dataset, achieving 9.7% accuracy; data run #833E3F07, executed Jul. 28, 2019 at 16:50:11 by User1, creating small and large sample sets from shuffled S3 raw data; data run #DB6D933A, executed Jul. 28, 2019 at 16:50:11 by User1, copying signnames.csv from S3; data run #CEEBFDE2 (having an execution date and time of 1-1-1 00:00:00) in which the following output files were generated which runs did not account for: roadsigns-e2d/data-engineering.py, roadsigns-e2e/model-training.ipynb, and roadsigns-e2e; model run #3CA95C6B, executed Jul. 28, 2019 at 16:54:51 by User1, training a TENSORFLOW model using the ADAM optimizer, 3 epochs, and the shuffled small dataset, achieving 95.5% accuracy; model run #3D8A6C79, executed Jul. 28, 2019 at 17:03:12 by User1, training a TENSORFLOW model using the SGD optimizer, 1 epoch, and the shuffled large dataset, achieving 76.7% accuracy; model run #19C4721C, executed Jul. 28, 2019 at 17:05:42 by User1, training a TENSORFLOW model using the SGD optimizer, 3 epochs, and the shuffled large dataset, achieving 92.7% accuracy; model run #A02C6932, executed Jul. 28, 2019 at 17:12:42 by Danesh, training a TENSORFLOW model using the ADAM optimizer, 3 epochs and the shuffled large dataset, achieving 98.1% accuracy; model run #A514A0ED, executed Jul. 28, 2019 at 17:14:14 by User1, training a TENSORFLOW model using the SGD optimizer, 5 epochs, and the shuffled large dataset, achieving 95.5% accuracy; model run #01C381A3, executed Jul. 28, 2019 at 17:17:10 by Danesh, merging User1's updates with Danesh's version of the project; and model run #FCBB0267, executed Jul. 28, 2019 at 17:28:54 by Danesh, training a TENSORFLOW model using the ADAM optimizer, 5 epochs, and the shuffled large dataset, achieving 98.8% accuracy. On the runs interface, as on other interfaces disclosed herein, the user may be able to scroll down to see further information. On any disclosed interface selectable items may be displayed in a different color hovered over and/or selected.

Figure 38:
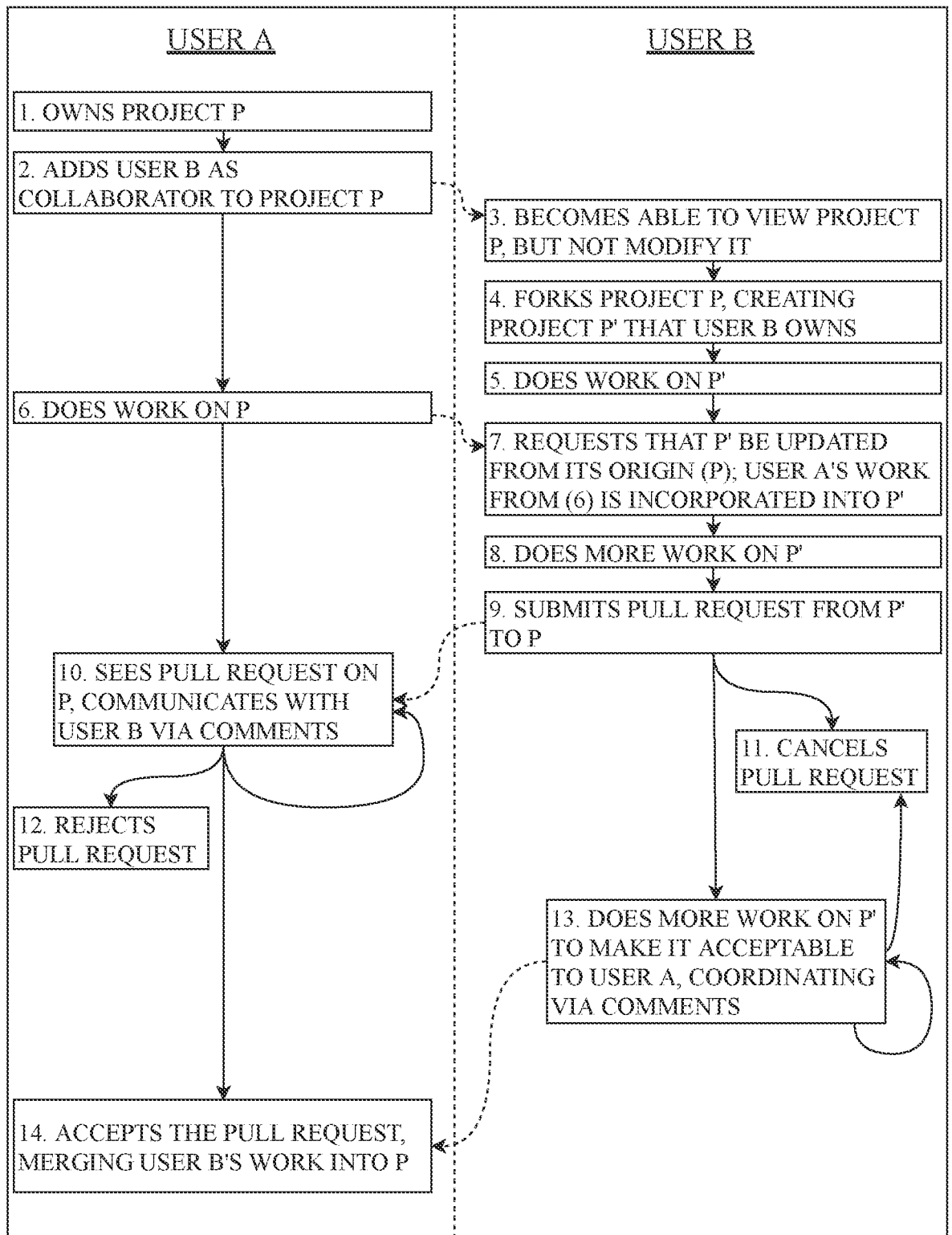
FIG. 38 is a diagram of a collaboration method using the system of FIG. 1.

Diagram 3800 of FIG. 38 shows a flowchart representing collaboration as described above. In this example user A owns project P and adds user B as a collaborator. User B is able to view P but not modify it. User B forks project P, creating project P' which user B owns, and does work on project P'. Meanwhile, user A does work on project P. User B requests that project P' be updated from its origin (project P), and user A's work is incorporated into P'. User B does more work on P' and submits a pull request from P' to P. User A sees the pull request on P and communicates with user B via comments. User B cancels the pull request and/or user A rejects the pull request. User B does more work on P' to make it acceptable to user A, coordinating via comments, and finally user A accepts the pull request, merging user B's work into P.

Figure 39:
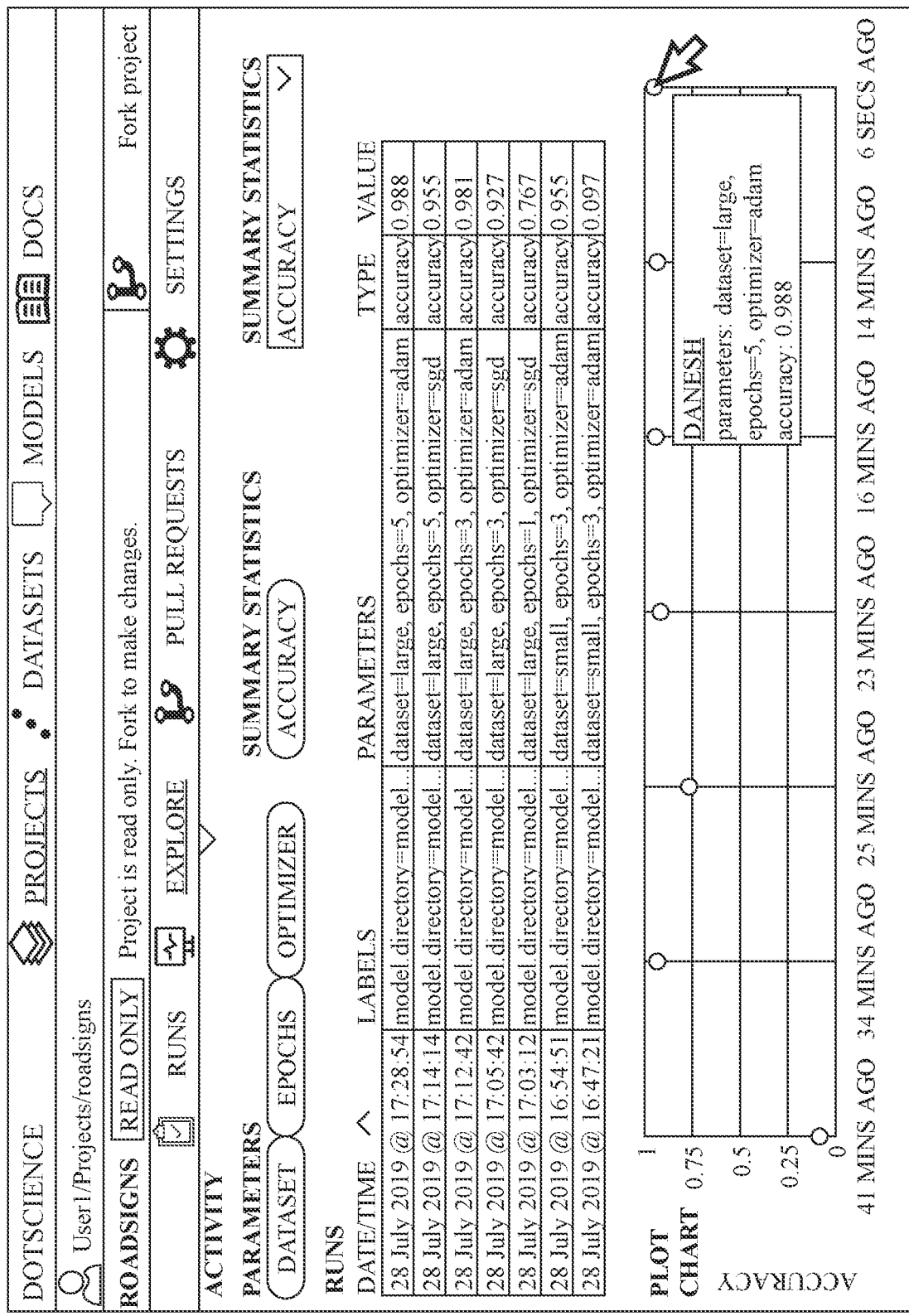
FIG. 39 is an implementation of another UI of the system of FIG. 1.

Explore interface 3900 of FIG. 39 shows the team leader Sarah's view of the EXPLORE tab of User1's merged project, which shows the seven model runs and their accuracy. She sees which users achieved which scores and the parameters they used to achieve those accuracies.

User1 deploys the 98.8% accurate model in the manner described previously, deploying it to the CI system (in this case is GITLAB) to build the image, which is then deployed to a KUBERNETES cluster which creates a container and runs the model. The user returns to the web application to determine the prediction accuracy. In this deployment the model is predicting the 60 km/h sign to be a 50 km/h sign and that the stop sign is a yield sign, while predicting the other road signs accurately. Interestingly, the model that achieved the highest accuracy in training is performing less well than a model trained on less data that had a lower accuracy in training.

The systems and methods disclosed herein enable statistical monitoring with a component called the DOTSCIENCE model proxy. This service works as an interceptor of requests/responses to and from TENSORFLOW SERVING (or similar services). Users, using the API, can set which parameters they want to capture for statistics. This integrates with PROMETHEUS to, for example, allow users to monitor the distribution of predictions in a categorical model (one of which is predicting what category of thing a certain input is, such as predicting road signs from images). Users can use PROMETHEUS and GRAFANA to create dashboards of the statistics of the models in production, in addition to usual RED metrics (request rate, errors, duration) that the user would want to monitor for any microservice.

Figure 40:
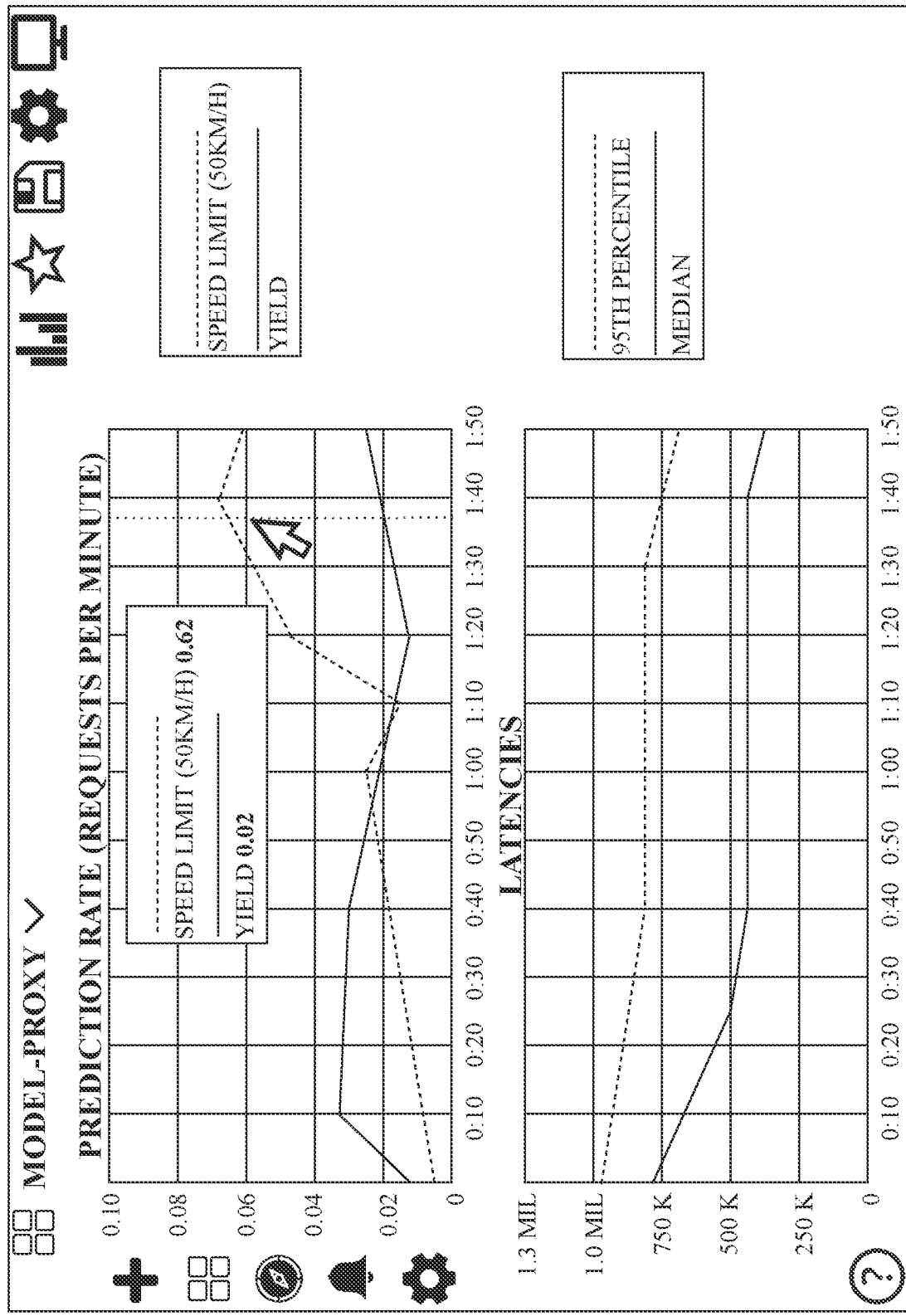
FIG. 40 is an implementation of another UI of the system of FIG. 1.

The user in this example wants to monitor the behavior of the model in production. The monitoring may be done using interfaces such as interface 4000 of FIG. 40. In implementations these interfaces could be implemented using GRAFANA and PROMETHEUS, though in other implementations the interface 4000 or similar interfaces may be implemented using other software/tools. Data from each prediction done through the web interface, in this example, is used to build a prediction rate graph and a latency graph, as can be seen. For example, the user in this case clicks several times on the 60 km/h sign between about 1:10 and 1:50 and the model always predicts that the sign is a 50 km/h sign so that the 50 km/h speed limit prediction rate increases. The yield sign prediction rate remains low, but the user monitoring this graph may be able to determine that, for instance, more 50 km/h predictions are being made than would be warranted by an expected number of 50 km/h signs on roads in the target area, and so may be able to determine from this that the model is making inaccurate predictions. While the example here uses a web application, the same type of monitoring could be done with an actual fleet of automated vehicles, and the user could monitor the predictions of the model in practice, while the fleet is operating, to determine whether any prediction rates are different than expected and, thus, possibly indicating inaccurate predictions and a need to revise the model.

The user has hovered the cursor in monitoring interface 4000 at a certain location on the prediction rate graph and a window giving the prediction rates for the two signs is shown. In other implementations many more types of sign predictions could be monitored and the popup could show results for each type of sign prediction, even those for which the prediction rate is 0 at that point in time. The latencies graph shows the user how long it takes for the model to make the predictions of the various signs. The type of monitoring representatively illustrated in FIG. 40 may allow the user to see, for example, that the model that achieved the best accuracy in training actually gets the speed limit wrong in practice. This allows the user to return to the data/model engineering steps to make modifications as needed to achieve greater accuracy in deployment.

The system may utilize the following software/platforms: JUPYTER may be used within the system and the user may view run history in the JUPYTER plugin; a customized PYTHON library may instrument data and model runs for full tracking; private deployments may be launched with a few clicks in the AMAZON AWS marketplace; DOCKER may automatically containerize all work—users may bring their own images when running scripts; a CIRCLECI CI job may trigger runs to track model training—the system may work with JENKINS and other CI systems; users may give the system access to GIT and GITHUB repos to automatically check out code; using TENSORFLOW the user may automatically monitor categorical predictions with the system's model proxy, which in implementations works with TENSORFLOW EXTENDED (TFX) (TENSORBOARD may be installed together with TENSORFLOW so that once the user launches the JUPYTER notebook it will already be available there); model proxy may be integrated with PROMETHEUS, GRAFANA and ALERTMANAGER for monitoring and alerting; users may access data in S3 from within the system, with versioning and provenance integration; users may attach a KUBERNETES cluster as a runner and deploy models into KUBERNETES via CI; and the system may integrate with any PYTHON ML framework or library, CI system, infrastructure and deployment system. When the user sets up a runner the user works inside a DOCKER container on that runner, meaning that to use libraries in the model the libraries need to be not just on the runner but accessible inside the container. Some common data science libraries (PANDAS, NUMPY, TENSORFLOW) are installed in the container by default. To use a library that is not installed the user can select File>New>Terminal within JUPYTERLAB and install the library. PIP is available for installing PYTHON packages.

System 100 allows tracking of data runs and model runs automatically and accurately. Users may attach external datasets, such as S3 datasets, and track reproducibility and provenance. Any computers (laptop, GPU rig, local server, enterprise data center, cloud instances, etc.) may be attached as runners. Every data run and model run is reproducible using system 100, including code, data parameters, metrics, etc. Runs are continuously and automatically published for team learning. The system allows a team of users to collaborate by sharing knowledge with one another even in different locations and time zones. Users can fork other team members' projects and make pull requests, JUPYTER notebooks included. The system user interfaces integrate seamlessly with JUPYTERLAB and with batch processes. The provenance stored using system 100 allows users to trace a model to its training data and back from that to the raw data. Full provenance of every model gives a complete forensic audit trail of where models came from. Users may explore historic runs and see relationships between parameters & metrics, deploy a model into production through interfaces of the system with a click or an API call, and statistically monitor models to get an early warning when models behave unexpectedly.

The systems and methods disclosed herein allow users to reproduce/rerun any version of a model, giving the user: the exact version of the model code; the datasets the model was trained on; and the input parameters or hyperparameters supplied to the model. The system also captures the environment used to run the model in, using DOCKER, meaning that the system records all the model's dependencies and exact version number needed to rerun the model.

The ability of the system to use any runner, and switch runners, gives users different processing options without needing to move files or keep track of copies of model code and training data. A machine may be used as a runner by running a single command on it. The model can be developed and run via an interactive development environment (IDE) such as JUPYTERLAB, discussed herein, or another IE or local development environment. Models execute remotely on the runners, sending snapshots of code changes and values of syntactic objects such as parameters and summary statistics, back to the hub for storage and visualization.

The systems and methods disclosed herein may be used as a software as a service (SaaS) deployment, on AWS as a private deployment in a customer's virtual private cloud (VPC), or on premises on physical hardware (for example using an NVIDIA DGX deep learning server). The SaaS method may include a managed installation of the hub along with automatically provisioned managed runners created in a public cloud. Users can also add their own runners to gain access to additional processing power. This may be done by using "ds runner create" or going through the user interfaces described herein to add a runner, which creates an entry in the database and tells the user the DOCKER command to run on the runner hardware, which command has the authentication token embedded so that when the runner software is started it connects to the hub and indicates which runner database entry it is associated with. The only requirement for a runner is DOCKER and an internet connection. A public IP address is not needed to access the JUPYTER container on a runner from anywhere by logging into the hub. The hub starts an HTTP tunnel container on the runner which makes an outbound connection to the system's tunnel service and securely exposes the JUPYTER container as a website subdomain. When a connection is made from the user's browser to the tunnel URL it gets proxied through the tunnel service to the connected runner and back to the JUPYTER container even if the runner itself is behind NAT or a firewall which only allows outbound connections. This gives the user flexibility to attach any available compute resource to the cluster and still allows users to log in from anywhere, while managing the work in a central location (the hub).

Runners can be attached from any cloud or infrastructure enabling a hybrid cloud ML platform. Because the system uses DOTMESH for the workspace and dataset filesystems (which can be mirrors of S3 buckets), and because DOTMESH uses ZFS, and because ZFS supports "zfs send" and "zfs receive" to stream snapshots between any nodes regardless of the underlying infrastructure, this makes it possible to synchronize data from any LINUX machine to any other LINUX machine even if they are running in different environments or on different cloud providers. This enables "hybrid" architectures where the hub runs on one cloud provider and one or more runners run on a different cloud, or the hub in the cloud but a local GPU. Users may optimize cloud spend with automatic shutdown when runners are idle. Data can also be synced between non LINUX machines. DOCKER exists for MAC and WINDOWS, for example, and runs a LINUX virtual machine that runs DOCKER, so that the non-LINUX machine could be used to implement a system runner.

When the system is deployed as a private installation on AWS a CLOUDFORMATION template may deploy a private hub and a single private runner. The template can be customized and instantiated by the end user or accessed via the AWS marketplace to create separate installs in their own AWS accounts. The CLOUDFORMATION template instantiates a hub and a single runner in EC2 with an S3 bucket used to communicate the runner token between the two. The hub creates a new runner token at startup and places it in the bucket. The runner's EC2 instance waits for the runner token to appear in the bucket, then uses it to start the runner scheduling container. The hub's persistent state is stored in a separate EBS volume, configured to not be deleted on termination, so the hub can be upgraded by instantiating a new EC2 instance from a newer AMAZON machine image (AMI) and just re-attached to the existing volume. The runner's persistent state is stored in its root partition because it is just a cache and the runner software can upgrade itself in place. The runner and hub are connected with a dedicated VPC, with an InternetGateway for external connectivity. The runner and hub each have their own SecurityGroup to control incoming connections. The instances are managed by AutoScaling groups. HTTP access may be provided to the hub's web interface and API and GRPC/DOTMESH protocol may be used to provide additional runners access to the hub.

In implementations a CLOUDFORMATION template may not create a single runner but may connect to cloud provider services to create VMs (e.g., AMAZON EC2, GOOGLE COMPUTE ENGINE, etc.) so that the hub can create new virtual machines and associated runner database entries and configure the virtual machines so that the runner software starts up on the virtual machine without any user intervention. The CLOUDFORMATION stack will then just create the hub and users can create/destroy runners dynamically via the hub. This eliminates the need to use an S3 bucket to communicate the runner token.

In implementations the systems and methods disclosed herein may be used to track, version and run any existing PYTHON script, IPYTHON notebook, and R model by marking up the parameters and metrics to track with the PYTHON library. Existing files may be added using an ADD FILES selector on a RESOURCES section of a project (after stopping JUPYTER).

Users may integrate the systems and methods disclosed herein with a CI system so that models can be automatically trained and their metrics and provenance published on a push of the code to version control. A CI job may be configured to run "ds run-d-repo git@github.com:org/repo--ref $CI_COMMIT SHA python train.py," for example, so the model training happens asynchronously in the system, freeing up CI runners for runs so every model training is tracked and lands in the model library from where it can be deployed and monitored.

In implementations the end user device is remote from the hub and/or the runner is remote from the hub and/or the runner is remote from the end user device, but the methods are performed very quickly, so that the systems and methods disclosed herein could only be performed using computers as discussed herein. For example, the end user device may be more than 1 kilometer from the hub, but each data run and model run may be fully processed by the runner and fully uploaded to the hub, and viewable using the user interfaces described herein, within five minutes of the end user initiating the run through the end user device.

The systems and methods disclosed herein constitute an improvement to the technical field of data science in that they allow data scientists and modelers to keep track of all data runs and model runs, view details of all data runs and model runs, view provenance of all runs, view comparison graphs/details of all runs, and the like, even if remote from one another and even if no manual recordation is done by any user.

Although some of the above description discusses the use of JupyterLab for running an updated model run (by changing epochs, optimizer, etc.), the user might instead edit a script in any script editor and supply that to the hub and/or runner through a number of interfaces (for example uploading it by dragging the file into a web UI and then running it via a "ds run" command, telling the system to upload it and run it via the "ds run" command with the "-u" flag, or commit it to a GIT repository that the system 100 has been configured to automatically update itself from and then invoke it via "ds run," or any of the above except instead of invoking "ds run," a third-party system may be configured to invoke the script on some automated trigger condition). "ds run," for reference, is a command-line command that can be run from the end user's workstation, or invoked by an automatic system, to trigger a run. The kind of automatic system that might trigger it, for instance, is a hook that detects when users have committed changes to their script in GIT, and automatically triggers execution of that updated script by the system 100, so that users who commit new revisions to the script need take no further action to have it run, and to have a new run appear in the UIs of the system 100, for them to assess the results.

While only a few example parameters have been discussed in detail above with respect to model runs (for example changing an optimizer, changing a number of epochs, and changing an input data file), there are many ML parameters that may be modified between model runs. In the art there are thousands of ML algorithms and each has its own set of parameters and options, and it is typical for any given one to have dozens of parameters. Any arbitrary criteria could be set as a parameter for any given algorithm, so that a fully comprehensive list is not possible here.

Nevertheless, following are some parameters that may be utilized and/or may be relevant to some of the following machine learning methods: (1) deep learning: activation function; architecture; balance classes; layer sizes; layer types; loss function; number of epochs; optimizer; regularization; testing metric; weights (2) Generalized linear model: epsilon tolerance; exclude bias term; family function; L1, L2 penalty; link function; testing metric; (3) Gradient boosted trees: balance classes; learning rate; monotonicity constraint; number of trees; testing metric; tree depth; (4) K-means clustering: algorithm; initialization; maximum iterations; number of clusters; (5) Nearest neighbors: distance metric; (number of neighbors; (6) Random forest: balance classes; number of trees; sampling dimensions; testing metric; tree depth; (7) Recommendation: objective function; similarity function; (8) UnarySupport vector machine: epsilon tolerance; exclude bias term; kernel; regularization; testing objective. Again, as indicated these are only representative examples, and any aspect of an ML model that may be edited may be a parameter in any given model run.

In implementations the "editable fields" as disclosed herein could include editable text, but they could also include non-text fields, such as toggle switches, radio selectors, and so forth, that receive some input from a user to then allow the user to re-run a model run. For example, a radio toggle could toggle between different optimizers, a dropdown list could allow a user to select the number of epochs, a dropdown list could allow the user to select an input data file for a model run, and so forth. In some implementations a single data science run could include the testing, validation, and/or training of multiple ML models. Although some examples herein discuss epochs, ML models within the scope of this disclosure may use decision trees and the like and may not have epochs.

In places where "one of A and B" is used herein, including in the claims, wherein A and B are elements, the phrase shall mean "A or B." This shall be extrapolated to as many elements as are recited in this manner, so that "one of A, B, and C" shall mean "A, B, or C," etc. In places where the description refers to specific implementations of systems and methods herein, one or more or many modifications may be made without departing from the spirit and scope thereof. Details of any specific described implementation may, wherever possible, be applied to any other described implementation.

What is claimed is:

1. A system for tracking and representing data science model runs, comprising:
   one or more first computing devices communicatively coupled with a data store;
   an end user computing device having a display, the end user computing device communicatively coupled with the one or more first computing devices through a telecommunications network; and
   one or more user interfaces provided by the one or more first computing devices and displayed on the display, the one or more user interfaces displaying:
     a selector configured to, in response to being selected, initiate execution of a first data science model run using the one or more first computing devices; wherein the first data science model run comprises one of a generation of a machine learning (ML) model, a testing of the ML model, a validation of the ML model, and a training of the ML model;
     a unique identifier identifying the first data science model run;
     a list of one or more input files used by the one or more first computing devices to execute the first data science model run;
     a list of one or more output files output by the one or more first computing devices as a result of the first data science model run; and
     a diagram diagramming a process flow including a visual representation of the one or more input files, a visual representation of the first data science model run, and a visual representation of the one or more output files.

2. The system of claim 1, wherein the one or more user interfaces further display one or more parameters associated with the first data science model run, the one or more parameters comprising one of: a number of epochs used to train the ML model; an optimizing algorithm (optimizer) used to train the ML model; and an accuracy of the ML model.

3. The system of claim 1, wherein the one or more user interfaces further display a date and time of execution of the first data science model run.

4. The system of claim 1, wherein the one or more user interfaces further display an identifier of a user executing the first data science model run.

5. The system of claim 1, wherein the one or more output files comprise the ML model.

6. The system of claim 1, wherein the data store comprises the one or more output files stored therein.

7. The system of claim 1, wherein the one or more user interfaces further display a plurality of editable fields and a selector configured to, in response to being selected after at least one of the editable fields has been edited, initiate a second data science model run comprising one of a generation of a second machine learning (ML) model, a testing of the second ML model, a validation of the second ML model, and a training of the second ML model.

8. The system of claim 7, wherein the one or more user interfaces further comprise a first selector configured to execute the second data science model run by executing all of the editable fields and a second selector configured to execute the second data science model run by executing fewer than all of the editable fields.

9. The system of claim 7, wherein the plurality of editable fields comprise one of: an editable selected input data file; an editable number of epochs; and an editable optimizing algorithm (optimizer).

10. The system of claim 7, wherein the one or more user interfaces further display: a unique identifier identifying the second data science model run; a list of one or more input files used to execute the second data science model run; a list of one or more output files output as a result of the second data science model run; and a diagram diagramming a process flow including a visual representation of the one or more input files used to execute the second data science model run, a visual representation of the second data science model run, and a visual representation of the one or more output files output as a result of the second data science model run.

11. The system of claim 7, wherein the one or more user interfaces further display a list including the unique identifier identifying the first data science model run and the unique identifier identifying the second data science model run.

12. The system of claim 1, wherein the one or more user interfaces further display an indication of a version of a DOCKER image used to execute the first data science model run.

13. The system of claim 1, wherein the end user computing device is located more than 1 km from the one or more first computing devices, and wherein the one or more user interfaces are displayed on the display within 5 minutes of initiation of the first data science model run.

14. A method for tracking and representing data science model runs, comprising:
providing one or more first computing devices communicatively coupled with a data store;
receiving at the one or more first computing devices, from an end user computing device having a display, one or more user inputs, wherein the end user computing device is communicatively coupled with the one or more first computing devices through a telecommunications network;
in response to receiving the one or more user inputs:
executing a data science model run using the one or more first computing devices, wherein the data science model run comprises one of generating a machine learning (ML) model, testing the ML model, validating the ML model, and training the ML model; and
displaying one or more user interfaces on the display, the one or more user interfaces displaying:
a unique identifier identifying the data science model run;
a list of one or more input files used by the one or more first computing devices to execute the data science model run;
a list of one or more output files output by the one or more first computing devices as a result of the data science model run; and
a diagram diagramming a process flow including a visual representation of the one or more input files, a visual representation of the data science model run, and a visual representation of the one or more output files.

15. The method of claim 14, wherein the one or more user interfaces further display one or more parameters associated with the data science model run, the one or more parameters comprising one of: a number of epochs used to train the ML model; an optimizing algorithm (optimizer) used to train the ML model; and an accuracy of the ML model.

16. The method of claim 14 further comprising, in response to receiving a user selection of a deploy selector displayed on the one or more user interfaces, exporting the ML model to a software platform.

17. The method of claim 14, further comprising displaying one or more second user interfaces comprising a plurality of executable cells, and wherein the method further comprises: executing at least one of the executable cells; in response to executing the at least one executable cell, automatically writing metadata to a data file and displaying the metadata on the one or more second user interfaces; and, in response to the metadata being written to the data file, automatically storing the unique identifier identifying the data science model run and the metadata in the data store.

18. The method of claim 17, wherein the metadata includes an identifier for each of the one or more input files, an identifier for each of the one or more output files, a date and time of execution of the data science model run, and an identifier of a user executing the data science model run.

19. A method for tracking and representing data science model runs, comprising:
providing a hub comprising a first computing device comprising a data store;
providing a runner comprising a second computing device having a cache, the runner communicatively coupled with the hub through a telecommunications network;
receiving at one of the hub and the runner, from an end user computing device having a display, one or more user inputs, wherein the end user computing device is communicatively coupled with both the runner and the hub through the telecommunications network;
in response to receiving the one or more user inputs:
executing a data science model run on the runner and uploading to the data store, from the cache, one or more output files output by the runner as a result of the data science model run, wherein the data science model run comprises one of generating a machine learning (ML) model, testing the ML model, validating the ML model, and training the ML model; and
displaying one or more user interfaces on the display, the one or more user interfaces displaying:
a unique identifier identifying the data science model run executed by the runner;
a list of one or more input files used by the runner to execute the data science model run;
a list of the one or more output files;
a date and time of execution of the data science model run;
an identifier of a user executing the data science model run; and
a diagram diagramming a process flow including a visual representation of the one or more input files, a visual representation of the data science model run, and a visual representation of the one or more output files.

20. The method of claim 19, wherein the one or more user interfaces further display links to the one or more input files and links to the one or more output files.

* * * * *